United States Patent
Conger et al.

(10) Patent No.: US 10,729,098 B2
(45) Date of Patent: Aug. 4, 2020

(54) CAGE RACK MONITORING APPARATUS AND METHODS

(71) Applicant: INNOVIVE, INC., San Diego, CA (US)

(72) Inventors: Dee L. Conger, Las Vegas, NV (US); Cory J. Spivey, San Diego, CA (US)

(73) Assignee: INNOVIVE, INC., San Diego, CA (US)

( * ) Notice: Subject to any disclaimer, the term of this patent is extended or adjusted under 35 U.S.C. 154(b) by 0 days.

(21) Appl. No.: 14/317,838

(22) Filed: Jun. 27, 2014

(65) Prior Publication Data

US 2015/0004679 A1  Jan. 1, 2015

Related U.S. Application Data

(60) Provisional application No. 61/841,731, filed on Jul. 1, 2013.

(51) Int. Cl.
*A01K 1/03* (2006.01)
*G01N 1/22* (2006.01)

(52) U.S. Cl.
CPC ............ *A01K 1/031* (2013.01); *G01N 1/2202* (2013.01); *G01N 2001/2223* (2013.01)

(58) Field of Classification Search
CPC ........ A01K 1/031; A01K 29/005; A01K 1/03; A01K 11/006; A01K 1/00; A01K 11/008
USPC ........ 119/417, 421, 452, 456, 418, 419, 455
See application file for complete search history.

(56) References Cited

U.S. PATENT DOCUMENTS

| | | |
|---|---|---|
| 513,557 A | 1/1894 | Cobb |
| 1,909,611 A | 5/1933 | Charavay |
| 2,554,086 A | 5/1951 | Block |
| 2,988,044 A | 6/1961 | Adelberg et al. |
| 3,002,492 A | 10/1961 | Naturale |
| 3,084,850 A | 4/1963 | Engalitcheff, Jr. |
| 3,087,458 A | 4/1963 | Bennett |
| 3,096,933 A | 7/1963 | Bora |
| 3,122,127 A | 2/1964 | Shechmeister et al. |
| 3,127,872 A | 4/1964 | Finkel |
| 3,163,149 A | 12/1964 | Ivey |
| 3,212,474 A | 10/1965 | Higgins et al. |
| 3,225,738 A | 12/1965 | Palencia |
| 3,302,615 A | 2/1967 | Tietje |
| 3,334,614 A | 8/1967 | Gass et al. |
| 3,397,676 A | 9/1968 | Barney |
| 3,465,722 A | 9/1969 | Duff |
| 3,500,831 A | 3/1970 | Schaar |

(Continued)

FOREIGN PATENT DOCUMENTS

| | | |
|---|---|---|
| EP | 0160336 | 11/1985 |
| EP | 0233134 | 8/1987 |

(Continued)

OTHER PUBLICATIONS

Office Action dated Oct. 31, 2014 in U.S. Appl. No. 13/270,165, filed Oct. 10, 2011 and published as US 2012-0085291 on Apr. 12, 2012.

(Continued)

*Primary Examiner* — Peter M Poon
*Assistant Examiner* — Jeffrey R Larsen
(74) *Attorney, Agent, or Firm* — Grant IP, Inc.

(57) ABSTRACT

Methods, devices, apparatuses and systems for monitoring the presence or absence of a contaminant and/or a contaminant sampling element, or portion thereof, in an animal rack.

18 Claims, 16 Drawing Sheets

(56) References Cited

U.S. PATENT DOCUMENTS

| | | |
|---|---|---|
| 3,518,971 A | 7/1970 | Gass et al. |
| 3,524,431 A | 8/1970 | Graham et al. |
| 3,537,428 A | 11/1970 | Montgomery |
| 3,547,309 A | 12/1970 | Pusey et al. |
| 3,649,464 A | 3/1972 | Feeman |
| 3,662,713 A | 5/1972 | Sachs |
| 3,698,360 A | 10/1972 | Rubricius |
| 3,718,120 A | 2/1973 | Schwarz |
| 3,731,657 A | 5/1973 | Alessio |
| 3,765,374 A | 10/1973 | Kolste |
| 3,768,546 A | 10/1973 | Shipes |
| 3,771,686 A | 11/1973 | Brison |
| 3,776,195 A | 12/1973 | Willinger |
| 3,791,346 A | 2/1974 | Willinger et al. |
| 3,877,420 A | 4/1975 | Eagleson, Jr. |
| 3,924,571 A | 12/1975 | Holman |
| 3,958,534 A | 5/1976 | Perkins |
| 3,965,865 A | 6/1976 | Kundikoff |
| 4,022,159 A | 5/1977 | Salvia |
| 4,023,529 A | 5/1977 | Landy |
| 4,043,256 A | 8/1977 | VanHuis |
| 4,075,618 A | 2/1978 | Montean |
| 4,161,159 A | 7/1979 | Leong |
| 4,177,761 A | 12/1979 | Bellocchi, Jr. |
| 4,252,080 A | 2/1981 | Gioia et al. |
| 4,343,261 A | 8/1982 | Thomas |
| 4,365,590 A | 12/1982 | Ruggieri et al. |
| 4,367,728 A | 1/1983 | Mutke |
| 4,402,280 A | 9/1983 | Thomas |
| 4,448,150 A | 5/1984 | Catsimpoolas |
| 4,480,587 A | 11/1984 | Sedlacek |
| 4,528,941 A | 7/1985 | Spengler |
| 4,551,311 A | 11/1985 | Lorenz |
| 4,593,650 A | 6/1986 | Lattuada |
| 4,640,228 A | 2/1987 | Sedlacek et al. |
| 4,690,100 A | 9/1987 | Thomas |
| 4,699,088 A | 10/1987 | Murray et al. |
| 4,699,188 A | 10/1987 | Baker et al. |
| 4,728,006 A | 3/1988 | Drobish et al. |
| 4,774,631 A | 9/1988 | Okuyama et al. |
| 4,779,566 A | 10/1988 | Morris et al. |
| 4,798,171 A | 1/1989 | Peters et al. |
| 4,844,018 A | 7/1989 | Niki |
| 4,892,209 A | 1/1990 | Dorfman et al. |
| 4,907,536 A | 3/1990 | Chrisler |
| 4,940,017 A | 7/1990 | Niki et al. |
| 4,941,431 A | 7/1990 | Anderson et al. |
| 4,976,219 A | 12/1990 | Goguen et al. |
| 4,991,635 A | 2/1991 | Ulm |
| 5,000,120 A | 3/1991 | Coiro, Sr. et al. |
| 5,003,922 A | 4/1991 | Niki et al. |
| 5,031,515 A | 7/1991 | Niemela et al. |
| 5,044,316 A | 9/1991 | Thomas |
| 5,048,459 A | 9/1991 | Niki et al. |
| 5,081,955 A | 1/1992 | Yoneda et al. |
| 5,148,766 A | 9/1992 | Coiro, Sr. et al. |
| 5,163,380 A | 11/1992 | Duffy |
| 5,165,362 A | 11/1992 | Sheaffer et al. |
| 5,213,059 A | 5/1993 | Krantz |
| 5,287,414 A | 2/1994 | Foster |
| 5,307,757 A | 5/1994 | Coiro, Sr. et al. |
| 5,316,172 A | 5/1994 | Apps et al. |
| 5,328,049 A | 7/1994 | Ritzow |
| 5,331,920 A | 7/1994 | Coiro, Sr. et al. |
| 5,349,923 A | 9/1994 | Sheaffer et al. |
| 5,385,118 A | 1/1995 | Coiro, Sr. et al. |
| 5,400,744 A | 3/1995 | Coiro, Sr. et al. |
| 5,407,129 A | 4/1995 | Carey et al. |
| 5,407,648 A | 4/1995 | Allen et al. |
| 5,429,800 A | 7/1995 | Miraldi et al. |
| 5,447,118 A | 9/1995 | Huff |
| 5,471,950 A | 12/1995 | White |
| 5,474,024 A | 12/1995 | Hallock |
| 5,513,596 A | 5/1996 | Coiro, Sr. et al. |
| 5,567,364 A | 10/1996 | Phillips |
| 5,572,403 A | 11/1996 | Mills |
| 5,572,953 A | 11/1996 | Phelan et al. |
| 5,605,240 A | 2/1997 | Guglielmini |
| 5,608,209 A | 3/1997 | Matsuda |
| 5,624,037 A | 4/1997 | Kozo |
| 5,635,403 A | 6/1997 | Bailey |
| 5,655,478 A | 8/1997 | Kiera |
| 5,657,891 A | 8/1997 | Bilani et al. |
| 5,664,704 A | 9/1997 | Meadows et al. |
| 5,694,885 A | 12/1997 | Deitrich et al. |
| 5,706,761 A | 1/1998 | Mayer |
| 5,717,202 A | 2/1998 | Matsuda |
| 5,745,041 A | 4/1998 | Moss |
| 5,771,841 A | 6/1998 | Boor |
| 5,780,130 A | 7/1998 | Hansen et al. |
| 5,797,350 A | 8/1998 | Smith |
| 5,823,144 A | 10/1998 | Edstrom et al. |
| 5,832,876 A | 11/1998 | Brown et al. |
| 5,865,144 A | 2/1999 | Semenuk |
| 5,893,338 A | 4/1999 | Campbell |
| 5,894,816 A | 4/1999 | Coiro, Sr. et al. |
| 5,905,653 A | 5/1999 | Higham |
| 5,915,332 A | 6/1999 | Young |
| 5,924,384 A | 7/1999 | Detrich et al. |
| 5,954,013 A | 9/1999 | Gabriel et al. |
| 5,954,237 A | 9/1999 | Lampe et al. |
| 5,996,535 A | 12/1999 | Semenuk et al. |
| 6,021,042 A | 2/2000 | Anderson et al. |
| 6,029,604 A | 2/2000 | de Vosjoli |
| 6,092,487 A | 7/2000 | Niki et al. |
| 6,112,701 A | 9/2000 | Faith et al. |
| 6,138,610 A | 10/2000 | Niki |
| 6,142,732 A | 11/2000 | Chou et al. |
| 6,144,300 A | 11/2000 | Dames |
| 6,158,387 A | 12/2000 | Gabriel et al. |
| 6,164,311 A | 12/2000 | Momont |
| 6,217,437 B1 | 4/2001 | Murray et al. |
| 6,227,146 B1 | 5/2001 | Gabriel et al. |
| 6,237,800 B1 | 5/2001 | Barrett |
| 6,257,171 B1 | 7/2001 | Rivard |
| 6,293,227 B1 | 9/2001 | Ver Hage |
| 6,295,826 B1 | 10/2001 | Lee |
| 6,295,950 B1 | 10/2001 | Deitrich et al. |
| 6,302,059 B1 | 10/2001 | Faith et al. |
| 6,305,324 B1 | 10/2001 | Hallock et al. |
| 6,308,660 B1 | 10/2001 | Coiro, Sr. et al. |
| 6,311,644 B1 | 11/2001 | Pugh |
| 6,336,427 B1 | 1/2002 | Gabriel et al. |
| 6,341,581 B1 | 1/2002 | Gabriel et al. |
| 6,357,393 B1 | 3/2002 | Coiro, Sr. et al. |
| 6,361,962 B1 | 3/2002 | Lentini et al. |
| 6,392,872 B1 | 5/2002 | Doustou et al. |
| 6,394,032 B1 | 5/2002 | Coiro, Sr. et al. |
| 6,396,688 B1 | 5/2002 | Davies et al. |
| 6,407,918 B1 | 6/2002 | Edmunds et al. |
| 6,408,794 B1 | 6/2002 | Coiro, Sr. et al. |
| 6,423,118 B1 | 7/2002 | Becerra et al. |
| 6,427,958 B1 | 8/2002 | Looney |
| 6,457,437 B1 | 10/2002 | Frasier et al. |
| 6,460,486 B1 | 10/2002 | Powers |
| 6,463,397 B1 | 10/2002 | Cohen |
| 6,517,428 B1 | 2/2003 | Murray et al. |
| 6,532,901 B2 | 3/2003 | Isley |
| 6,543,387 B1 | 4/2003 | Stein |
| 6,553,939 B1 | 4/2003 | Austin et al. |
| 6,556,437 B1 | 4/2003 | Hardin |
| 6,561,129 B1 | 5/2003 | Cheng |
| 6,571,738 B2 | 6/2003 | Rivard |
| 6,572,819 B1 | 6/2003 | Wu et al. |
| 6,584,936 B2 | 7/2003 | Rivard |
| 6,588,373 B1 | 7/2003 | Strzempko et al. |
| 6,592,448 B1 | 7/2003 | Williams |
| 6,612,260 B1 | 9/2003 | Loyd et al. |
| 6,714,121 B1 | 3/2004 | Moore |
| 6,718,912 B2 | 4/2004 | Pappas |
| 6,729,266 B1 | 5/2004 | Gabriel et al. |
| 6,739,846 B2 | 5/2004 | Stoddard et al. |
| 6,810,833 B2 | 11/2004 | Bonner et al. |
| 6,813,152 B2 | 11/2004 | Perazzo |

(56) References Cited

U.S. PATENT DOCUMENTS

| | | |
|---|---|---|
| 6,853,946 B2 | 2/2005 | Cohen et al. |
| 6,878,874 B2 | 4/2005 | Osborn et al. |
| 6,998,980 B2 | 2/2006 | Ingley, III |
| 7,031,157 B2 | 4/2006 | Horng et al. |
| 7,086,350 B2 | 8/2006 | Tecott |
| 7,114,463 B2 | 10/2006 | Donohoe |
| 7,126,471 B2 | 10/2006 | Ahmed |
| 7,131,398 B2 | 11/2006 | Cohen et al. |
| 7,146,931 B2 | 12/2006 | Gabriel et al. |
| 7,191,734 B2 | 3/2007 | Strzempko et al. |
| 7,237,509 B2 | 7/2007 | Bonner |
| 7,320,294 B2 | 1/2008 | Irwin et al. |
| 7,389,744 B2 | 6/2008 | Zhang |
| 7,487,744 B1 | 2/2009 | Goldberg et al. |
| 7,527,020 B2 | 5/2009 | Conger |
| 7,527,929 B2 | 5/2009 | Conger |
| 7,665,419 B2 | 2/2010 | Conger et al. |
| 7,734,381 B2 | 6/2010 | Conger et al. |
| 7,739,984 B2 | 6/2010 | Conger |
| 7,874,268 B2 | 1/2011 | Conger et al. |
| 7,887,146 B1 | 2/2011 | Louie et al. |
| 7,913,650 B2 | 3/2011 | Conger |
| 7,954,455 B2 | 6/2011 | Conger |
| 7,970,495 B2 | 6/2011 | Conger et al. |
| 7,970,496 B2 | 6/2011 | Conger et al. |
| 8,082,885 B2 | 12/2011 | Conger et al. |
| 8,156,899 B2 | 4/2012 | Conger et al. |
| 8,171,887 B2 | 5/2012 | Conger et al. |
| 8,499,719 B2 | 8/2013 | Brocca et al. |
| 8,739,737 B2 | 6/2014 | Conger et al. |
| 9,719,680 B2 | 8/2017 | Staller |
| 2001/0054394 A1 | 12/2001 | Marchioro |
| 2002/0022991 A1 | 2/2002 | Sharood et al. |
| 2002/0094283 A1 | 7/2002 | Salmen et al. |
| 2002/0100429 A1 | 8/2002 | Wade |
| 2002/0180588 A1 | 12/2002 | Erickson et al. |
| 2002/0190845 A1 | 12/2002 | Moore |
| 2002/0195060 A1 | 12/2002 | Dollahan |
| 2003/0051676 A1 | 3/2003 | Rivard |
| 2003/0130809 A1 | 7/2003 | Cohen et al. |
| 2003/0131802 A1 | 7/2003 | Murray et al. |
| 2003/0170145 A1 | 9/2003 | Smith et al. |
| 2003/0200933 A1 | 10/2003 | Park |
| 2004/0018105 A1 | 1/2004 | Stoddard et al. |
| 2004/0185770 A1 | 9/2004 | Soeholm et al. |
| 2004/0191437 A1 | 9/2004 | Asayama et al. |
| 2004/0211745 A1 | 10/2004 | Murray |
| 2004/0261727 A1 | 12/2004 | Matsuo et al. |
| 2005/0024211 A1 | 2/2005 | Maloney |
| 2005/0066908 A1 | 3/2005 | Park |
| 2005/0076852 A1 | 4/2005 | Campiotti et al. |
| 2005/0145191 A1 | 7/2005 | Cohen et al. |
| 2005/0166860 A1 | 8/2005 | Austin et al. |
| 2005/0193957 A1 | 9/2005 | Oshima et al. |
| 2005/0241591 A1 | 11/2005 | Ingley, III |
| 2005/0256591 A1 | 11/2005 | Rule et al. |
| 2006/0000422 A1 | 1/2006 | Cheng |
| 2006/0011143 A1 | 1/2006 | Drummond et al. |
| 2006/0071774 A1 | 4/2006 | Brown et al. |
| 2006/0111680 A1 | 5/2006 | Spada et al. |
| 2006/0124072 A1 | 6/2006 | Conger |
| 2006/0185614 A1 | 8/2006 | Van Fleet, Jr. |
| 2006/0236951 A1 | 10/2006 | Gabriel et al. |
| 2006/0254528 A1 | 11/2006 | Malnait et al. |
| 2006/0278171 A1 | 12/2006 | Conger et al. |
| 2007/0011950 A1 | 1/2007 | Wood |
| 2007/0040682 A1 | 2/2007 | Zhu et al. |
| 2007/0044799 A1 | 3/2007 | Hete et al. |
| 2007/0159040 A1 | 7/2007 | Fernandez et al. |
| 2007/0169714 A1 | 7/2007 | Conger et al. |
| 2007/0169715 A1 | 7/2007 | Conger et al. |
| 2007/0169716 A1 | 7/2007 | Conger et al. |
| 2007/0169718 A1 | 7/2007 | Conger et al. |
| 2007/0175399 A1 | 8/2007 | Conger et al. |
| 2007/0175404 A1 | 8/2007 | Conger et al. |
| 2007/0181070 A1 | 8/2007 | Conger et al. |
| 2007/0181074 A1 | 8/2007 | Conger et al. |
| 2007/0181075 A1 | 8/2007 | Conger et al. |
| 2007/0193527 A1 | 8/2007 | Verhage et al. |
| 2007/0209653 A1 | 9/2007 | Beisheim et al. |
| 2007/0169717 A1 | 11/2007 | Conger et al. |
| 2007/0256643 A1 | 11/2007 | Coiro et al. |
| 2008/0066688 A1 | 3/2008 | Malnati et al. |
| 2008/0078332 A1 | 4/2008 | Conger et al. |
| 2008/0087231 A1 | 4/2008 | Gabriel et al. |
| 2008/0134984 A1 | 6/2008 | Conger et al. |
| 2008/0222565 A1 | 9/2008 | Taylor et al. |
| 2008/0236506 A1 | 10/2008 | Conger et al. |
| 2008/0236507 A1 | 10/2008 | Conger et al. |
| 2008/0282990 A1 | 11/2008 | Conger et al. |
| 2009/0002496 A1 | 1/2009 | Esmaeili |
| 2009/0293815 A1 | 12/2009 | Coiro et al. |
| 2010/0006521 A1 | 1/2010 | VerHage et al. |
| 2010/0242852 A1 | 9/2010 | Conger |
| 2010/0248611 A1 | 9/2010 | Conger |
| 2011/0005465 A1 | 1/2011 | Tamborini et al. |
| 2011/0041773 A1 | 2/2011 | Brielmeier et al. |
| 2011/0061600 A1 | 3/2011 | Conger et al. |
| 2011/0297098 A1 | 12/2011 | Conger et al. |
| 2011/0303158 A1 | 12/2011 | Conger et al. |
| 2011/0308475 A1 | 12/2011 | Conger et al. |
| 2012/0085291 A1 | 4/2012 | Conger et al. |
| 2012/0318207 A1 | 12/2012 | Conger et al. |
| 2013/0160716 A1 | 6/2013 | Conger et al. |
| 2013/0220229 A1 | 8/2013 | Conger et al. |
| 2013/0228134 A1 | 9/2013 | Conger et al. |
| 2013/0284109 A1 | 10/2013 | Conger et al. |
| 2014/0069340 A1 | 3/2014 | Lipscomb |
| 2014/0123906 A1 | 5/2014 | Conger et al. |
| 2014/0345536 A1 | 11/2014 | Usui et al. |
| 2015/0359189 A1 | 12/2015 | Bernardini |
| 2016/0037744 A1 | 2/2016 | Rudin |
| 2016/0270365 A1 | 9/2016 | Conger et al. |
| 2016/0287366 A1 | 10/2016 | Scott |
| 2017/0202176 A1 | 7/2017 | Speter et al. |
| 2017/0339917 A1 | 11/2017 | Conger et al. |
| 2018/0242551 A1 | 8/2018 | Conger et al. |

FOREIGN PATENT DOCUMENTS

| | | |
|---|---|---|
| EP | 0279076 | 12/1987 |
| EP | 2 499 907 | 9/2012 |
| FR | 2696423 A1 | 4/1994 |
| FR | 2824703 A1 | 11/2002 |
| JP | 56-3770 | 1/1981 |
| JP | S56-54772 | 12/1981 |
| JP | 57-083233 | 5/1982 |
| JP | 62-7852 | 1/1987 |
| JP | 64-85026 | 3/1989 |
| JP | 03-244330 | 10/1991 |
| JP | 4-9555 | 1/1992 |
| JP | 4-023929 | 1/1992 |
| JP | 4-267826 | 9/1992 |
| JP | 05005499 | 1/1993 |
| JP | H06-068430 | 9/1994 |
| JP | 3022196 | 12/1995 |
| JP | 9-168346 | 6/1997 |
| JP | H10-215720 | 8/1998 |
| JP | 10-286037 | 10/1998 |
| JP | H11-009126 | 1/1999 |
| JP | 2000-032862 | 2/2000 |
| JP | 3070623 | 8/2000 |
| JP | 2002-065109 | 3/2002 |
| JP | 2003-088263 | 3/2003 |
| JP | 2003-018932 | 7/2003 |
| JP | 2005-095004 | 4/2005 |
| JP | 2005-185189 | 7/2005 |
| JP | 2005-328725 | 12/2005 |
| JP | 2008-527975 | 7/2008 |
| JP | 2009-529862 | 8/2009 |
| JP | 2010-523158 | 7/2010 |
| WO | WO 92/018084 | 10/1992 |
| WO | WO 93/014474 | 7/1993 |
| WO | WO 2001/091543 | 12/2001 |

(56) References Cited

FOREIGN PATENT DOCUMENTS

| WO | WO 02/011523 | 2/2002 |
|----|----|----|
| WO | WO 03/051106 | 6/2003 |
| WO | WO 03/059048 | 7/2003 |
| WO | WO 06/065773 | 6/2006 |
| WO | WO 08/127998 | 10/2008 |
| WO | WO 2008/135528 | 11/2008 |
| WO | WO 2009/098617 | 8/2009 |
| WO | WO 10/054257 | 5/2010 |
| WO | WO 12/051124 | 4/2012 |
| WO | WO 2016/014319 | 1/2016 |

OTHER PUBLICATIONS

Office Action dated Nov. 13, 2014 in U.S. Appl. No. 13/776,645, filed Feb. 25, 2013 and published as US 2013-0228134 on Sep. 5, 2013.
Ancare Catelog, Systems and supplies for Animal Care, Sep. 2006, from World Wide Web URL "ancare.com".
Claim Translation for Japanese Patent Document JP04-9555. Translation certified: Feb. 5, 2009.
Claim Translation for Japanese Patent Document JP56-3770. Translation certified: Feb. 5, 2009.
Claim Translation for Japanese Patent Document JP62-7852. Translation certified: Feb. 5, 2009.
Statement under 37 C.F.R. section 1.98(a)(3) for Japanese Patent Document JP04-9555. Statement made: Feb. 6, 2009.
Statement under 37 C.F.R. section 1.98(a)(3) for Japanese Patent Document JP56-3770. Statement made: Feb. 6, 2009.
Statement under 37 C.F.R. section 1.98(a)(3) for Japanese Patent Document JP62-7852. Statement made: Feb. 6, 2009.
International Preliminary Report on Patentability for PCT/US2005/044977 dated Mar. 5, 2009.
International Preliminary Report on Patentability for PCT/US2007/018255 dated Feb. 26, 2009.
International Search report and Written Opinion dated May 28, 2010 in International Application No. PCT/US2009/063638 filed on Nov. 6, 2009 and published as WO 10/054257 on May 14, 2010.
International Search Report and Written Opinion for PCT/US2008/063766 dated Sep. 25, 2008.
International Search Report/Written Opinion for PCT/US2005/44977dated Sep. 30, 2008.
International Search Report/Written Opinion for PCT/US2006/23038 dated May, 28, 2008.
International Search Report/Written Opinion for PCT/US2007/018255 dated Jun. 16, 2008.
International Search Report/Written Opinion for PCT/US2008/059953 dated Jul. 16, 2008.
Marketing Materials From Trade Show Distributed Nov. 7, 2005.
Web Page describing Nalgene animal cage cover printed on Dec. 5, 2006 from VWR Catalogue on World Wide Web http://www.vwrsp.com.
Wikipedia/pulse-width-modulation (printed from internet http://en.wikipedia.org/wiki/Pulse-width_modulation on Dec. 5, 2009).
Extended European Search Report dated Jun. 27, 2012 in European Application No. EP 12160134 filed on: Dec. 13, 2005.
International Search Report/Written Opinion dated May 7, 2012 in International Application No. for PCT/US2011/055650 filed on Oct. 10, 2011 and Published as: WO/2012/051124 on: Apr. 19, 2012.
Extended European Search Report dated Dec. 11, 2012 in European Application No. EP 06773076 filed on: Jun. 13, 2006.
International Preliminary Report on Patentability dated May 10, 2011 in International Application No. For PCT/US2009/063638 filed on Nov. 6, 2009 and Published as: WO/2010/054257 on: May 14, 2010.
National Research Council, Guide for the Care and Use of Laboratory Animals, Washington, D.C.: National Academy Press, 1996.
Canadian Council on Animal Care, Guidelines on, Laboratory Animal Facilities—Characteristics, Design and Development, Ottawa, ON: Canadian Council on Animal Care, 2006.

Office Action dated May 18, 2007 in U.S. Appl. No. 11/300,644, filed Dec. 13, 2005 and published as US 2006-0124072 A1 on Jun. 15, 2006 now U.S. Pat. No. 7,527,020 issued on May 5, 2009.
Office Action dated Mar. 11, 2008 in U.S. Appl. No. 11/300,644, filed Dec. 13, 2005 and published as US 2006-0124072 A1 on Jun. 15, 2006 now U.S. Pat. No. 7,527,020 issued on May 5, 2009.
Office Action dated Aug. 1, 2008 in U.S. Appl. No. 11/300,644, filed Dec. 13, 2005 and published as US 2006-0124072 A1 on Jun. 15, 2006 now U.S. Pat. No. 7,527,020 issued on May 5, 2009.
Office Action dated Dec. 30, 2008 in U.S. Appl. No. 11/300,644, filed Dec. 13, 2005 and published as US 2006-0124072 A1 on Jun. 15, 2006 now U.S. Pat. No. 7,527,020 issued on May 5, 2009.
Office Action dated Jan. 26, 2009 in U.S. Appl. No. 11/300,644, filed Dec. 13, 2005 and published as US 2006-0124072 A1 on Jun. 15, 2006 now U.S. Pat. No. 7,527,020 issued on May 5, 2009.
Office Action dated Mar. 11, 2009 in U.S. Appl. No. 11/300,644 filed Dec. 13, 2005 and published as US 2006-0124072 A1 on Jun. 15, 2006 now U.S. Pat. No. 7,527,020 issued on May 5, 2009.
Office Action dated Nov. 27, 2007 in U.S. Appl. No. 11/695,075, filed Apr. 2, 2007 and published as US 2007-0169717 A1 on Jul. 26, 2007, and now U.S. Pat. No. 7,665,419 on Feb. 23, 2010.
Office Action dated Sep. 11, 2008 in U.S. Appl. No. 11/695,075, filed Apr. 2, 2007 and published as US 2007-0169717 A1 on Jul. 26, 2007, and now U.S. Pat. No. 7,665,419 on Feb. 23, 2010.
Office Action dated May 26, 2009 in U.S. Appl. No. 11/695,075, filed Apr. 2, 2007 and published as US 2007-0169717 A1 on Jul. 26, 2007, and now U.S. Pat. No. 7,665,419 on Feb. 23, 2010.
Office Action dated Oct. 6, 2009 in U.S. Appl. No. 11/695,075, filed Apr. 2, 2007 and published as US 2007-0169717 A1 on Jul. 26, 2007, and now U.S. Pat. No. 7,665,419 on Feb. 23, 2010.
Office Action dated Dec. 26, 2007 in U.S. Appl. No. 11/695,085, filed Apr. 2, 2007 and published as US 2007-0169715 A1 on Jul. 26, 2007.
Office Action dated Aug. 25, 2008 in U.S. Appl. No. 11/695,085, filed Apr. 2, 2007 and published as US 2007-0169715 A1 on Jul. 26, 2007.
Office Action dated Apr. 22, 2009 in U.S. Appl. No. 11/695,085, filed Apr. 2, 2007 and published as US 2007-0169715 A1 on Jul. 26, 2007.
Office Action dated Jan. 19, 2010 in U.S. Appl. No. 11/695,085, filed Apr. 2, 2007 and published as US 2007-0169715 A1 on Jul. 26, 2007.
Office Action dated Jun. 17, 2011 in U.S. Appl. No. 11/695,085, filed Apr. 2, 2007 and published as: 2007/0169715 on Jul. 26, 2007.
Office Action dated Mar. 28, 2012 in U.S. Appl. No. 11/695,085, filed Apr. 2, 2007 and published as: 2007/0169715 on Jul. 26, 2007.
Office Action dated Dec. 3, 2007 in U.S. Appl. No. 11/695,089, filed Apr. 2, 2007 and published as US 2007-0169716 A1 on Jul. 26, 2007, and now U.S. Pat. No. 7,661,392 on Feb. 16, 2010.
Office Action dated Sep. 3, 2008 in U.S. Appl. No. 11/695,089, filed Apr. 2, 2007 and published as US 2007-0169716 A1 on Jul. 26, 2007, and now U.S. Pat. No. 7,661,392 on Feb. 16, 2010.
Office Action dated Mar. 30, 2009 in U.S. Appl. No. 11/695,089, filed Apr. 2, 2007 and published as US 2007-0169716 A1 on Jul. 26, 2007, and now U.S. Pat. No. 7,661,392 on Feb. 16, 2010.
Office Action dated Oct. 6, 2009 in U.S. Appl. No. 11/695,089, filed Apr. 2, 2007 and published as US 2007-0169716 A1 on Jul. 26, 2007, and now U.S. Pat. No. 7,661,392 on Feb. 16, 2010.
Office Action dated Jun. 2, 2009 in U.S. Appl. No. 11/695,090, filed Apr. 2, 2007 and published as US 2008-0236507 A1 on Oct. 2, 2008.
Office Action dated Dec. 16, 2009 in U.S. Appl. No. 11/695,090, filed Apr. 2, 2007 and published as US 2008-0236507 A1 on Oct. 2, 2008.
Office Action dated Jun. 17, 2011 in U.S. Appl. No. 11/695,090, filed Apr. 2, 2007 and published as US 2008-0236507 A1 on Oct. 2, 2008.
Office Action dated Dec. 29, 2011 in U.S. Appl. No. 11/695,090, filed Apr. 2, 2007 and published as US 2008-0236507 A1 on Oct. 2, 2008.
Office Action dated May 13, 2009 in U.S. Appl. No. 11/423,949, filed Jun. 13, 2006 and published as US 2006-02787171 A1 on Dec. 14, 2006.

(56) References Cited

OTHER PUBLICATIONS

Office Action dated Mar. 2, 2010 in U.S. Appl. No. 11/423,949, filed Jun. 13, 2006 and published as US 2006-02787171 A1 on Dec. 14, 2006.
Office Action dated Oct. 12, 2010 in U.S. Appl. No. 11/423,949, filed Jun. 13, 2006 and published as US 2006-02787171 A1 on Dec. 14, 2006.
Office Action dated Feb. 3, 2011 in U.S. Appl. No. 11/423,949, filed Jun. 13, 2006 and published as US 2006-02787171 A1 on Dec. 14, 2006.
Office Action dated Dec. 29, 2009 in U.S. Appl. No. 12/101,046, filed Apr. 10, 2008 and published as US 2008-0282990 A1 on Nov. 20, 2008.
Office Action dated Mar. 17, 2010 in U.S. Appl. No. 12/101,046, filed Apr. 10, 2008 and published as US 2008-0282990 A1 on Nov. 20, 2008.
Office Action dated Oct. 25, 2010 in U.S. Appl. No. 12/101,046, filed Apr. 10, 2008 and published as US 2008-0282990 A1 on Nov. 20, 2008.
Office Action dated May 23, 2011 in U.S. Appl. No. 12/101,046, filed Apr. 10, 2008 and published as US 2008-0282990 A1 on Nov. 20, 2008.
Office Action dated Oct. 12, 2011 in U.S. Appl. No. 12/101,046, filed Apr. 10, 2008 and published as US 2008-0282990 A1 on Nov. 20, 2008.
Office Action dated Jun. 18, 2013 in U.S. Appl. No. 12/101,046, filed Apr. 10, 2008 and published as US 2008/0282990 on Nov. 20, 2008.
Office Action dated Dec. 17, 2007 in U.S. Appl. No. 11/695,078, filed Apr. 2, 2007 and published as US 2007-0169714 A1 on Jul. 26, 2007 now abandoned.
Office Action dated Dec. 3, 2007 in U.S. Appl. No. 11/695,092, filed Apr. 2, 2007 and published as US 2007-0181070 A1 on Aug. 9, 2007 now abandoned.
Office Action dated Jun. 25, 2009 in U.S. Appl. No. 11/868,877, filed Oct. 8, 2007 and published as US 2008-0134984 A1 on Jun. 12, 2008 now abandoned.
Office Action dated Feb. 2, 2011 in U.S. Appl. No. 12/432,650, filed Apr. 29, 2009 and published as US 2009-0272329 A1 on Nov. 5, 2009.
Office Action dated Nov. 9, 2010 in U.S. Appl. No. 12/432,650, filed Apr. 29, 2009 and published as US 2009-0272329 A1 on Nov. 5, 2009.
Office Action dated Mar. 3, 2010 in U.S. Appl. No. 12/432,650, filed Apr. 29, 2009 and published as US 2009-0272329 A1 on Nov. 5, 2009.
Office Action dated Mar. 19, 2008 in U.S. Appl. No. 11/695,077, filed Apr. 2, 2007 and published as US 2007-0175399 A1 on Aug. 2, 2007, now abandoned.
Office Action dated Dec. 22, 2011 in U.S. Appl. No. 13/218,190, filed Aug. 25, 2011 and published as: 2011/0308475 on: Dec. 22, 2011.
Office Action dated Oct. 15, 2012 in U.S. Appl. No. 13/218,190, filed Aug. 25, 2011 and published as: 2011/0308475 on: Dec. 22, 2011.
Office Action dated Nov. 20, 2012 in U.S. Appl. No. 13/218,190, filed Aug. 25, 2011 and published as: 2011/0308475 on: Dec. 22, 2011.
Office Action dated Dec. 22, 2011 in U.S. Appl. No. 13/218,227, filed Aug. 25, 2011 and published as: 2011/0303158 on: Dec. 15, 2011 and now U.S. Pat. No. 8,171,887 on May 8, 2012.
Office Action dated Mar. 19, 2012 in U.S. Appl. No. 13/218,227, filed Aug. 25, 2011 and published as: 2011/0303158 on: Dec. 15, 2011 and now U.S. Pat. No. 8,171,887 on May 8, 2012.
Office Action dated Dec. 22, 2011 in U.S. Appl. No. 13/101,054, filed May 4, 2011 and published as: 2011/0297098 on: Dec. 8, 2011.
Office Action dated Nov. 7, 2012 in U.S. Appl. No. 13/101,054, filed May 4, 2011 and published as: 2011/0297098 on: Dec. 8, 2011.
Office Action dated May 24, 2013 in U.S. Appl. No. 13/594,703, filed Aug. 24, 2012 and published as: 2012/0318207 on: Dec. 20, 2012.
Office Action dated May 23, 2013 in U.S. Appl. No. 12/377,591, filed Feb. 13, 2009 and published as: 2011/0061600 on: Mar. 17, 2011.
Office Action dated Jun. 26, 2013 in U.S. Appl. No. 13/771,015, filed Feb. 19, 2013 and published as US 2013/0220229 on Aug. 29, 2013.
Office Action dated Aug. 2, 2013 in U.S. Appl. No. 13/775,080, filed Feb. 22, 2013 and published as US 2013/0160716 on Jun. 27, 2013.
Office Action dated Mar. 26, 2010 in U.S. Appl. No. 11/695,081, filed Apr. 2, 2007 and published as: 2007/0181074 on Aug. 9, 2007.
Office Action dated Oct. 13, 2010 in U.S. Appl. No. 11/695,081, filed Apr. 2, 2007 and published as: 2007/0181074 on Aug. 9, 2007.
Office Action dated Feb. 15, 2011 in U.S. Appl. No. 11/695,081, filed Apr. 2, 2007 and published as: 2007/0181074 on Aug. 9, 2007.
Office Action dated Nov. 9, 2007 in U.S. Appl. No. 11/695,082, filed Apr. 2, 2007 and published as: US2007/01755404 on Aug. 2, 2007 and now U.S. Pat. No. 7,874,268 on Jan. 25, 2011.
Office Action dated Jul. 18, 2008 in U.S. Appl. No. 11/695,082, filed Apr. 2, 2007 and published as: US2007/01755404 on Aug. 2, 2007 and now U.S. Pat. No. 7,874,268 on Jan. 25, 2011.
Office Action dated Apr. 1, 2009 in U.S. Appl. No. 11/695,082, filed Apr. 2, 2007 and published as: US2007/01755404 on Aug. 2, 2007 and now U.S. Pat. No. 7,874,268 on Jan. 25, 2011.
Office Action dated Dec. 15, 2009 in U.S. Appl. No. 11/695,082, filed Apr. 2, 2007 and published as: US2007/01755404 on Aug. 2, 2007 and now U.S. Pat. No. 7,874,268 on Jan. 25, 2011.
Office Action dated Sep. 16, 2010 in U.S. Appl. No. 11/695,082, filed Apr. 2, 2007 and published as: US2007/01755404 on Aug. 2, 2007 and now U.S. Pat. No. 7,874,268 on Jan. 25, 2011.
Office Action dated Jun. 22, 2009 in U.S. Appl. No. 11/695,084, filed Apr. 2, 2007 and published as: US2008/0236506 on Oct. 2, 2008 and now U.S. Pat. No. 7,734,381 on Jun. 8, 2009.
Office Action dated Dec. 14, 2009 in U.S. Appl. No. 11/695,084, filed Apr. 2, 2007 and published as: US2008/0236506 on Oct. 2, 2008 and now U.S. Pat. No. 7,734,381 on Jun. 8, 2009.
Office Action dated Feb. 22, 2010 in U.S. Appl. No. 11/695,084, filed Apr. 2, 2007 and published as: US2008/0236506 on Oct. 2, 2008 and now U.S. Pat. No. 7,734,381 on Jun. 8, 2009.
Office Action dated Apr. 7, 2011 in U.S. Appl. No. 12/794,654, filed Jun. 4, 2010 and now U.S. Pat. No. 7,970,495 on Jun 28, 2011 and now U.S. Pat. No. 7,970,495 on Jun. 28, 2011.
Office Action dated Apr. 2, 2010 in U.S. Appl. No. 11/695,079, filed Apr. 2, 2007 and published as US 2007-0169718 A1 on Jul. 26, 2007 and now U.S. Pat. No. 7,739,984 on Jun. 22, 2010.
Office Action dated Oct. 13, 2009 in U.S. Appl. No. 11/695,079, filed Apr. 2, 2007 and published as US 2007-0169718 A1 on Jul. 26, 2007 and now U.S. Pat. No. 7,739,984 on Jun. 22, 2010.
Office Action dated Jan. 16, 2013 in U.S. Appl. No. 12/614,291, filed Nov. 6, 2009 and published as US 2010-0242852 A1 on Sep. 30, 2010.
Office Action dated Aug. 10, 2012 in U.S. Appl. No. 12/614,291, filed Nov. 6, 2009 and published as US 2010-0242852 A1 on Sep. 30, 2010.
Office Action dated Dec. 9, 2011 in U.S. Appl. No. 12/614,291, filed Nov. 6, 2009 and published as US 2010-0242852 A1 on Sep. 30, 2010.
Office Action dated Dec. 26, 2007 in U.S. Appl. No. 11/695,086, filed Apr. 2, 2007 and published as US 2007-0181075 A1 on Aug. 9, 2007.
Office Action dated Sep. 1, 2011 in U.S. Appl. No. 11/695,087, filed Apr. 2, 2007 and published as US 2008-0078332 A1 on Apr. 3, 2008 and now U.S. Pat. No. 8,082,885 on Dec. 27, 2011.
Office Action dated May 11, 2010 in U.S. Appl. No. 11/695,087, filed Apr. 2, 2007 and published as US 2008-0078332 A1 on Apr. 3, 2008 and now U.S. Pat. No. 8,082,885 on Dec. 27, 2011.
Office Action dated Oct. 5, 2009 in U.S. Appl. No. 11/695,087, filed Apr. 2, 2007 and published as US 2008-0078332 A1 on Apr. 3, 2008 and now U.S. Pat. No. 8,082,885 on Dec. 27, 2011.

(56) References Cited

OTHER PUBLICATIONS

Office Action dated Sep. 18, 2013 in U.S. Appl. No. 13/775,080, filed Feb. 22, 2013 and published as US 2013/0160716 on Jun. 27, 2013.
Office Action dated Sep. 19, 2013 in U.S. Appl. No. 12/614,291, filed Nov. 6, 2009 and published as US 2010-0242852 on Sep. 30, 2010.
Office Action dated Oct. 18, 2013 in U.S. Appl. No. 13/270,165, filed Oct. 10, 2011 and published as US 2012-0085291 on Apr. 12, 2012.
Office Action dated Oct. 18, 2013 in U.S. Appl. No. 13/776,645, filed Feb. 25, 2013 and published as US 2013-0228134 on Sep. 5, 2013.
Office Action dated Nov. 26, 2013 in U.S. Appl. No. 12/377,591, filed Nov. 23, 2010 and published as US 2011-0061600 on Mar. 17, 2011.
Office Action dated Dec. 5, 2013 in U.S. Appl. No. 13/771,015, filed Feb. 19, 2013 and published as US 2013-0220229 on Aug. 29, 2013.
Office Action dated Jan. 3, 2014 in U.S. Appl. No. 13/594,703, filed Aug. 24, 2012 and published as US 2012-0318207 on Dec. 20, 2012.
Office Action dated Feb. 24, 2014 in U.S. Appl. No. 12/614,291, filed Nov. 6, 2009 and published as US 2010-0242852 on Sep. 30, 2010.
Office Action dated Mar. 6, 2014 in U.S. Appl. No. 12/101,046, filed Apr. 10, 2008 and published as US 2008/0282990 on Nov. 20, 2008.
Office Action dated May 6, 2014 in U.S. Appl. No. 13/270,165, filed Oct. 10, 2011 and published as US 2012-0085291 on Apr. 12, 2012.
Office Action dated May 16, 2014 in U.S. Appl. No. 13/775,080, filed Feb. 22, 2013 and published as US 2013/0160716 on Jun. 27, 2013.
Office Action dated Jun. 6, 2014 in U.S. Appl. No. 12/377,591, filed Nov. 23, 2010 and published as US 2011-0061600 on Mar. 17, 2011.
Office Action dated Jun. 18, 2014 in U.S. Appl. No. 13/771,015, filed Feb. 19, 2013 and published as US 2013-0220229 on Aug. 29, 2013.
Office Action dated Jun. 19, 2014 in U.S. Appl. No. 13/594,703, filed Aug. 24, 2012 and published as US 2012-0318207 on Dec. 20, 2012.
Office Action dated Jun. 20, 2014 in U.S. Appl. No. 13/776,645, filed Feb. 25, 2013 and published as US 2013-0228134 on Sep. 5, 2013.
Extended European Search Report dated Jul. 23, 2014 in European Application No. EP 07811401.4-1655, filed on Aug. 17, 2007 and published as EP 2 059 121 on May 20, 2009.
Office Action dated Feb. 26, 2015 in U.S. Appl. No. 13/931,336, filed Jun. 28, 2013 and published as US 2013-0284109 on Oct. 31, 2013.
Office Action dated Mar. 20, 2015 in U.S. Appl. No. 12/377,591, filed Nov. 23, 2010 and published as US 2011-0061600 on Mar. 17, 2011.
Office Action dated Apr. 20, 2015 in U.S. Appl. No. 12/101,046, filed Apr. 10, 2008 and published as US 2008/0282990 on Nov. 20, 2008.
Office Action dated May 20, 2015 in U.S. Appl. No. 13/594,703, filed Aug. 24, 2012 and published as US 2012-0318207 on Dec. 20, 2012.
Office Action dated May 26, 2015 in U.S. Appl. No. 13/776,645, filed Feb. 25, 2013 and published as US 2013-0228134 on Sep. 5, 2013.
Office Action dated May 28, 2015 in U.S. Appl. No. 13/270,165, filed Oct. 10, 2011 and published as US 2012-0085291 on Apr. 12, 2012.
Office Action dated Jul. 20, 2015 in U.S. Appl. No. 13/775,080, filed Feb. 22, 2013 and published as US 2013/0160716 on Jun. 27, 2013.
Office Action dated Aug. 10, 2015 in U.S. Appl. No. 13/776,671, filed Feb. 25, 2013 and published as US 2014-0123906 on May 8, 2014.
Office Action dated Oct. 15, 2015 in U.S. Appl. No. 13/775,080, filed Feb. 22, 2013 and published as US 2013/0160716 on Jun. 27, 2013.
Office Action dated Oct. 27, 2015 in U.S. Appl. No. 13/931,336, filed Jun. 28, 2013 and published as US 2013-0284109 on Oct. 31, 2013.
Office Action dated Jan. 15, 2015 in U.S. Appl. No. 13/775,080, filed Feb. 22, 2013 and published as US 2013-0160716 on Jun. 27, 2013.
Office Action dated Feb. 20, 2015 in U.S. Appl. No. 13/771,015, filed Feb. 19, 2013 and published as US 2013-0220229 on Aug. 29, 2013.
International Search Report and Written Opinion dated Nov. 11, 2014 in International Application No. PCT/US2014/044668, filed on Jun. 27, 2014 and published as WO 2015/002843 on Jan. 8, 2015.
Office Action dated Dec. 23, 2014 in U.S. Appl. No. 13/776,671, filed Feb. 25, 2013 and published as US 2014-0123906 on May 8, 2014.
Office Action dated Aug. 19, 2016 in U.S. Appl. No. 13/270,165, filed Oct. 10, 2011 and published as US 2012-0085291 on Apr. 12, 2012.
Office Action dated Sep. 21, 2016 in U.S. Appl. No. 13/931,336, filed Jun. 28, 2013 and published as US 2013-0284109 on Oct. 31, 2013.
Office Action dated Aug. 12, 2016 in U.S. Appl. No. 13/776,645, filed Feb. 25, 2013 and published as US 2013-0228134 on Sep. 5, 2013.
International Preliminary Report on Patentability dated Jan. 14, 2016 in International Application No. PCT/U82014/044668, filed on June 27, 2014 and published as WO 2015/002843 on Jan. 8, 2015.
Office Action dated Jan. 25, 2016 in U.S. Appl. No. 13/776,645, filed Feb. 25, 2013 and published as US 2013-0228134 on Sep. 5, 2013.
Office Action dated Jan. 25, 2016 in U.S. Appl. No. 13/270,165, filed Oct. 10, 2011 and published as US 2012-0085291 on Apr. 12, 2012.
Office Action dated Mar. 16, 2016 in U.S. Appl. No. 13/931,336, filed Jun. 28, 2013 and published as US 2013-0284109 on Oct. 31, 2013.
Office Action dated Mar. 18, 2016 in U.S. Appl. No. 13/776,671, filed Feb. 25, 2013 and published as US 2014-0123906 on May 8, 2014.
International Search Report and Written Opinion dated Apr. 5, 2016 in International Application No. PCT/US2015/040647, filed on Jul. 15, 2015 and published as WO 2016/014319 on Jan. 28, 2016.
Office Action dated May 18, 2016 in U.S. Appl. No. 13/594,703, filed Aug. 24, 2012 and published as US 2012-0318207 on Dec. 20, 2012.
Office Action dated Jul. 29, 2016 in U.S. Appl. No. 15/004,236, filed Jan. 22, 2016.
Office Action dated Mar. 22, 2017 in U.S. Appl. No. 13/776,671, filed Feb. 25, 2013 and published as US 2014-0123906 on May 8, 2014.
Office Action dated Mar. 23, 2017 in U.S. Appl. No. 15/004,236, filed Jan. 22, 2016 and published as US 2016-0270365 on Sep. 22, 2016.
Extended European Search Report dated Feb. 10, 2017 in European Patent Application No. 14819324.6, filed on Jun. 27, 2014 and published as EP 3 016 509 on May 11, 2016.
Office Action dated Oct. 26, 2016 in U.S. Appl. No. 13/776,671, filed Feb. 25, 2013 and published as US 2014-0123906 on May 8, 2014.
Office Action dated Dec. 19, 2016 in U.S. Appl. No. 13/594,703, filed Aug. 24, 2012 and published as US 2012-0318207 on Dec. 20, 2012.
Office Action dated Jan. 5, 2017 in U.S. Appl. No. 13/931,336, filed Jun. 28, 2013 and published as US 2013-0284109 on Oct. 31, 2013.
International Preliminary Report on Patentability dated Feb. 9, 2017 in International Application No. PCT/US2015/040647, filed on Jul. 15, 2015 and published as WO 2016/014319 on Jan. 28, 2016.
Office Action dated Jun. 2, 2017 in U.S. Appl. No. 13/931,336, filed Jun. 28, 2013 and published as US 2013-0284109 on Oct. 31, 2013.

(56) References Cited

OTHER PUBLICATIONS

Office Action dated Jun. 14, 2017 in U.S. Appl. No. 13/594,703, filed Aug. 24, 2012 and published as US 2012-0318207 on Dec. 20, 2012.
Office Action dated Aug. 21, 2017 in U.S. Appl. No. 13/776,671, filed Feb. 25, 2013 and published as US 2014-0123906 on May 8, 2014.
Office Action dated Sep. 15, 2017 in U.S. Appl. No. 13/931,336, filed Jun. 28, 2013 and published as US 2013-0284109 on Oct. 31, 2013.
Office Action dated Sep. 21, 2017 in U.S. Appl. No. 15/625,524, filed Jun. 16, 2017.
Office Action dated Oct. 6, 2017 in U.S. Appl. No. 15/625,524, filed Jun. 16, 2017.
Office Action dated Nov. 3, 2017 in U.S. Appl. No. 13/594,703, filed Aug. 24, 2012 and published as US 2012-0318207 on Dec. 20, 2012.
Extended European Search Report dated Nov. 29, 2017 in European Patent Application No. 11833214.7, filed on Oct. 10, 2011 and published as EP 2 627 169 on Aug. 21, 2013.
Office Action dated Dec. 21, 2017 in U.S. Appl. No. 15/625,524, filed Jun. 16, 2017 and published as US 2017/0339917 on Nov. 30, 2017.
Extended European Search Report dated Feb. 22, 2018 in European Patent Application No. 09825518.5, filed on Nov. 6, 2009.
Office Action dated Apr. 18, 2018 in U.S. Appl. No. 13/931,336, filed Jun. 28, 2013 and published as US 2013-0284109 on Oct. 31, 2013.
Office Action dated Apr. 26, 2018 in U.S. Appl. No. 13/776,671, filed Feb. 25, 2013 and published as US 2014-0123906 on May 8, 2014.
Office Action dated Oct. 26, 2018 in U.S. Appl. No. 13/931,336, filed Jun. 28, 2013 and published as US 2013-0284109 on Oct. 31, 2013.
Office Action dated Dec. 3, 2018 in U.S. Appl. No. 13/776,671, filed Feb. 25, 2013 and published as US 2014-0123906 on May 8, 2014.
Office Action dated Dec. 4, 2018 in U.S. Appl. No. 13/594,703, filed Aug. 24, 2012 and published as US 2012-0318207 on Dec. 20, 2012.
Office Action dated Dec. 19, 2018 in U.S. Appl. No. 13/931,336, filed Jun. 28, 2013 and published as US 2013-0284109 on Oct. 31, 2013.
Office Action dated Jan. 24, 2019 in U.S. Appl. No. 15/842,084, filed Dec. 14, 2017 and published as US 2018-0242551 on Aug. 30, 2018.
Office Action dated Jun. 18, 2018 in U.S. Appl. No. 13/594,703, filed Aug. 24, 2012 and published as US 2012-0318207 on Dec. 20, 2012.
Office Action dated Jun. 19, 2019 in U.S. Appl. No. 13/594,703, filed Aug. 24, 2012 and published as US 2012-0318207 on Dec. 20, 2012.

SECTION A-A

FIG. 4A
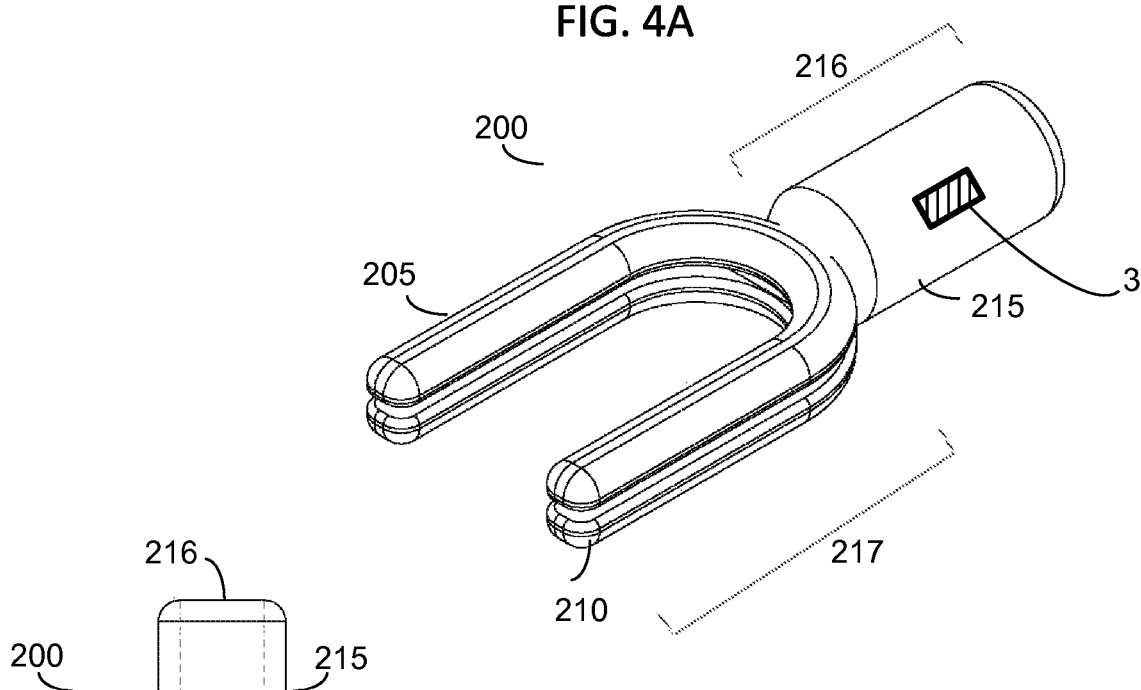
FIG. 4B
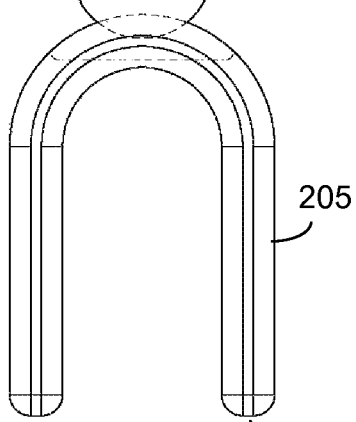
FIG. 4D
FIG. 4C
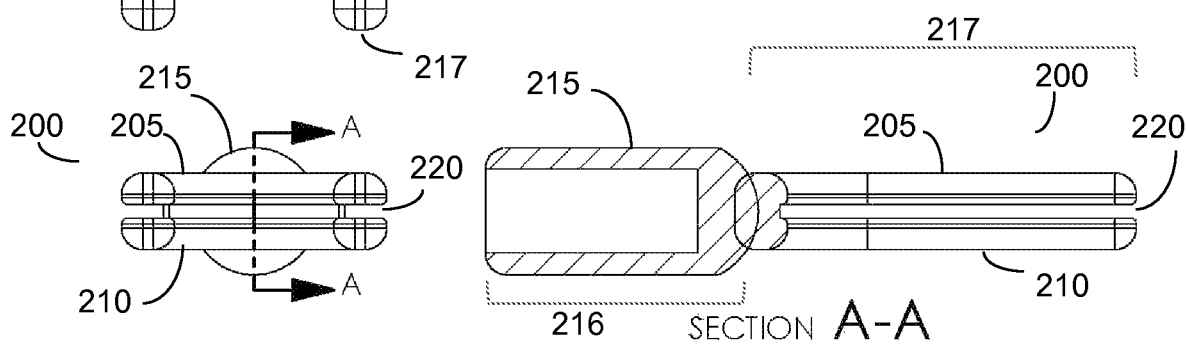

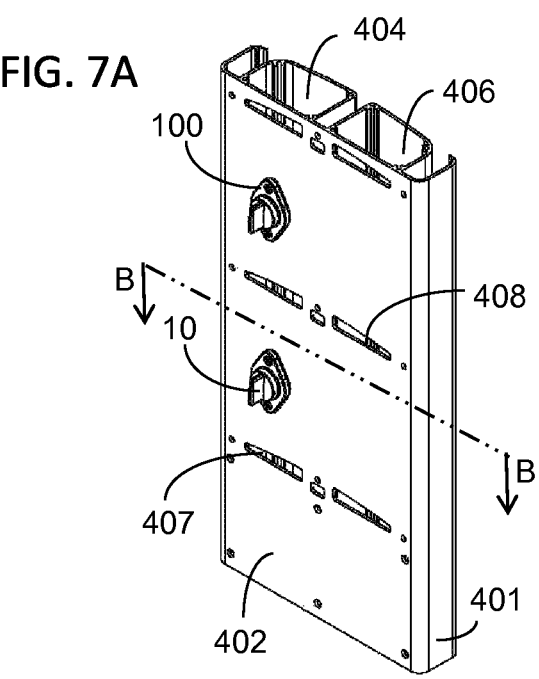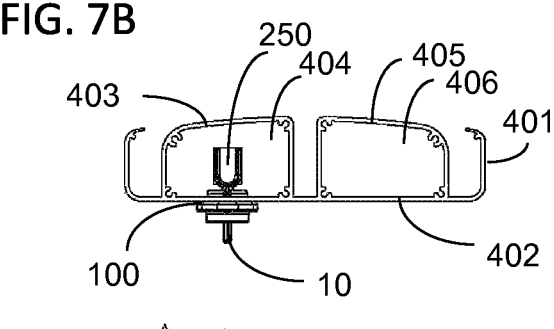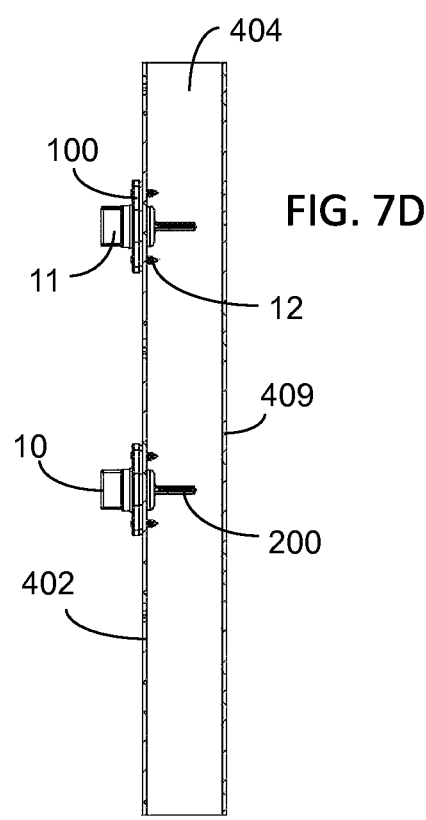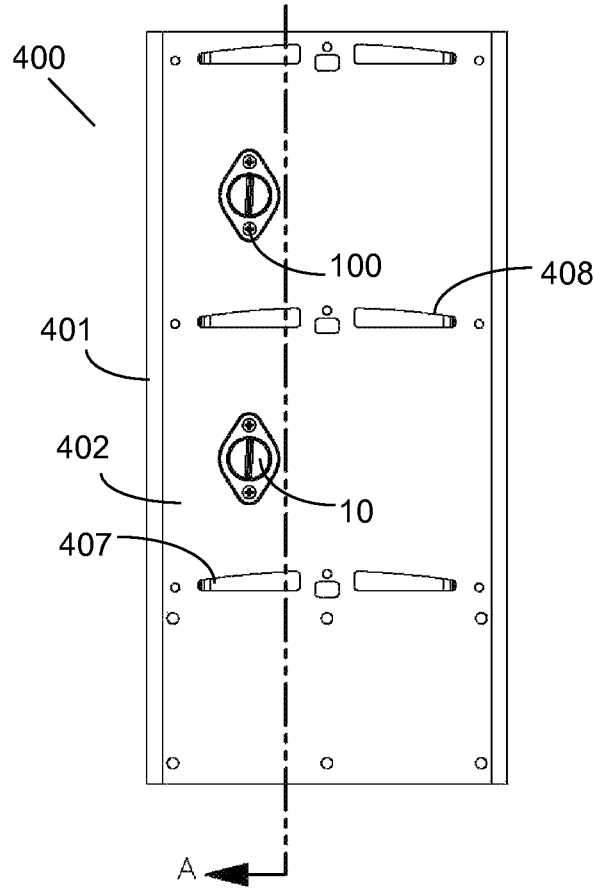

CAGE RACK MONITORING APPARATUS AND METHODS

RELATED PATENT APPLICATION(S)

This application claims the benefit of U.S. Provisional Application No. 61/841,731, filed Jul. 1, 2013, entitled "Cage Rack Monitoring Apparatus and Methods", naming Dee L. Conger et al. as inventors.

The foregoing patent application is incorporated herein by reference in its entirety.

FIELD

The technology relates in part to the field of animal husbandry and to animal containment.

BACKGROUND

Animal containment systems are utilized in a variety of applications, such as for animal transportation, breeding and maintenance. Animals contained in the systems often are laboratory animals such as rodents, and such animals often are contained in a vivarium. Containment systems may comprise animal cages in which the animals are housed and a rack unit onto which cages are mounted. Animals contained in such systems can emit several gaseous, biological and particulate contaminates, including pathogens, which can present a health risks to housed animals and humans.

SUMMARY

Provided in some embodiments is a system for monitoring contaminants in a rodent containment cage rack, comprising a contaminant sampling element (CSE) in effective connection with a rack component, where the CSE comprises CSE identifying information, a reader in effective connection with a rack component and configured to detect the CSE identifying information and one or more components coupled to the reader, which one or more components are configured to receive the CSE identifying information from the reader and which utilize the CSE identifying information to perform one or more contaminant monitoring operations.

Also provided herein, in certain embodiments, is a contaminant sampling element (CSE) comprising a first and second portion, the first portion comprises a sampling element, the second portion comprises an identifier, where the first and second portions do not overlap.

Also provided herein, in certain embodiments, is a method for monitoring contaminants in a rodent containment cage rack comprising (a) detecting CSE identifying information on a component of a rodent containment cage rack and (b) performing one or more contaminant monitoring operations utilizing the CSE identifying information detected in (a).

Also provided herein, in some embodiments, is a method for monitoring contaminants in a rack comprising, (a) providing a contaminant sampling element (CSE) in effective connection with a component of a rack; wherein the CSE comprises CSE identifying information comprising an identifier configured for detection by a reader, (b) detecting the identifier, thereby providing CSE identifying information, and (c) providing notification or confirmation of the presence of the CSE in effective connection with the component of the rodent containment cage rack according to the detecting in (b).

Certain embodiments are described further in the following description, examples, claims and drawings.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

FIG. 1A shows an exploded perspective view of a CSE. FIG. 1B shows top view of a CSE. FIG. 1C shows a perspective view of a CSE. FIG. 1D shows a front view thereof. FIG. 1E shows a side view.

FIG. 2A show a back perspective view thereof. FIG. 2B shows a side view thereof. FIG. 2C shows a back view thereof. FIG. 2D shows a cross section taken along lines A-A of FIG. 2C.

FIG. 3A shows a back perspective view thereof. FIG. 3B shows a side view thereof. FIG. 3C shows a front view thereof. FIG. 3D shows another side view thereof.

FIGS. 4A-4D show an embodiment of a retaining arm of a CSE (e.g., a CSE assembly). FIG. 4A shows a top perspective view thereof. FIG. 4B shows a bottom view thereof. FIG. 4C shows a distal view thereof. FIG. 4D shows a cross section taken along lines A-A of FIG. 4C.

FIG. 5A shows a top perspective view thereof. FIG. 5B shows a top (proximal) view thereof. FIG. 5C shows a side view thereof. FIG. 5D shows a cross section taken along lines A-A of FIG. 5C. FIG. 5E shows a bottom (distal) view thereof.

FIG. 6A shows a perspective view thereof. FIG. 6B shows a top view thereof. FIG. 6C shows a side view thereof. FIG. 6D shows a side view thereof.

FIGS. 7A-7D show an embodiment of a plenum comprising a two CSEs (e.g., a CSE assembly). FIG. 7A shows a perspective view thereof. FIG. 7B shows a cross section taken along lines B-B of FIG. 7B. FIG. 7C shows a side view thereof. FIG. 7D shows a cross section taken along lines A-A of FIG. 7C.

FIG. 8A shows a back (distal) perspective view of a CSE assembly. FIG. 8B shows a side view of a CSE assembly. FIG. 8C shows a front (proximal) view thereof. FIG. 8D shows a cross section taken along lines A-A of FIG. 8C.

FIG. 9A shows a top perspective view thereof. FIG. 9B shows a top (proximal) view thereof. FIG. 9C shows a side view thereof. FIG. 9D shows a cross section taken along lines A-A of FIG. 9C.

DETAILED DESCRIPTION

Figure 1A:
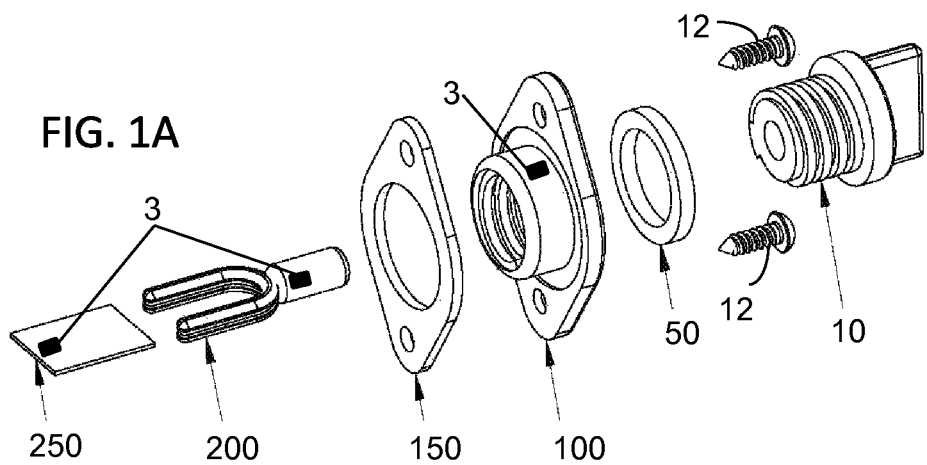
FIG. 1A-1E show an embodiment of a contaminant sampling element (CSE) (e.g., a CSE assembly).
Figure 1B:
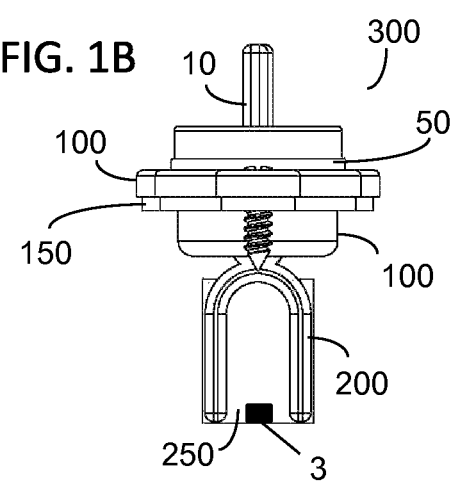
Figure 1C:
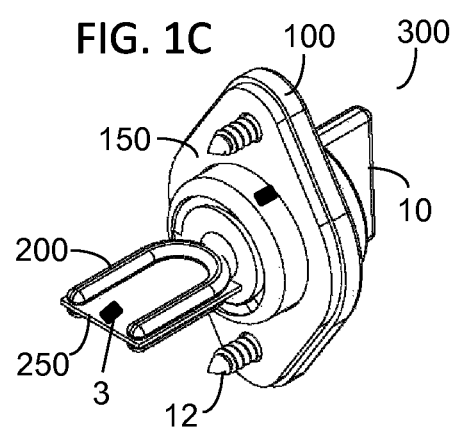
Figure 1D:
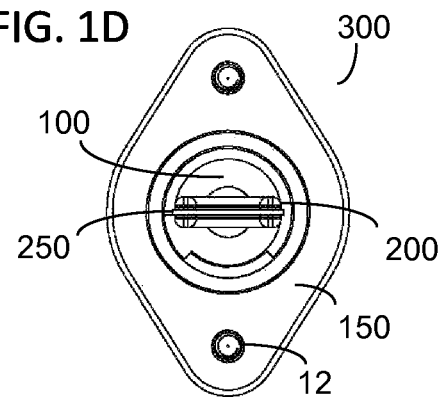
Figure 1E:
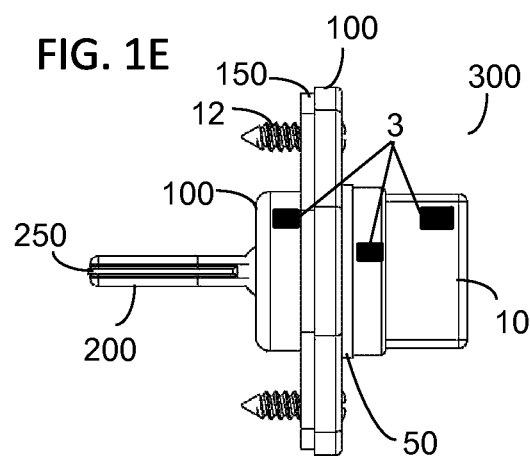
Figure 2A:
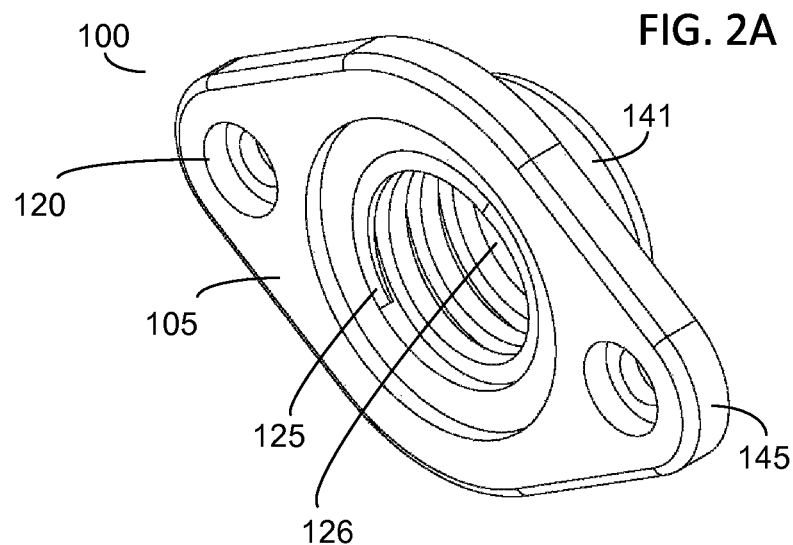
FIGS. 2A-2D show an embodiment of a housing of a CSE (e.g., a CSE assembly).
Figure 2B:
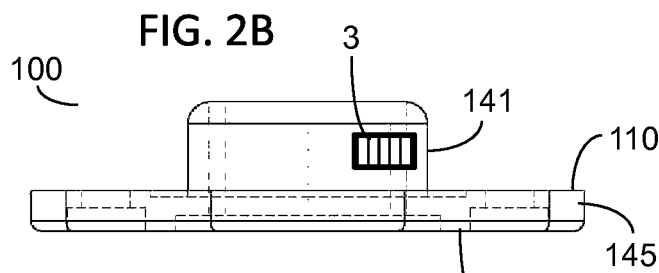
Figure 2C:
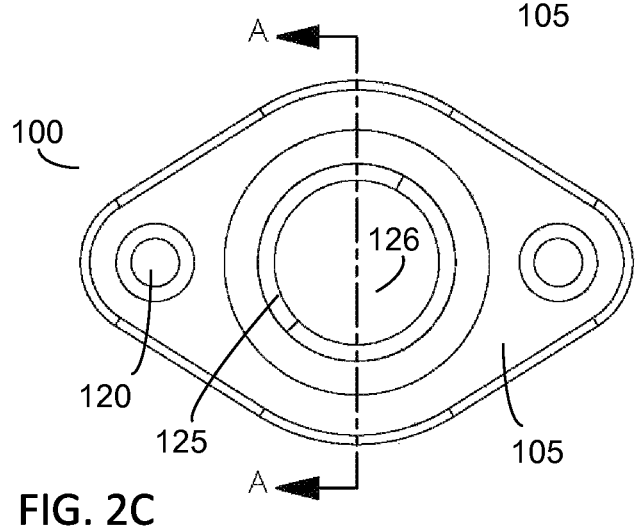
Figure 2D:
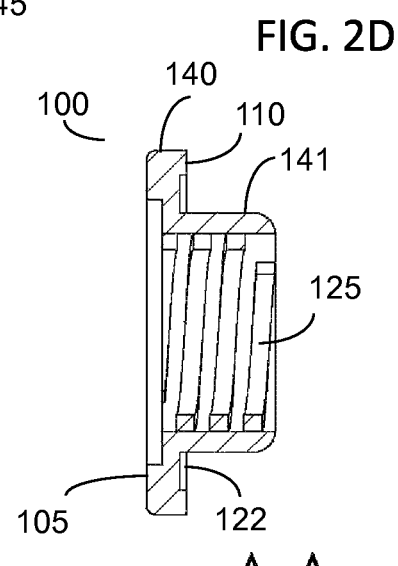
Figure 3A:
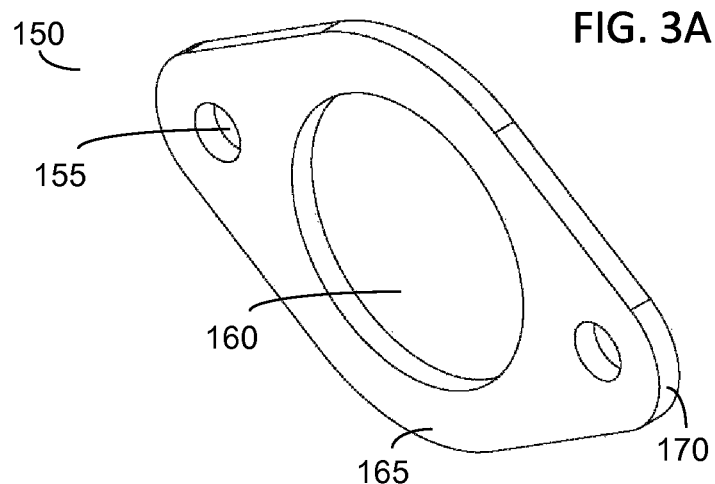
FIGS. 3A-3D show an embodiment of a gasket of a CSE (e.g., a CSE assembly).
Figure 3B:
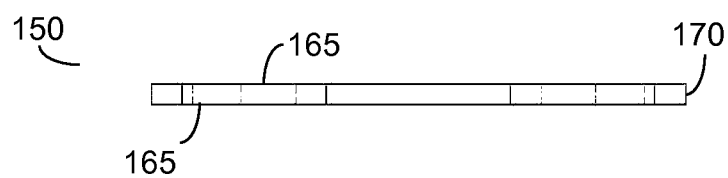
Figure 3C:
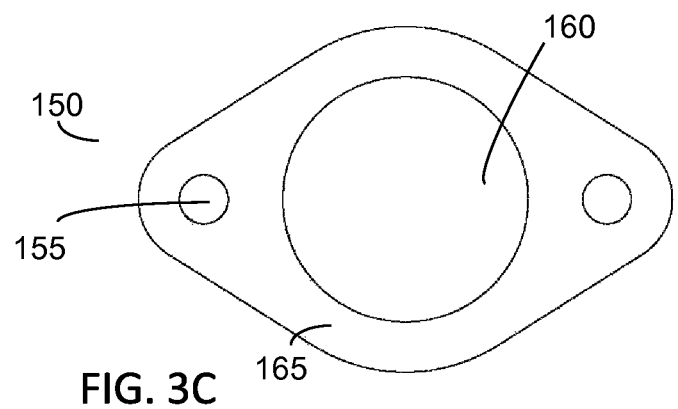
Figure 3D:
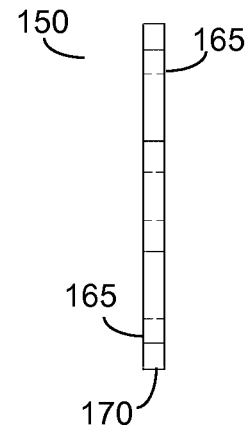
Figure 5A:
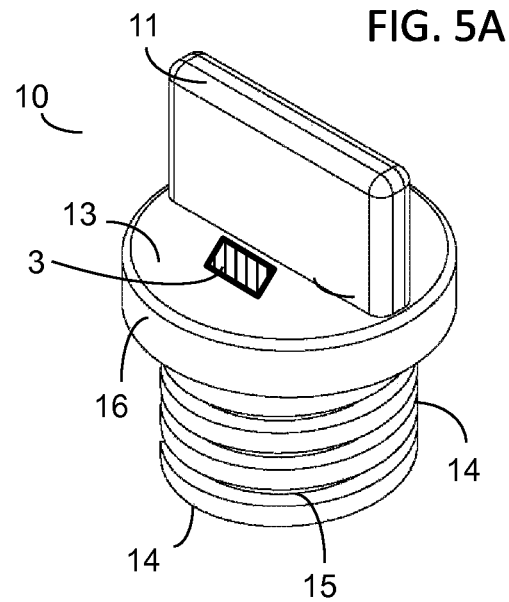
FIGS. 5A-5E show an embodiment of a plug of a CSE (e.g., a CSE assembly).
Figure 5B:
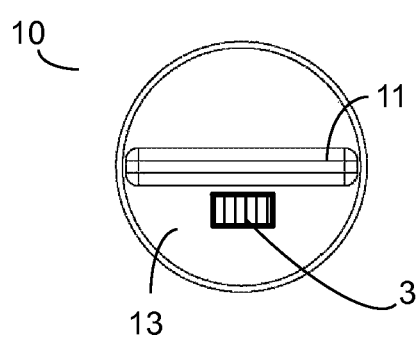
Figure 5C:
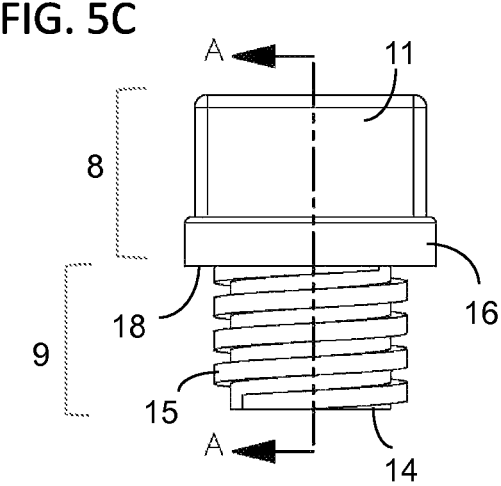
Figure 5D:
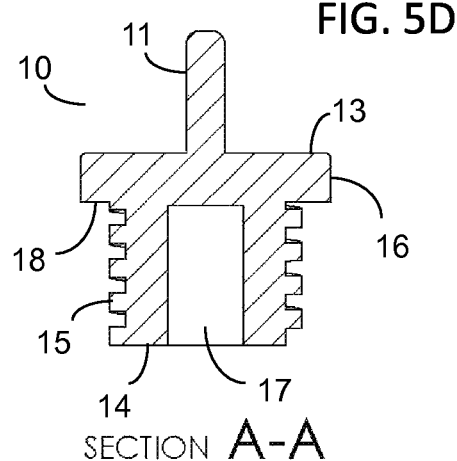
Figure 5E:
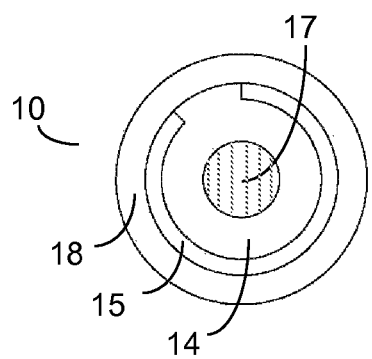
Figure 6A:
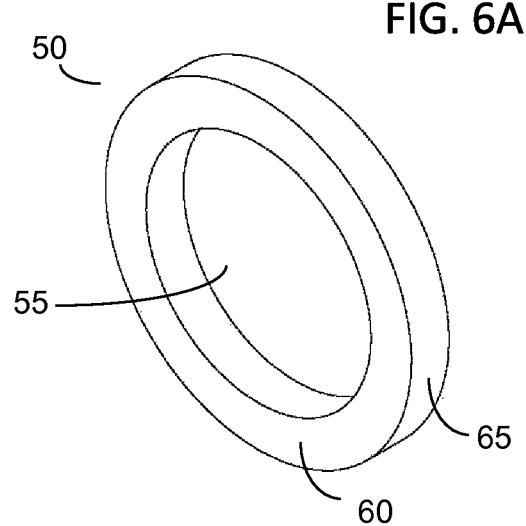
FIGS. 6A-6D show an embodiment of a washer of a CSE (e.g., a CSE assembly).
Figure 6B:
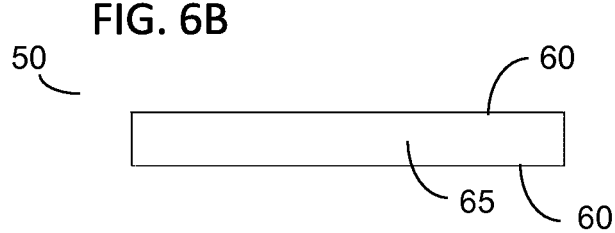
Figure 6C:
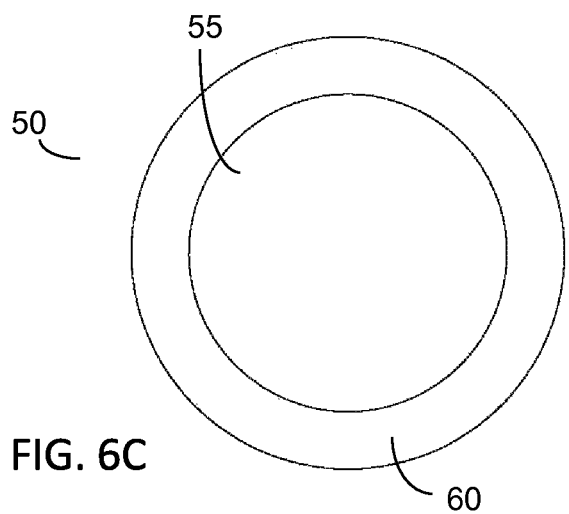
Figure 6D:
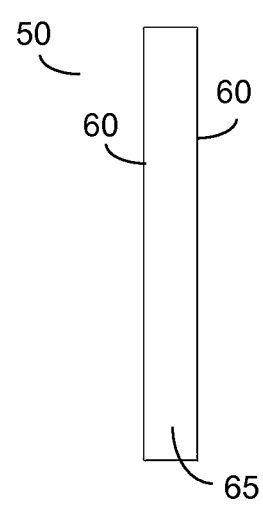
Figure 8A:
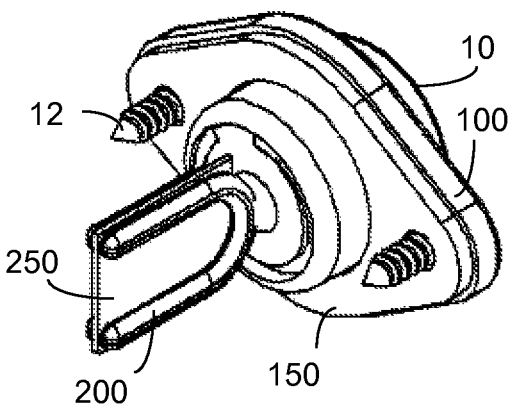
FIGS. 8A-8D show an embodiment of a CSE (e.g., a CSE assembly).
Figure 8B:
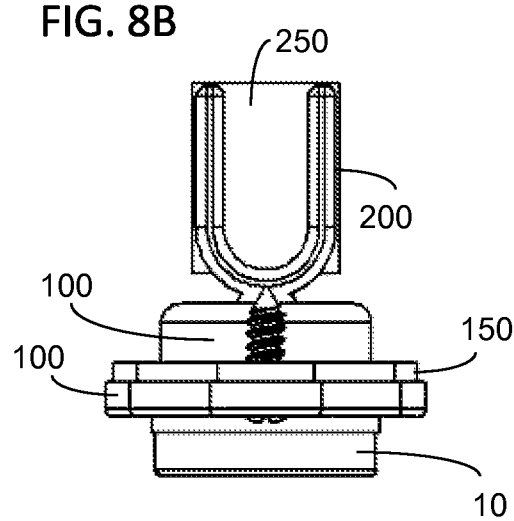
Figure 8C:
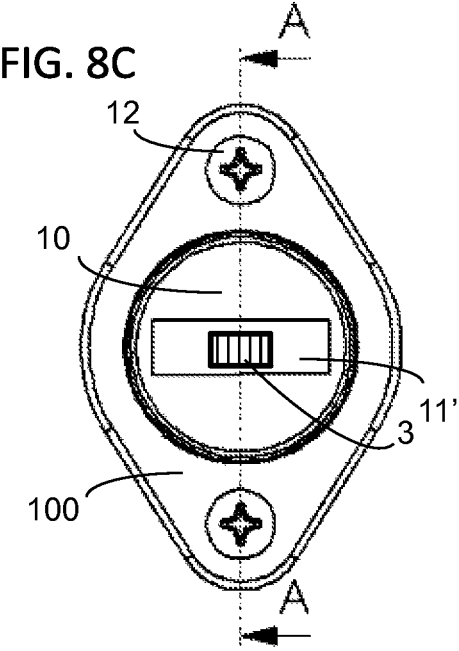
Figure 8D:
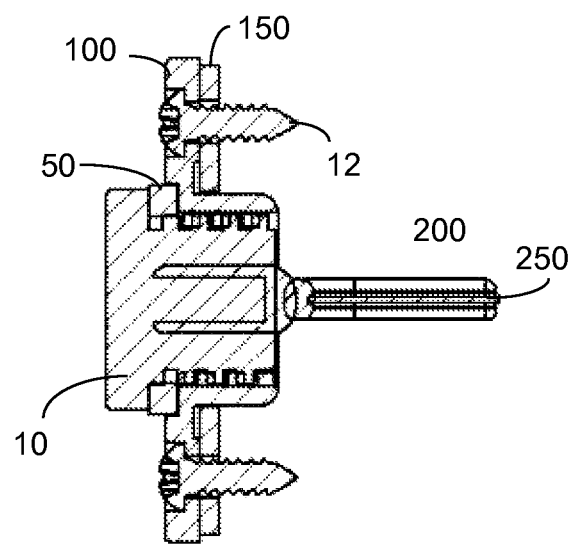
Figure 9A:
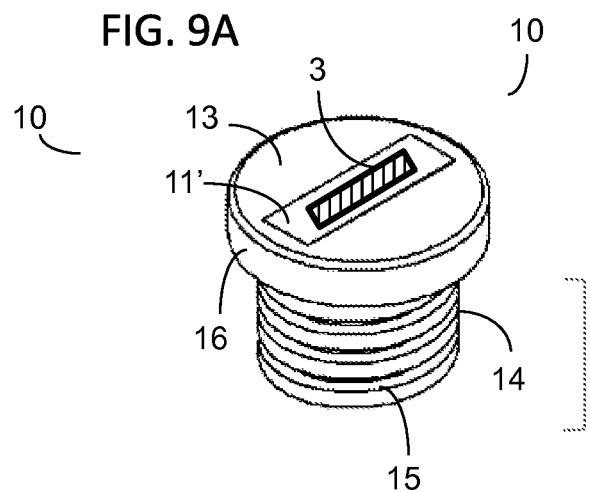
FIGS. 9A-9D show an embodiment of a plug of a CSE (e.g., a CSE assembly).
Figure 9B:
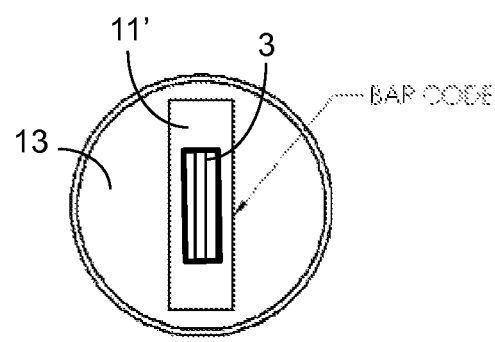
Figure 9C:
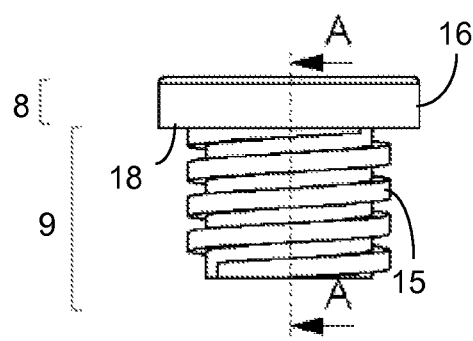
Figure 9D:
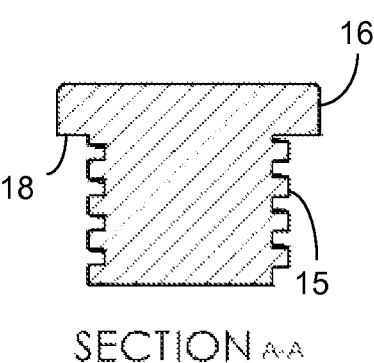
Figure 10:
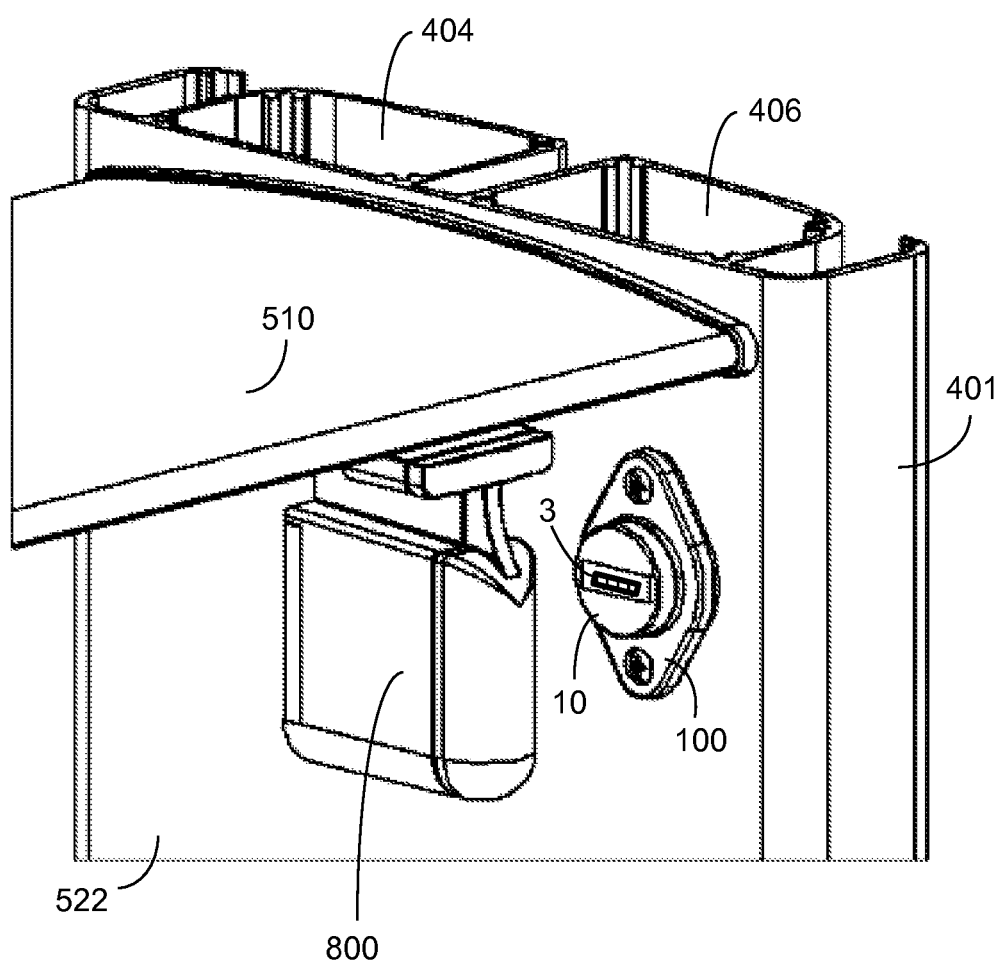
FIG. 10 shows an embodiment of a portion of a rack assembly comprising a vertical and a horizontal plenum support member, a reader and a CSE.
Figure 11B:
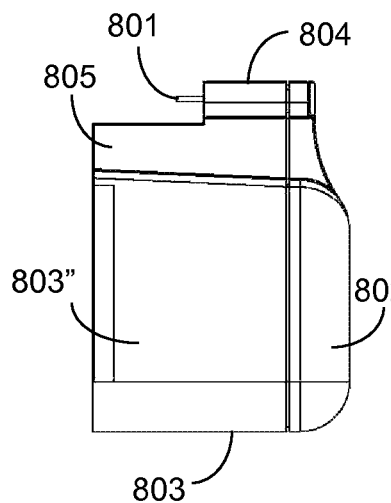
FIGS. 11A-11D show an embodiment of a reader.
Figure 11C:
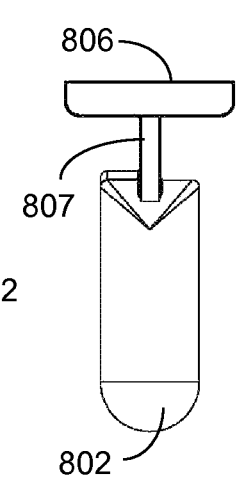
Figure 11D:
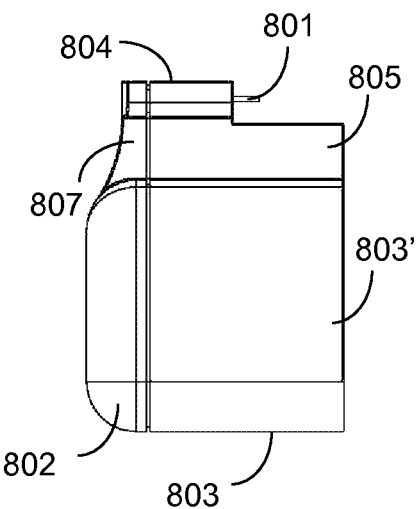
Figure 11A:
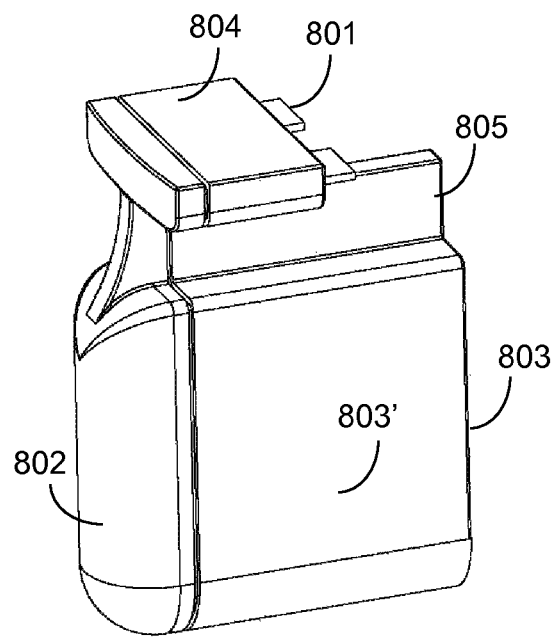
Figure 12:
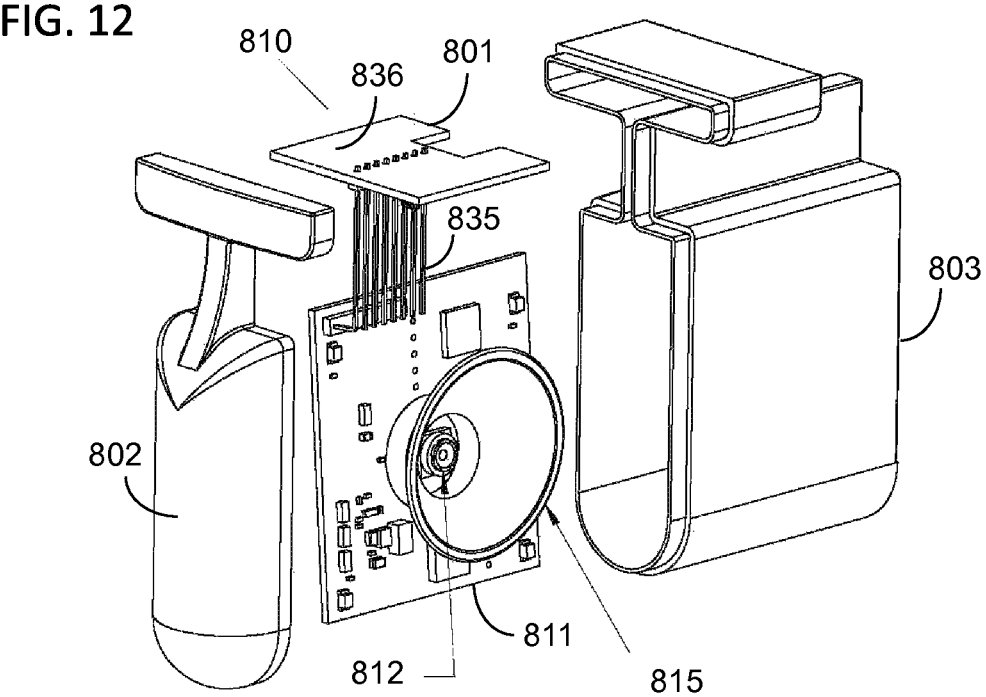
FIG. 12 shows an exploded view of an embodiment of a reader.
Figure 13:
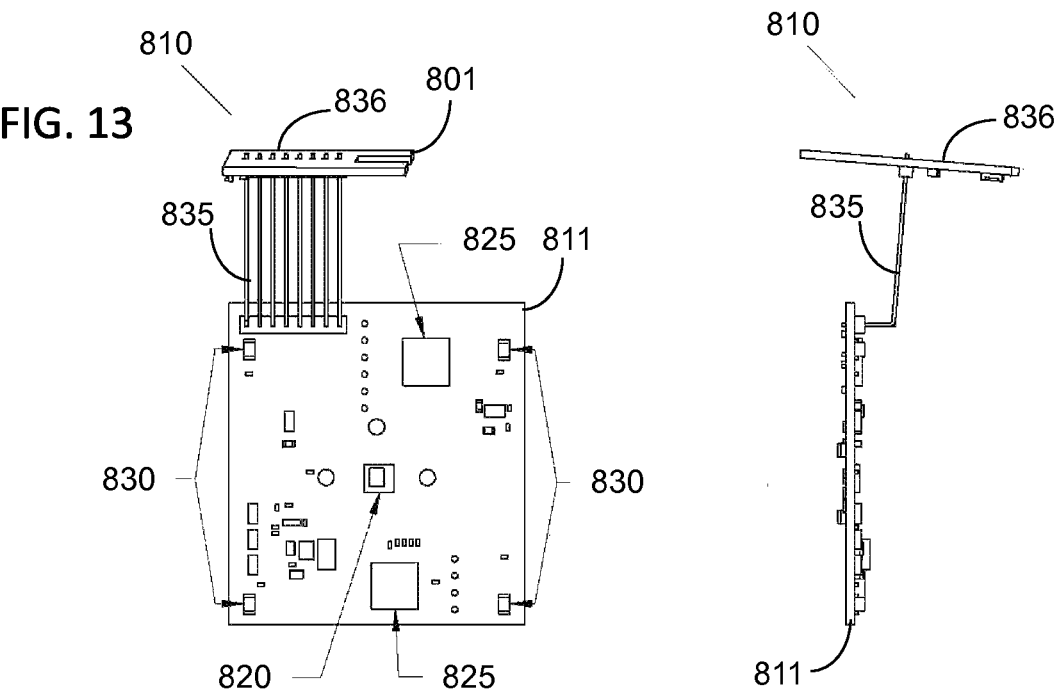
FIG. 13 shows an embodiment of a reader board assembly.

Described herein are embodiments of methods, devices and systems for monitoring contaminants in animal containment cages, racks and cage systems. In some embodiments methods, devices and systems are presented for monitoring, detecting and tracking devices (e.g., removable devices) used for contaminant detection.

Contaminant Sampling Element (CSE)

In some embodiments a contaminant sampling element (CSE) is a suitable device configured to collect, retain and/or detect one or more contaminants in a rack. A CSE can be located at any suitable location on a rack. In some embodiments a CSE, or a portion thereof, is located within an air flow (e.g., within an air duct or plenum) of a rack or rack system. A CSE can comprise a single component or can comprise multiple components and/or portions. In some embodiments a CSE is an assembly (e.g., a CSE assembly) of two or more components or parts. In some embodiments a portion of a CSE is configured to hold, retain and/or support a sampling element 250 and/or a retaining arm 200. In some embodiments a portion of a CSE comprises a sampling element 250 and/or a retaining arm.

In some embodiments, a first portion of a CSE comprises a sampling element 250. In certain embodiments a sampling element is configured to collect, retain and/or detect one or more contaminants. A sampling element can have any suitable configuration (e.g., cone shaped (e.g., shaped like an air sock), box or cube shaped, pyramid shaped, spherical, flat or planar (e.g., circular, elliptical, rectangular, triangular, pentagonal, hexagonal, and the like), the like or a combination thereof. In some embodiments of a 3 dimensional configuration of a sampling element, the sampling element comprises one or more open sides.

A sampling element can comprise any material or combination thereof that is capable of collecting, retaining and/or detecting a contaminant. In some embodiments a sampling element comprises a suitable tape, membrane, gel, liquid, capture agent, filter or a combination thereof. In some embodiments a sampling element comprises a suitable tape. A tape often comprises a substrate (e.g., a suitable support (e.g., a fiber support, paper support, card board support, plastic support, wood support, metal support, the like) comprising a suitable adhesive (e.g., glue, cement, mucilage, paste, wax, the like or combinations thereof) configured to capture particulate matter and/or contaminants from air (e.g., moving air). Non-limiting examples of tape include box tape, sealing tape, double-sided tape, duct tape, electrical tape, filament tape, gaffer's tape, hockey tape, masking tape, medical tape, pressure sensitive tape, slug tape, spike tape, surgical tape, the like or combinations thereof. In some embodiments a sampling element comprises a suitable membrane. A membrane often comprises a suitable support. In some embodiments a membrane comprises charged elements (e.g. charged molecules, charged functional groups) configured to bind macromolecules (e.g., nucleic acids, protein, carbohydrates, or lipids), viruses, parasites, bacteria, or portions thereof. Non-limiting examples of a membrane includes polyvinylidene difluoride (PVDF), nitrocellulose, modified or unmodified nylon membranes (e.g., nylon 66), and the like. In some embodiments a sampling element comprises a suitable gel. In certain embodiments a gel comprises a suitable matrix (e.g., agar, agarose, polyacrylamide, gelatin, methyl cellulose, a thickening agent, the like or combinations thereof). In some embodiments a gel comprises nutrients (e.g., a nutrient medium, a growth medium). In some embodiments a sampling element comprises a suitable capture agent. Non-limiting examples of a capture agent includes antimicrobial peptides; antibodies or antibody fragments (e.g., Fabs, Fvs, (e.g., antibodies that bind a pathogen, or portion thereof)); a nucleic acid or polynucleotide, a carbohydrate, a protein (e.g., Toll-like receptors (e.g., TLR2, TLR4), an endotoxin, lipid A or LPS binding proteins (e.g., horseshoe crab factors A, B, C, D, E, F and G, lipopolysaccharide-binding protein, and the like), a bactericidal permeability-increasing protein (BPI), CD14, MD-2); the like, portions thereof or combinations thereof. In some embodiments a sampling element comprises a suitable filter. Non-limiting examples of a filter include fiber filters, paper filters, a suitable air filter (e.g., HEPA (High Efficiency Particulate Air) filters), plastic filters (e.g., spun plastic, polymer threads), metal filters, the like or combinations thereof. A filter can comprise a suitable material, non-limiting examples of which include paper, fiberglass, foam, cotton, nylon, the like or combinations thereof. In some embodiments a sampling element comprises a suitable coating. A tape, membrane, gel, liquid, capture agent, filter, and/or a portion thereof can comprise a coating. A coating can comprise a suitable hydrophobic substance. Non-limiting examples of a hydrophobic substance include polyethylene glycols (e.g., PEG-4, PEG-6, PEG-7, PEG-8, PEG-9, PEG-10, PEG-12, PEG-14, PEG-10 and PEG-12, PEG-20, PEG-32, PEG-40, PEG-45, PEG-55, PEG-60, PEG-75, PEG-90, PEG-100, polyglycol 400, polyglycol 600, polyglycol 3000, polyglycol 4000, the like, derivative thereof and combinations thereof); waxes (e.g., animal, vegetable, mineral and synthetic waxes, microcrystalline waxes, macrocrystalline waxes, paraffins (e.g., solid paraffins), ozocerite, montan wax, fischer-tropsch waxes, polyolefin waxes, (e.g. polybutylene), bees wax, wool wax (lanolin), wool wax alcohol, candelilla wax, carnauba wax, Japan wax, hardened fats, fatty acid esters, fatty acid glycerides, the like, derivative thereof and combinations thereof); oils (e.g., vegetable (e.g., sunflower oil, coconut oil, castor oil, lanolin oil, jojoba oil, corn oil and soybean oil), animal oils and/or fats, mineral oils (e.g., Paraffinum liquidum), silicone oils or their mixtures (e.g., polydimethylsiloxanes, phenylated silicones, polyphenylmethylsiloxanes, phenyltrimethicones, Poly(C1-C20)-alkylsiloxanes, alkylmethylsiloxanes), hydrocarbon oils (e.g., paraffin or isoparaffin oils, squalane, oils from fatty acids and polyols), triglycerides; lecithin or a phospholipid or a derivative thereof such as an ester, amide or salt; C10 to C22 carboxylic acids (i.e., fatty acids) which may be linear or branched, saturated or unsaturated or a derivative thereof such as an ester, amide or a salt; the like, derivatives and/or combinations thereof. In some embodiments a coating comprises hydrophobic amino acids, hydrophobic peptides, hydrophobic proteins, the like, and/or combinations thereof. In some embodiments a coating comprises polyvinylpyrrolidone (PVP), polyvinyl acetate (PV) and/or copolymers thereof. In certain embodiments a coating comprises a suitable carbohydrate or sugar (e.g., fructose, glucose, saccharose, melezitose, trehalose and trehalulose). In some embodiments a coating comprises rosin, glue, a gum, a suitable surfactant or detergent, the like or combinations thereof.

In some embodiments a sampling element comprises a detector. Often a detector is configured to detect the presence, absence and/or amount of a contaminant. In some embodiments a detector is in effective communication with a rack component. In some embodiments a detector can detect the presence, absence and/or amount of a contaminant in real time. In certain embodiments a detector is not removed from a rack for testing. In some embodiments a detector comprises a dynamic sampling element. A dynamic sampling element can provide data and/or information to a rack system during or after a contaminant is detected without being removed from a rack. In some embodiments a detector can detect a contaminant and provide data and/or information to a rack component and/or user. A detector can comprise a suitable configuration. In some embodiments a detector comprises a lab-on-a-chip configured to detect one or more air born pathogens. In some embodiments a detector comprises a microcantilever. Sometimes a detector comprises a chemically reactive substance (e.g., a chemically reactive paper). In certain embodiments a detector comprises an optical detector in communication with a rack component.

In some embodiments a CSE, or a portion thereof, comprises a feature for connecting a sampling element to a rack component and/or to a portion of a CSE. In some embodiments a CSE comprises a feature for holding, retaining and/or positioning a sampling element on or within a rack component. In some embodiments a feature for connecting, holding, retaining and/or positioning a sampling element is a retaining arm 200. In certain embodiments, a retaining arm is configured to hold, retain and/or support a sampling element (e.g., 250). Any suitable configuration of a retaining arm can be used to hold, retain and/or support a sampling element. A retaining arm sometimes comprises a distal portion 217. In some embodiments a distal portion is placed or positioned within the airflow of a rack. A distal portion often is configured to hold, retain and/or support a sampling element. A distal portion of a retaining arm can be any suitable configuration (e.g., a circle, square, triangle, ellipse, parallelogram, pentagon, hexagon, and the like). A retaining arm (e.g., a distal portion of a retaining arm) sometimes comprises one or more retaining portions configured to hold, retain and/or support a sampling element. In some embodiments a retaining arm comprises an upper retaining portion 205 and a lower retaining portion 210. An upper retaining portion and lower retaining portion can be any suitable configuration. In some embodiment an upper and lower retaining portion are effectively connected to a shaft 215. In some embodiments an upper and lower retaining portion are configured to form a channel, cut, groove, hole, recess, space, slit, slot or socket 220. A channel, cut, groove, hole, recess, space, slit, slot or socket 220 is often a region or space configured to accommodate and/or hold a sampling element or a portion thereof. In some embodiments a sampling element, or portion thereof, occupies a socket 220, or a portion thereof. In some embodiments a sampling element, or portion thereof, is sandwiched and/or compressed within a portion of a socket 220 and between an upper and lower retaining arm. A sampling element may be permanently affixed to a retaining arm or may be reversibly attached to a retaining arm. For example, a sampling element, in some embodiments, can be repeatedly removed from and/or installed (e.g., replaced) on a retaining arm.

In some embodiments a retaining arm comprises a proximal portion 216 configured for effective attachment (e.g., effective connection) of a retaining arm to a rack. The term "effective attachment" as used herein is synonymous with the term "effective connection". Effective attachment refers to attachment of one component, or a portion thereof, to another component, or portion thereof, where the method of attachment allows an attached component to carry out its intended function. An effective attachment can be a permanent or reversible attachment. In some embodiments an effective attachment of two components may allow movement of one or both components relative to each other. In some embodiments a proximal portion of a retaining arm comprises a shaft 215 configured for effective attachment of a retaining arm to a housing 100 and/or plug 10 of a CSE assembly. A retaining arm (e.g., a retaining arm comprising a sampling element) may be permanently affixed to a rack or a component of a CSE (e.g., a housing and/or a plug) or may be reversibly attached to a rack or a component of a CSE. For example, a retaining arm, in some embodiments, can be repeatedly removed from and/or installed (e.g., replaced) on a rack.

A portion of a CSE is often configured to effectively attach a CSE, or a portion thereof, to a rack, or a portion thereof. A CSE, or a portion thereof, is often connected, attached and/or positioned within a hole, aperture or a bore in a rack or a portion thereof (e.g., a duct or a plenum). In some embodiments a CSE comprises a housing 100, a plug 10, a gasket 150, a washer 50, and/or a fastener 12, or a combination thereof. In some embodiments a housing is attached to a rack by one or more fasteners 12. Non-limiting examples of a fastener include, a solder, a weld, an adhesive (e.g., a glue), a screw, a rivet, a nail, the like or combinations thereof. In some embodiments a housing is effectively and/or reversibly attached to a rack by a suitable connector or a connector method. Non-limiting examples of a connector and/or a connector method include a threaded fitting (an internal, external, male or female threaded fitting), beaded fitting, barbed fitting, compression fitting, flare fitting, bite-type fitting, mechanical grip-type fitting, O-ring face seal fitting, the like or combinations thereof.

In some embodiments a housing comprises an inner surface 105 and an outer surface 110. Sometimes a housing comprises a hub 141 and/or a rim 145. In certain embodiments a housing comprises an aperture 126 and/or a connector 125. Sometimes an aperture 126 of a housing comprises one or more connectors 125. In some embodiments a housing comprises one or more fastener holes 120 configured to accommodate a fastener 12. A housing 100 is sometimes attached to a rack component (e.g., a surface of a plenum or support) by one or more fasteners 12. In some embodiments a housing is attached to a rack with one or more fasteners 12, a gasket 150 and/or a washer 50 thereby forming a seal (e.g., an air tight seal) with a component of a rack. A gasket often comprises a surface 165 configured to form a seal (e.g., an air tight seal) with a surface of a rack component (e.g., 402, e.g., a surface of a plenum) and an inner surface 105 of a housing. Sometimes a housing comprises a washer recess 122 configured to accommodate a washer 50.

A housing 100 is often configured to hold, retain and/or support a first portion of a CSE. In some embodiments a housing is configured to hold, retain and/or support a retaining arm. A housing is often effectively attached (permanently, removably or reversibly), to a retaining arm. A housing is sometimes configured to effectively attach to a proximal portion (e.g., a shaft) of a retaining arm.

In some embodiments a housing is configured to hold, retain and/or support a plug 10. A housing can be effectively attached (permanently, removably or reversibly) to a plug. In some embodiments a housing is attached to a plug by a suitable housing connector 125 or connector method (e.g., a threaded fitting (an internal, external, male or female threaded fitting), beaded fitting, barbed fitting, compression fitting, flare fitting, bite-type fitting, mechanical grip-type fitting, O-ring face seal fitting, the like or combinations thereof). Sometimes a plug can be removably attached to a housing by a connector and the housing can be effectively attached to a rack. The term "removably attached" and "removable attachment" as used herein, refers to a component that can be repeatedly attached (e.g., effectively attached) and unattached to another component of a rack. Often a component configured for removable attachment can be repeatedly attached and unattached to another component without causing substantial damage to either component.

In some embodiments a plug comprises a proximal portion 8 and a distal portion 9. A distal portion of often configured to attach a plug to a housing. In some embodiments a distal portion of a plug comprises a plug connector 15 or connector method (e.g., a threaded fitting (an internal, external, male or female threaded fitting), beaded fitting, barbed fitting, compression fitting, flare fitting, bite-type fitting, mechanical grip-type fitting, O-ring face seal fitting, the like or combinations thereof) configured to mate with or attach to (e.g., removably attach to) a housing connector 125.

In some embodiments a plug comprises a retaining arm and/or a sampling element. A plug sometimes comprises a shaft 14 configured to effectively attach to a shaft of a retaining arm 215. Sometimes a shaft 14 of a plug is removably attached to a shaft of a retaining arm 215. In some embodiments a shaft 14 of a plug is attached to a shaft of a retaining arm 215 by a suitable connector or connector method. In some embodiments a plug comprises a plug cylinder 17 configured to connect to a shaft of a retaining arm. Sometimes a shaft of a retaining arm is configured to slidably mount into the hollow interior of a plug cylinder 17. Sometimes a shaft of a retaining arm is permanently attached or affixed to a plug. Sometimes a retaining arm and a plug comprise one piece.

In some embodiments a proximal portion of a plug comprises a grip (e.g., 11, 11'), a grip flange 13 and/or a flange rim 16. A grip may comprise any suitable configuration. In certain embodiments a grip of a plug is configured for a user to grasp a plug (e.g., for removal and/or installation of a plug on a housing or rack). Sometimes a grip (e.g., a recessed grip) is configured for removal and/or installation of a plug by use of a tool (e.g., a screw driver or a wrench). In some embodiments a plug does not comprise a grip. A grip flange often comprises a mating surface 18 configured to contact and/or create a seal with a washer mating surface 60 and/or a housing outer surface 110. In some embodiments a grip flange 13 and/or a flange rim 16 is configured for installation and/or removal of a plug by a users hand or a tool.

A CSE or portion thereof can be located at a suitable location on a rack or a component thereof. A CSE or portion thereof (e.g., a sampling element) is often located on or within an airflow system (e.g., an air handling system, a ventilation control system) or a part, component or portion thereof. A retaining arm often holds, retains and/or supports a sampling element within an airflow system of a rack. In some embodiments a retaining arm holds, retains and/or supports a sampling element within a plenum or duct (e.g., as shown in FIGS. 7A-7D). In some embodiments a retaining arm positions a sampling element within an air stream of a component of an air sampling system. In some embodiments a CSE or portion thereof (e.g., a sampling element) is located on or within a blower or portion thereof. In some embodiments a CSE or portion thereof (e.g., a sampling element) is located on, within or near a duct of a blower, an exhaust port of a blower, an intake port of a blower, a blower fan, a blower turbine, a blower filter, a component or part thereof, or the like. In some embodiments a CSE or portion thereof (e.g., a sampling element) is located on or within a duct or plenum. In some embodiments a CSE or portion thereof (e.g., a sampling element) is located on, within or near an exhaust duct or exhaust plenum airway 404, an intake duct or intake plenum airway 406, a support member surface, a plenum surface (e.g., 402, 409), a duct or plenum filter, a component or part thereof, or the like. In some embodiments a CSE or portion thereof (e.g., a sampling element) is located on or within a cage. A CSE can be located inside a cage or outside a cage. In some embodiments a CSE or portion thereof (e.g., a sampling element) is located on, within or near an intake port or intake vent of a cage, an intake port connector 68, an exhaust port or exhaust vent of a cage, an exhaust port connector 66, a cage filter, a cage base, a cage lid, a cage bottom, a component or part thereof, or the like. In some embodiments a CSE or portion thereof (e.g., a sampling element) is located on the exterior or interior of a rack. Often second portion of a CSE, or a portion or component thereof is located on an exterior component or portion of a rack.

A rack or component thereof can comprise a suitable number of CSEs. Any number of CSEs can be used on a rack. In some embodiments a rack or component of a rack (e.g., a plenum) comprises 100 or more, 50 or more, 25 or more or 10 or more CSEs. In some embodiments a rack or component thereof comprise between 1 and 100, between 1 and 50, between 1 and 25, or between 1 and 10 CSEs. In certain embodiments a rack or component thereof comprises 20, 19, 18, 17, 16, 15, 14, 13, 12, 11, 10, 9, 8, 7, 6, 5, 4, 3, 2 or 1 CSEs.

Contaminants

The term "contaminant" as used herein refers to any matter found in a rack that is unwanted and/or not intended to be present in a rack. In some embodiments the term "contaminant" as used herein refers to matter found in a rack that was not intentionally introduced into a rack. In some embodiments a contaminant is matter found in a rack where the matter is evidence of the presence of a contaminant in a rack. In some embodiments a contaminant refers to any matter found in a rack that threatens the health or well-being of an animal in a rack or a user of a rack. In certain embodiments a contaminant is a human pathogen or a pathogen of an animal in a rack. A contaminant can be organic or inorganic and/or a gas, liquid or solid. A contaminant can be chemical or biological. In some embodiments a contaminant comprises a portion of, product of, or breakdown product of another contaminant.

In some embodiments a contaminant comprises a biological contaminant. In some embodiments a biological contaminant is bacteria, a fungus, a parasite, and/or a virus. In some embodiments a biological contaminant is a pathogen (e.g., a pathogenic bacteria, fungus, parasite and/or virus). A pathogen can be any pathogen capable of infecting an animal contained in a rack or rack system.

In some embodiments a biological contaminant comprises a rodent pathogen. A rodent pathogen can be a virus capable of infecting a rodent (e.g., a rodent virus). In some embodiments a rodent virus is selected from the genus of Parvovirus, Adenovirus, Coronavirus, Polyomavirus, Reovirus, Pneumovirus, Paramyxovirus, Arenavirus, and Norovirus. In certain embodiments a rodent virus is chosen from one or more of a mouse hepatitis virus (MHV), mouse parvovirus-1 (MPV-1), mouse parvovirus-2 (MPV-2), mouse parvovirus-3 (MPV-3), mouse parvovirus-4 (MPV-4), parovirus minute virus of mice (MVM), mouse rotavirus (MRV/EDIM), murine norovirus (MNV), Theiler's murine encephalomyelitis virus (TMEV [GDVII]), mouse adenovirus-1 (MAV-1), mouse adenovirus-2 (MAV-2), the like or combinations thereof.

In some embodiments a rodent pathogen comprises a bacteria capable of infecting a rodent. In some embodiments a bacteria capable of infecting a rodent is chosen from the genus of *Pneumocystis, Pseudomonas, Corynebacterium, Helicobacter, Pasteurella, Citrobacter, Corynebacterium, Mycoplasma, Salmonella, Streptobacillus, Streptococcus, Staphylococcus, Clostridium, Bordetella, Campylobacter* and *Klebsiella*. In some embodiments a bacteria capable of infecting a rodent is chosen from Cilia-associated respiratory (CAR) *bacillus, Corynebacterium bovis, Helicobacter hepaticus, Helicobacter bilis, Pasteurella pneumotropica, Citrobacter rodentium, Corynebacterium kutscheri, Mycoplasma pulmonis, Streptobacillus moniliformis, Streptococcus* (Beta-hemolytic; Group B), *Staphylococcus aureus, Clostridium pilfiorme, Streptococcus* (Beta-hemolytic; Group C), *Streptococcus* (Beta-hemolytic; Group G), *Streptococcus pneumonia, Bordetella bronchiseptica, Klebsiella oxytoca, Klebsiella pneumonia, Pseudomonas aeruginosa, Staphylococcus xylosus*, the like or combinations thereof.

In some embodiments a rodent pathogen is a rodent parasite. In some embodiments a rodent parasite is chosen from a fur mite, a pinworm, *Cryptosporidium, Giardia* and *Spironucleus muris*. In some embodiments a fur mite is chosen from *Myobia, Myocoptes*, and *Radfordia*. In some embodiments a pinworm comprises *Aspiculuris* and/or *Syphacia*. In some embodiments a *Giardia* parasite comprises *G. lamblia* and/or *G. muris*.

In some embodiments a contaminant is a chemical contaminant. Non-limiting examples of a chemical contaminant include benzene ($C_6H_6$), ethylene dibromide ($C_2H_4Br_2$; 1,2-dibromoethane), ethylene dichloride ($C_2H_4Cl_2$; 1,2-dichloroethane), hexavalent chromium (Cr(VI)), asbestos (e.g., asbestiform varieties of serpentine (chrysotile), riebeckite (crocidolite), cummingtonite-grunerite (amosite), tremolite, actinolite, and anthophyllite), dibenzo-p-dioxins and dibenzofurans chlorinated in the 2, 3, 7 and 8 positions and containing 4, 5, 6 or 7 chlorine atoms, cadmium (metallic cadmium and cadmium compounds), carbon tetrachloride (tetrachloromethane), ethylene oxide (1,2-epoxyethane), methylene chloride (dichloromethane), trichloroethylene ($C_2HCL_3$; trichloroethene), chloroform, vinyl chloride (chloroethylene), inorganic arsenic, nickel (metallic nickel and inorganic nickel compounds), perchloroethylene ($C_2Cl_4$; tetrachloroethylene), formaldehyde, 1,3-butadiene, inorganic lead, smoke, carbon dioxide, carbon monoxide, ammonia, the like or combinations thereof.

In some embodiments a contaminant is a particulate contaminant (e.g., particulates). Non-limiting examples of particulate contaminants include fur, hair, dust, ash, soot, bedding fibers, allergens, feces, pollen, spores (e.g., fungal spores), mold, insects, the like, portions thereof and/or combinations thereof.

Identifying Information and Identifiers

Provided in some embodiments are identifying information, identifiers and uses thereof to uniquely label and/or identify a contaminant sampling element (CSE) or a portion thereof.

An identifier may be detected by a machine or apparatus (e.g., a reader, e.g., by automated detection). The term "detected" as used herein means read, identified, scanned, decoded, interpreted, visualized, imaged, photographed, video recorded, recorded (e.g., data is captured and stored in memory) or a combination thereof. An identifier is often configured for detection by a suitable reader. The term "configured for detection" as used herein refers to a correct pairing of an identifier (e.g., a type of identifier) with a reader, where the reader is capable of detecting the identifier to which it is paired with. For example, a specific type of identifier (e.g., a bar code) is often configured for detection by a reader comprising a suitable complement of one or more parts (e.g., an imager, a sensor, microprocessor, lens, and the like) that allows a reader to detect the identifier. In some embodiments the term "configured for detection" as used herein refers to the placement of an identifier so that the identifier is located in a position, orientation and/or proximity that allows effective detection and/or processing of the identifier by a reader.

An identifier may be any suitable format configured for detection by a reader. Non-limiting examples of an identifier include a bar code, alphanumeric identifiers, a serial number, text (e.g., of any suitable language), an image (e.g., graphics, watermarks, an image of a CSE), holographs, digital or analogue identification (e.g., an electronic identification (e.g., EID), a binary identification, electronic microchips/transponders, radio-frequency identification (RFID), Uniform Resource Identifier (URI), Internationalized Resource Identifier (IRI), digital certification, mobile identification number (MIN) and the like), electronic identifiers (e.g., any suitable arrangement of conductive contacts, jumpers, bridge circuits, and the like), a discoloring polymer, reflective identifiers, non-reflective identifiers, magnetic identifiers, symbolic codes, chemical identifiers (e.g., chemical detectors), magnetic tags/strips/ink character recognition, smart cards, and fluorescence (or other optical techniques), the like, or combinations thereof. In some embodiments an identifier comprises images, graphics and/or pictures. A graphic may be a product of the graphic arts, such as a drawing, symbol or print, for example. An identifier may absorb, emit and/or reflect electromagnetic radiation. In some embodiments an identifier may be printed, embossed, recessed, raised (e.g., raised above a surface, (e.g., brail, raised transcriptions, bumps, pins) or a combination thereof. An identifier may be a physical code, physical image or physical substance, and can be a representation of data or information or a representation of a physical structure. In some embodiments an identifier comprises a simple binary identifier. In some embodiments a binary identifier comprises a series of contacts and or conductive medium configured to open and/or close one or more electrical circuits upon installation and/or removal of a CSE from a rack component. For example a CSE may comprises electrical contacts configured to open and/or close a first set of electrical circuits upon installation of the CSE in a rack and open and/or close a second set of electrical circuits upon removal of the CSE from the rack.

An identifier may comprise one or more suitable bar codes. A barcode, in some embodiments, is an optical machine-readable representation of data relating to an object to which it is attached. A bar code can be a suitable 1D, 2D or 3D bar code. Bar codes can be read, decoded and/or interpreted by a suitable device (e.g., scanner, imager (e.g., a camera), cell phone) and/or non-transitory computer-readable storage medium (e.g., a non-transitory computer-readable storage medium with an executable program stored thereon, wherein the program instructs a microprocessor to read, decode and/or interpret a bar code).

An identifier, in some embodiments, comprises a serial number. In some embodiments a bar code comprises a serial number. In some embodiments a bar code represents a serial number. A serial number can be any suitable arrangement or sequence of alphanumeric characters. A serial number may comprise alphanumeric characters of any suitable language. A serial number may upper case and lower case characters. A serial number may comprise any suitable quantity of characters. For example a serial number may comprises 1 or more, 2 or more, 3 or more 5 or more, 10 or more, 20 or more, 30 or more 40 or more, 50 or more or 100 or more characters. In some embodiments a serial number comprises 1 to 50, 1 to 40, 1 to 30, 1 to 20 or 1 to 10 characters. Sometimes a serial number comprises 1, 2, 3, 4, 5, 6, 7, 8, 9, 10, 11, 12, 13, 14, 15, 16, 17, 18, 19, or 20 characters. In some embodiments a serial number comprises text (e.g., descriptive text), words and/or sentences and/or anything written, printed and/or associated with a written or a spoken language. In some embodiments a serial number is unique, or comprises a portion that is unique to a particular system (e.g., a cage rack system) or database.

Radio-frequency identity (or identification), RFID, is a technology that uses tiny computer chips to track items at a distance. Radio-frequency identification (RFID) is the use of an object (typically a RFID tag) applied to or incorporated into a product, animal, or person for the purpose of identification and tracking using radio waves. Some tags can be read from several meters away and beyond the line of sight of the reader. Radio-frequency identification involves interrogators (or readers), and tags (or labels). RFID tags may contain two parts. One part may be an integrated circuit for storing and processing information, modulating and demodulating a radio-frequency (RF) signal, and other specialized functions. The second may be an antenna for receiving and transmitting the signal. Generally, there are three types of RFID tags: active RFID tags, which contain a battery and can transmit signals autonomously, passive RFID tags, which have no battery and require an external source to provoke signal transmission, and battery-assisted passive (BAP) RFID tags, which require an external source to be activated and has greater signal range.

Reflective identifiers may be any type of identifier capable of casting back particles (such as, for example, light, heat, sound, electromagnetic radiation, etc.). Such identifiers may reflect or absorb light (e.g., infrared light), images, or sound waves, for example. Non-reflective identifiers may be any type of identifier not capable of casting back particles.

Generally, electromagnetic radiation emitted or absorbed by an object is characteristic of the object's electromagnetic spectrum, which electromagnetic spectrum often can be detected. Electromagnetic radiation often comprises features such as electromagnetic frequencies and/or electromagnetic wavelengths and an electromagnetic spectrum sometimes comprises substantially all readily detectable electromagnetic radiation. Transparency and/or opaqueness to one or more electromagnetic features can be determined or predetermined by the use of various detectable materials and detectors (e.g., readers). Detectable materials sometimes are part of, included in or layered on materials utilized to generate cage components described herein. In some embodiments, a cage component may be transparent to some wavelengths, but not all electromagnetic wavelengths (e.g., opaque to some wavelengths). In some embodiments, one or more cage components may be transparent to one or more types of electromagnetic radiation chosen from radio waves, micro wavelengths, infrared wavelengths, visible wavelengths, ultraviolet wavelengths, soft x-rays, the like or combinations of the foregoing. In some embodiments, one or more cage components may be opaque to one or more types of electromagnetic radiation chosen from radio waves, micro wavelengths, infrared wavelengths, visible wavelengths, ultraviolet wavelengths, soft x-rays, the like or combinations of the foregoing. In some embodiments, one or more identifiers are transparent or opaque to one or more detection means (e.g., electromagnetic radiation). The term "opaque" with regard to electromagnetic radiation refers to a cage component and/or identifier allowing transmission of 5% or less of an electromagnetic feature.

Magnetic identifiers, magnetic tags/strips, magnetic ink characters, and/or smart cards may be any type of identifier having properties of a magnet. An example of a system employing magnetic materials is in WO 93/14474, which describes a system that generates an electromagnetic field, to which individual transponder units receive, store, and transmit the identification data, which is then received by a receiver and is incorporated by reference herein in its entirety. Another example of a system employing magnetic materials is in U.S. Pat. No. 4,075,618, which describes an antipilferage magnetic tag detected in an interrogation zone producing an alternating magnetic field by high-order harmonics produced by the presence of the tag and is incorporated by reference herein in its entirety. The tag has an asymmetrically shaped piece of low-coercive force ferromagnetic material, including a center section and flux concentrator sections at opposite ends of this section. Another example of a system employing magnetic materials is in U.S. Pat. No. 6,144,300, which discloses a magnetic analogue of an optical bar code reader system and is incorporated by reference herein in its entirety. Soft magnetic elements are arranged in a linear array and read by mechanically scanning a coil along the array, the coil generating a magnetic null enabling the elements of the array to respond to the applied field. The spatial arrangement of the elements in the linear array defines a code similar to a bar code.

Symbolic codes or identifiers may be any type of symbol that conveys identity or recognition of any type. A symbol may be something used for or regarded as representing something else; a material object representing something, often something immaterial; emblem, token, or sign. A symbol may be a letter, figure, or other character or mark or a combination of letters or the like used to designate something: the algebraic symbol x or the chemical symbol Au for gold, for example. A symbol also may be a word, phrase, image, or the like having a complex of associated meanings and perceived as having inherent value separable from that which is symbolized, as being part of that which is symbolized, and as performing its normal function of standing for or representing that which is symbolized: usually conceived as deriving its meaning chiefly from the structure in which it appears, and generally distinguished from a sign. A symbol may be commonly known such as a smiley face, or be obscure, non-recognizable, and novel, for example.

Chemical identifiers of any type may be used to signal the presence of a chemical. A chemical identifier may be used in lieu of or in conjunction with any type of detector. Additionally the chemical identifier may be triggered by an auto-catalytic chemical reaction, for example by the presence of moisture, by the presence of heat and/or pressure, or by the presence of water and/or another chemical such as ammonium, for example. Chemical identifiers also may be called discoloring polymers, where there is a chemical change within polymers used for identification.

An optical identifier of any type may be used. An optical identifier may comprise an optical substrate or be encoded with optical identification elements, optical character recognition, optical mark recognition, capable of having many optically readable codes. The optical substrate or element may be made of a glass material, such as silica or other glasses, or may be made of plastic or polymer, or any other material capable of having a diffraction grating disposed therein.

Fluorescence identifiers of any type may be used. Fluorescence identifiers may comprise the emission of radiation or of visible light or luminescence, during exposure to external radiation such as light or x-rays, or other sources of optical emissions, such as an optical reader, for example.

Holographic identifiers also may be used, or any type of two, three, or four dimensional image reproduced from a pattern of interference or produced by a split coherent beam of radiation, as from a laser. A holograph may be an image produced by a hologram, which is a negative produced by exposing a high-resolution photographic plate, without camera or lens, near a subject illuminated by monochromatic, coherent radiation, as from a laser when it is placed in a beam of coherent light a true three-dimensional image of the subject is formed.

Location of Identifiers

One or more identifiers 3 may be located at a suitable location on a CSE or a portion thereof. A CSE may comprise an identifier 3 on the front, back, side, top, bottom, proximal portion, distal portion, and/or corner of a CSE or a portion thereof. Any suitable part or portion of a CSE may comprise an identifier, non-limiting examples of which include a sampling element 250, a retaining arm 200, a shaft of a retaining arm 215, a gasket 150, a housing 100 (e.g., a housing inner surface 105, outer surface 110, hub 141, housing rim 145), a washer 50, a fastener 12, a plug 10 (e.g., a plug grip (e.g., 11, 11'), grip flange 13, flange rim 16, flange mating surface 18, plug cylinder 17, grip shaft 14, a connector, the like, portions thereof, or combinations thereof. In some embodiments a CSE, or a portion thereof comprises one or more identifiers (e.g., see call out number 3 in FIGS. 1A, 1B, 1D and 1E, 2B, 4A, 5A and 5B, 8A and 8B, 9C and 10). A CSE, or a portion thereof, may comprise two or more distinct identifiers and/or two or more identifiers that are substantially the same. In some embodiments, one or more CSE portions may have a first identifier and a second identifier. For example a plug, housing, sampling element and/or retaining arm may comprise the same identifiers or different identifiers.

Identifiers on a CSE, or a portion thereof, may be located near another identifier, adjacent to another identifier, overlapping another identifier, on top of another identifier, or in any location where data from the identifier may be captured, accessed, imaged, detected, or interpreted by a reader. One or more identifiers may be arranged in-line with one or more other identifier located on the same or on different parts of a CSE. The term "in-line" as used herein pertains to a linked sequence of placement, such as, sequentially within a line or one identifier behind another identifier thereby forming a straight line.

In some embodiments, one or more identifiers are configured so they do not overlap with one another. In certain embodiments, one or more identifiers are configured so two or more identifiers overlap. In some embodiments having overlapping identifiers, the identifiers can be offset from each other thereby generating regions of non-overlapping identifiers and regions of overlapping identifiers. In some embodiments, overlapping identifiers are detected by the same detector, and in certain embodiments, overlapping identifiers are detected by different detectors. In certain embodiments, each identifier in an overlapping identifier configuration is detected by a different detector. In some embodiments, a CSE has 2 or more, 3 or more, 4 or more, or more than 5 independently detectable identifiers, and in certain embodiments, a subset or all of the independently detectable identifiers can be detected in various combinations. In some embodiments having two or more identifiers (e.g., overlapping or non-overlapping), portions or all of the identifiers may be redundant.

The location of an identifier on a CSE, or a portion thereof, may be visible or invisible to a user. The location of an identifier is often a location that is visible, detectable or within a line of detection of a reader (e.g., an optical reader). In some embodiments one or more identifiers are located within the line of detection of an identifier. The location of an identifier on a CSE, or a portion thereof, and/or the location of a CSE comprising an identifier is often determined according to the location of a reader configured to read the identifier.

Readers

In some embodiments a rack comprises one or more readers. In some embodiments a reader is configured to detect a suitable identifier and/or a CSE. In some embodiments a reader is configured to detect and/or receive identifying information (e.g., CSE identifying information). The term "configured to detect" as used herein in the context of a reader, sometimes refers to the placement (e.g., sometimes a temporary placement, in the case of a hand held reader) of a reader relative to an identifier so that the identifier and reader are in a position, orientation and/or proximity that allows effective detection and/or processing of an identifier by a reader. In certain embodiments the term "configured to detect" as used in the context of a reader, can also refer to a correct pairing of a reader with a type of identifier to which the reader is intended to detect. For example, a reader is often configured with a suitable complement of parts (e.g., an imager, a sensor, microprocessor, lens, and the like) that allows detection of a specific type of identifier (e.g., a bar code). In some embodiments a reader is configured to detect CSE identifying information where the CSE does not comprise an identifier. For example, in some embodiments, a reader can detect the presence or absence of a CSE, or a portion thereof where the CSE does not comprise an identifier. A reader may be attached or placed at a suitable location and/or position on, in, or near a rack or a suitable rack component. In certain embodiments a suitable location or position is often a location and/or position where an identifier can be detected by a reader. For example, a reader can be located (e.g., attached, e.g., in effective connection with) on or in a plenum, a support member, a CSE, a cage, a shelf, a wall, duct, controller, computer, caster, trolley system, blower, communication medium, wires, a wiring harness and the like. A reader may be attached to a rack component directly or indirectly (e.g., by a bracket or wire). A reader may be a handheld device in some embodiments. A handheld reader may be placed at any suitable location on a rack.

A suitable reader may be utilized to read and/or detect the presence or absence of an identifier. In some embodiments a reader is paired with and/or positioned to detect one or more specific identifiers. In some embodiments a reader is an apparatus or machine configured to detect and/or read one or more specific identifier types (e.g., an image, a bar code, an RFID). A reader can be a suitable optical reader, electrical reader and/or a mechanical reader. In some embodiments a reader is a suitable device comprising an image sensor and a microprocessor (e.g., a mobile phone, cell phone, smart phone, or a portion thereof, a pad (e.g., an iPad), a tablet, computer, laptop computer, digital camera, the like or combinations thereof). Non-limiting examples of a reader include, pen type readers, a scanner (e.g., a laser scanner), an omni-directional scanner, RFID reader, camera reader (e.g., digital single-lens reflex cameras, CCD readers, CMOS readers) and the like, some of which are described in detail herein.

Pen type readers can comprise a light source and a photodiode placed next to each other in the tip of a pen, wand or projected device, in some embodiments. In some embodiments an identifier is read when the tip of the pen or device moves across an identifier (e.g., bars of a bar code identifier) in a steady motion. A photodiode measures the intensity of the light reflected back from the light source and generates a waveform that is used to measure details of the identifier (e.g., the widths of the bars and spaces in a bar code). In certain embodiments dark objects (e.g., bars) in an identifier absorb light and white objects (e.g., white spaces) reflect light so that the voltage waveform generated by a photodiode is a representation of the dark and white portions (e.g., bar and space pattern) of the identifier. In some embodiments this waveform is decoded by the scanner in a manner similar to the way Morse code dots and dashes are decoded.

Laser scanners are similar to pen type readers except that they may use a laser beam as the light source and may employ a reciprocating mirror and/or a rotating prism to scan the laser beam back and forth across the identifier. Similar to a pen type reader, a photodiode is used to measure the intensity of the light reflected back from the identifier. In pen readers and laser scanners, the light emitted by the reader often is tuned to a specific wavelength (e.g., frequency) and the photodiode is designed to detect modulated light of the same frequency.

CCD readers (also referred to as LED scanners or CCD detectors) use an array of (e.g., hundreds of) tiny light detectors lined up in a row in the head of the reader. Each detector can function as a single photodiode that measures the intensity of light immediately in front of it. Each individual light detector in the CCD reader often is small and because there are a plurality of detectors lined up in a row, a voltage pattern identical to the pattern in an identifier (e.g., a bar code) is generated in the reader by sequentially measuring the voltages across each detector in the row. A difference between a CCD reader and a pen or laser scanner sometimes is the CCD reader is measuring emitted ambient light from an identifier whereas a pen or a laser scanner is measuring reflected light of a specific frequency originating from the scanner itself.

A camera-based reader or 2D imaging scanner also may be used. Such a device often makes use of a small video camera that can capture an image of an identifier. In some embodiments a reader uses a digital image processing technique to decode the identifier. Video cameras use the same or a similar CCD technology as used for a CCD identifier reader except that instead of having a single row of detectors, a video camera has hundreds of rows of detectors arranged in a two dimensional array so that they can generate an image.

In some embodiments a reader comprises one or more components configured to detect identifying information (e.g., CSE identifying information). A reader may comprise a single component or may comprise an assembly of two or more components (e.g., a reader assembly 800). In some embodiments a reader comprises one or more suitable components, non-limiting examples of which include a lens 812, an image detector (e.g., 820, e.g., a CMOS or CCD imager), a shroud 815, a filter (e.g., an optical filter), a mirror, a housing 803, a light source (e.g., an illuminator 830), a reader board assembly 810, a reader board 811, a microprocessor 825, memory, a transmitter/receiver, communication medium 835, a power source (e.g., a battery, an external power source, a solar panel, a solar cell, a photovoltaic cell), power transformer, the like or combinations thereof.

In some embodiments a reader comprises a suitable image detector (e.g., a detector assembly). In some embodiments a detector portion of a reader can detect an identifier and/or collect data and/or identifying information from an identifier. In some embodiments an image detector is a suitable device that converts an optical image into an electronic signal. Non-limiting examples of an image detector comprise CCD detectors, CMOS detectors, Bayer detectors, Foveon X3 detectors, 3CCD detectors, back-illuminated detectors, pixel detectors, thermographic cameras, infrared detectors, photodetectors (e.g., quantum well infrared photodetectors), photocells, photoresistors, phototubes, photomultiplier tubes, photoconductors (e.g., quantum dot photoconductors), photodiode superconducting tunneling junction devices, superconducting detector (e.g., an ESA's Superconducting cameras (SCAM)), smart detectors, vision chips, ferroelectric detectors, silicon microbolometers, uncooled focal plane arrays (UFPA), oversampled binary image detector, magnetic detector, proximity detectors, contact image detectors, the like or combinations thereof.

In some embodiments a reader comprises one or more of a suitable lens 812. A lens can be a convex lens, concave lens, biconvex lens, plano-convex lens, positive meniscus lens, negative meniscus lens, plano-concave lens, biconcave lens, the like or a combination or assembly thereof. In some embodiments a lens comprises a suitable coating (e.g., a tint, a filter, a polarizer). In some embodiments a reader comprises a suitable filter. In some embodiments a filter can block or reduce one or more wavelengths of electromagnetic radiation. Non-limiting examples of filters include absorptive filters, dichroic filters, monochromatic filters, infrared filters, ultraviolet filters, neutral density filters, longpass filters, bandpass filters, shortpass filters, guided-mode filters, resonance filters, metal mesh filters. polarizers, color correction filters, the like or combinations thereof.

In some embodiments a reader comprises an electrical reader. In some embodiments an electrical reader is configured to detect CSE identifying information (e.g., a CSE identifier) according to a serious of open or closed circuits. In such an embodiment, a identifier comprises one or more, or a serious of electrical contacts capable of opening and/or closing certain circuits of a reader (e.g., when a component is installed and/or removed from a rack component). An electrical reader can detect the identity, presence, absence and/or location of a CSE according to certain open and closed circuits, where the circuits are open and/or closed as a direct result of the installation and/or removal of a CSE, or a portion thereof, from a rack or rack component. In some embodiments, an identifier configured for detection by an electrical reader comprises a chip, memory or the like that provides additional information (e.g., binary information) to a rack system upon detection by a reader.

A reader may detect a signal emitted from a CSE identifier in some embodiments, and sometimes a reader can detect a signal first generated by the reader and then transmitted back to the reader from the CSE identifier (e.g., reflected by the identifier). A signal transmitted to a reader from an CSE identifier may be processed or decoded by the reader in some embodiments, and the processed signal may be forwarded to another part of a rack system (e.g., processor and/or controller). In some embodiments, a signal is two or more signals (e.g., 2 or more signals, 3 or more signals, 4 or more signals, or more than 5 signals). In certain embodiments, each signal is the same signal, and in some embodiments, each signal is a different signal. In embodiments having two or more different signals, each signal may be detected by the same detector or one or more signals may be detected by a different detector. A signal transmitted to a reader from a CSE identifier may be forwarded directly, without processing or decoding, to another part of a system (e.g., processor and/or controller) in certain embodiments. In the latter embodiments, another part of a system may process and/or decode a CSE identifier signal detected by the reader.

In some embodiments a rack comprises one or more readers of the same type. In some embodiments a rack system comprises one or more different types of readers. Readers can be used alone or in combination with other readers to obtain, process, send and/or receive data and/or identifying information of an identifier.

In some embodiments a reader is operably coupled to one or more rack components. The term "coupled" as used herein means that two or more components are effectively connected and/or in effective communication with each other. The term "in effective communication" can refer to a physical connection (e.g., by wires, e.g., by a suitable communication medium) or a wireless connection (e.g., by WiFi, e.g., a suitable transmitter and/or receiver). The term "effective communication" indicates that data and/or information (e.g., identifying information) can be transferred to and/or from two or more components in effective communication with each other.

A reader, in some embodiments, comprises one or more indicators. In some embodiments a reader is operably coupled to one or more indicators. In some embodiments a reader comprises an integrated indicator. An indicator can be used to display data and/or information obtained from a reader to a user. A suitable configuration of one or more indicators can be utilized. In some embodiments an indicator configuration comprises one or more lights (e.g., LEDs). In some embodiments illumination of one or more lights (e.g., LEDs) indicates one or more different states representative of the status of a CSE. For example, illumination of a red light may indicate state one (e.g., yes, open, identifier read successfully), a green light may indicate state two (e.g., no, closed, not read), both red and green may indicate state three and no lights illuminated may indicated state four. In some embodiments a state or status is indicated by a light that is clear, shaded, dimmed and/or dark. In some embodiments an indicator comprises a non-visual indicator, for example an auditory, tactile, or olfactory signal, for example. An indicator may comprise a graphic display (e.g., an image, picture or video, e.g., displayed on a monitor).

In some embodiments, a reader or reader assembly 800 comprises a housing 803. In some embodiments a reader housing 803 comprises a proximal side 803', a distal side 803", a housing deck 804, and a housing stalk 807. A housing deck is often configured to accommodate insertion of a reader connector platform 836 sometimes leaving a reader connector 801 (e.g., a communication medium, or portion thereof, e.g., an electrical connector) or a portion thereof exposed. In some embodiments a housing stalk is configured to accommodate communication medium 835 or power medium of a reader assembly. In some embodiments a reader housing comprises a housing cap 802. In some embodiments a reader housing cap is configured to mate with a reader housing thereby forming a seal. A reader housing is, in some embodiments, water tight and provides a water tight seal that allows washing of a rack without the need for removal of a reader. In certain embodiments, a reader is configured to fit into a housing and/or attach to a rack component sometimes with a watertight seal. In some embodiments, a housing, or a portion thereof, is transparent or translucent. A transparent or translucent housing sometimes allows for indicator lights (e.g., LEDs) to be visible to a user. In some embodiments a transparent or translucent housing allows for illumination of an identifier, or a portion thereof. In certain embodiments, a translucent housing or housing cap is made of a plastic, and in some embodiments, the plastic is a Lexan™.

Non-limiting embodiments of certain reader configurations are described in international application number PCT/US2011/055650 and are incorporate herein by reference.

In some embodiments a reader is effectively connected and/or coupled to one or more rack components. In certain embodiments a reader is coupled to one or more rack components configured to receive identifying information (e.g., CSE identifying information) from a reader. The term "configured to receive" as used herein refers to a device, component or assembly of components capable of receiving and/or processing (e.g., decoding, interpreting, manipulating, and/or transforming) data and/or information (e.g., identifying information, e.g., CSE identifying information) sent from a reader, a reader assembly or a portion thereof. Data and/or information sent from a reader is sometimes in a digital form and/or analog form. Non-limiting examples of rack components configured to receive identifying information include communication media, connectors, a controller, computer (e.g., an apparatus comprising a microprocessor, memory and a non-transitory computer-readable storage medium with an executable program stored thereon, where the program instructs a microprocessor to perform one or more functions or a rack, or a component thereof), a microprocessor, memory, a server (e.g., a main server, local server, remote server), database, a display (e.g., a monitor (e.g., a LED, LCD display), an indicator), router, communication hub or port (e.g., a modem, a transmitter/receiver), another reader, the like or combinations thereof.

In some embodiments a reader is in wireless communication or directly connected to a rack component (e.g., a device configured to receive data and/or information). In some embodiments a reader is connected to a communication and/or power medium by a suitable connector 801. Non-limiting examples of connectors that can be used include parallel and/or serial advanced technology attachment (ATA) connectors (e.g., SATA, eSATA connectors), coaxial connectors, optical connectors (e.g., fiber optic connectors), audio and video connectors (e.g., VGA, RCA, HDMI), twisted pair connectors, ribbon cable connectors, Ethernet connectors (e.g., CAT-5, CAT-5e, CAT-6), USB connectors, serial connectors, the like or combinations thereof.

Data and/or identifying information (e.g., image information, decoded information, interpreted information) can be obtained by a reader and sent (e.g., transmitted) to another component of a rack or rack system. For example a reader can send data and/or information to a controller, computer, memory, main server, local server, database, a display (e.g., a monitor, an indicator), router, communication hub or port (e.g., a modem, a transmitter), or to another reader. In some embodiments, a reader can process data and/or information.

In some embodiments a reader is write enabled. For example, in some embodiments, a reader can add, remove, transform and/or change data and/or information. In certain embodiments a read can decode and/or interpret an identifier. For example, a reader may comprise decoder circuitry which analyzes an identifier.

In some embodiments a reader comprises a non-transitory computer-readable storage medium with an executable program stored thereon, wherein the program instructs a microprocessor to perform one or more functions of a reader, sometimes referred to herein as software. In some embodiments a reader comprises software. In some embodiments a reader is in effective communication with a non-transitory computer-readable storage medium with an executable program stored thereon, wherein the program instructs a microprocessor to perform one or more functions of a reader. In some embodiments software instructs a microprocessor to decode and/or interpret an identifier, for example by optical character recognition and/or optical mark recognition. In some embodiments software allows for identification of an identifier within an image, video or picture where the image, video or picture comprises objects other than the identifier. In some embodiments a reader simultaneously reads multiple identifiers and, in some embodiment, software allows for detection, identification, decoding and/or identification of each of the identifiers.

Identifying Information

Data and/or information associated with an CSE identifier is sometimes referred to herein as CSE identifying information. By detecting and processing CSE identifying information using devices and methods described herein, lab personnel can reliably and conveniently monitor the presence, absence and/or amount of contaminants in a rack or rack system. In some embodiments two or more identifiers (e.g., identifiers on the same or different components of a rack) comprise the same identifying information (e.g., substantially identical information), and sometimes two or more identifiers comprise different identifying information. Identifying information (e.g., physical or intangible identifying information) related to, associated with, or about a CSE, or a portion thereof, and is referred to herein as CSE identifying information. In some embodiments identifying information comprises an identifier and/or information associated with an identifier. In certain embodiments CSE identifying information comprises an identifier (e.g., a CSE identifier) and/or information associated with an identifier (e.g., a CSE identifier). In some embodiments CSE identifying information comprises two or more identifiers.

In some embodiments an identifier conveys identifying information to a reader, a system or user. In some embodiments identifying information comprises physical identifying information. Non limiting examples of physical identifying information include data and/or information regarding the location, presence or absence of a CSE, or a portion thereof, orientation of a CSE, or a portion thereof (e.g., proper or improper installation of a CSE, e.g., installed correctly and/or not installed correctly), identification of a CSE, or a portion thereof (e.g., descriptive information about a sampling element), presence or absence of a contaminant (e.g., a contaminant collected by CSE), descriptive information about a test result of a CSE, or a portion thereof, descriptive information about a detected contaminant, air flow information (e.g., rate of air exchange near a CSE), the like or combinations thereof.

In some embodiments the presence or absence of a CSE, or a portion thereof, is determined according to the presence or absence of an CSE identifier. For example, the detection of a CSE identifier by a reader can indicate the presence of a CSE and the detection of the absence of an CSE identifier by a reader can indicate the absence of a CSE. In some embodiments a CSE identifier is not located on a CSE. In some embodiments a CSE identifier is located on a rack component near a CSE, or a portion thereof. In some embodiments a CSE, or portion thereof, may be absence, thereby exposing an identifier to a reader indicating the CSE, or a portion thereof, is absent. In some embodiments a CSE identifier located on a rack component is blocked from view of (e.g., detection by) a reader by an installed CSE, or a portion thereof, indicating that a CSE, or a portion thereof, is present.

In some embodiments CSE identifying information may comprises information about results of testing and/or sampling of a CSE or portion thereof (e.g., the type and/or amount of a contaminant). In some embodiments CSE identifying information may comprise the type of CSE, or a portion thereof (e.g., a sampling element). CSE identifying information may comprise a serial number, manufacturer, a manufactures lot, and/or manufacture date of a CSE or a portion thereof. Physical identifying information related to CSE can, in certain embodiments, comprise a description of a sampling element (e.g., a list of contaminants that a CSE can trap or detect, type of sampling element (e.g., a tape, a filter), pore size, moisture content, maximum and minimum amounts of specific contaminants that a CSE can trap or detect, size or thickness of a sampling element, the like or combinations thereof.

In some embodiments identifying information comprises intangible identifying information about a CSE. Non-limiting examples of intangible information include history of CSE, or a portion thereof (e.g., a past, present or previous location on a rack, previous test results, identification of a user who installed, removed and/or handled a CSE), a time stamp (e.g., time of installation, time of removal, time of occupancy, recommended time of removal, disposal, sampling and/or testing, time of testing and/or sampling, time of access, date of access, the like, or combinations thereof), an association of a CSE with another rack component (e.g., a reader, one or more cages, a plenum, an animal in a rack), an association of a CSE with a facility, a room, or an experiment, association of testing results and/or a detected contaminant with a CSE or portion thereof, the like or combinations thereof.

Identifying information can be stored, used and/or processed by one or more rack components coupled to a reader (e.g., by an apparatus comprising a microprocessor and memory). CSE identifying information obtained from a reader may be used to perform a function. In some embodiments CSE identifying information obtained from a reader (e.g., received from a reader by a rack component coupled to the reader) is used to perform one or more contaminant monitoring operations of a rack. Non-limiting examples of contaminant monitoring operations include determining the presence or absence of a CSE, providing notification of the presence or absence of a CSE, assigning an identity to a CSE, generating and storing the time and date when a CSE was connected with the rack component, generating a schedule for removal of a CSE from the rack component, providing notification for a time of removal of the CSE, receiving contaminant information associated with a CSE, associating contaminant information obtained from a CSE with CSE identifying information, displaying the results of performing one or more operations, the like or combinations thereof. For example, in some embodiments a contaminant monitoring operation comprises identifying, sorting, tracking, logging, locating, verifying, authenticating, detecting, managing, counting, and/or repairing a rack component. Sometimes a contaminant monitoring operation comprises associating a rack component with other rack components, a location, and/or data and/or information. In some embodiments a contaminant monitoring operation comprises initiating, adjusting or terminating airflow to one or more cages of a rack system.

In some embodiments a contaminant monitoring operation comprises sending and/or providing a notification to a display or indicator (e.g., an LED indicator). In some embodiments a contaminant monitoring operation comprises sending and/or providing a notification to a display or indicator thereby notifying a user that a CSE is installed, installed correctly, installed incorrectly and/or not installed. In some embodiments a contaminant monitoring operation comprises sending and/or providing a notification to a display or indicator regarding the condition of a CSE (e.g., that a CSE is new, clean, dirty and/or contaminated). In some embodiments a contaminant monitoring operation comprises sending and/or providing a notification to a user that its time to install, replace, test, sample and/or remove a CSE or a portion thereof (e.g., a sampling element) from a rack or rack component.

In some embodiments a contaminant monitoring operation comprises one or more of detecting CSE identifying information, saving CSE identifying information to memory, processing CSE identifying information and/or notifying a user of CSE identifying information. In certain embodiments a contaminant monitoring operation comprises initiating a program (e.g., a software program) that locates and identifies cages that provide air to a CSE. A contaminant monitoring operation may comprise storing CSE identifying information related to and/or associated with cage locations. In certain embodiments a contaminant monitoring operation comprises testing and/or sampling a CSE. In some embodiments a CSE is tested and a contaminant monitoring operation comprises associating the results of a test with CSE identifying information (e.g., an identifier on the CSE, a history of a CSE, location of cages relative to a previous location of a CSE, time of installation and or occupancy of a CSE on a rack and the location and/or identification of animals that may have contacted a contaminant detected on or by a CSE). Sometimes a contaminant monitoring operation comprises associating a test result with an identifier and associating the identifier with a CSE thereby associating a test result with a CSE and/or cages in a rack that may be affected by a test result (e.g., the identification of the presence of a pathogen). In some embodiments a contaminant monitoring operation comprises identifying animals and\or cages effected by the presence of a pathogen and isolating and/or decommissioning the animals and/or cages according to the pathogen identified (e.g., from testing a sampling element).

In some embodiments a contaminant monitoring operation comprises starting a timer set for a predetermined amount of time, activating a time stamp and/or resetting a clock or timer. In some embodiments a timer is set for a predetermined amount of time and often a notification is sent to a display notifying a user when a predetermined amount of time has passed. For example, a contaminant monitoring operation may comprise starting a timer upon detection of a CSE by a reader, sending notification to a user (e.g., a display or indicator) after a pre-determined amount of time has passed, and/or notifying a user to remove a CSE for testing.

CSE identifying information can be associated with a CSE and/or information not generated from a reader. For example, test results obtained from testing a CSE, or a portion thereof, can be entered into a rack system by user. For example a user can enter CSE identifying information (e.g., test results) into a rack system from a keyboard (or any suitable input computer peripheral, (e.g., a microphone, a mouse)) and in some embodiments CSE identifying information can be entered by detecting CSE identifying information with a portable hand-held reader). In some embodiments a CSE or a suitable rack component in effective communication with a CSE (e.g., a reader) can transmit CSE identifying information (e.g., wirelessly). In certain embodiments, a CSE may transmit a wireless signal (e.g., a GPS signal) to a reader, controller or computer having a digital screen to display CSE identifying information.

The data obtained from a CSE, or a portion thereof, may be processed by a computing system disposed within a controller, main server, local server or any other suitable location in a system that may comprise a microprocessor and memory. Data obtained by a controller from readers, identifiers, or other sources may be processed by a computing system disposed within a controller, main server, local server or any other suitable location in a system comprising a processor and memory. In some embodiments data (e.g., CSE identifying information) obtained by a controller from readers, identifiers, components coupled to a reader, or other sources may be displayed on a graphic user interface in a suitable visual display format. In some embodiments, a rack component can communicate with one or more other rack components wirelessly.

Cages

In some embodiments an animal cage rack or cage system comprises one or more containment cages, often comprising a base, cover or lid member and optionally one or more animals. An animal cage base sometimes is provided separately from a lid, the lid often may be attached to the cage base and the lid may be readily detachable from the base. In some embodiments a cage comprises one or more doors (e.g., for cages housing larger animals).

A cage sometimes comprises one or more vents 136 or ports (e.g., 66 and 68)(e.g., for air exhaust and/or supply) configured for forced, static or free air exchange. In some embodiments cage vents or ports comprise connectors adapted for connecting a cage to an air intake or exhaust system. A connector can be of any geometry to receive a corresponding connector from an air supply or air exhaust component (e.g., a component of a rack or cage system). A cage connector often is configured to mate with an air supply or air exhaust connector of a rack or cage system by a sealing attachment, and often by a reversible connection. In some embodiments a cage connector or cage connector assembly comprises a cage connector component, a nozzle and one or more seals (e.g., gaskets). A cage vent, port, connector and/or connector assembly may comprise one or more filters. In some embodiments a cage comprises identifier 140.

Figure 14:
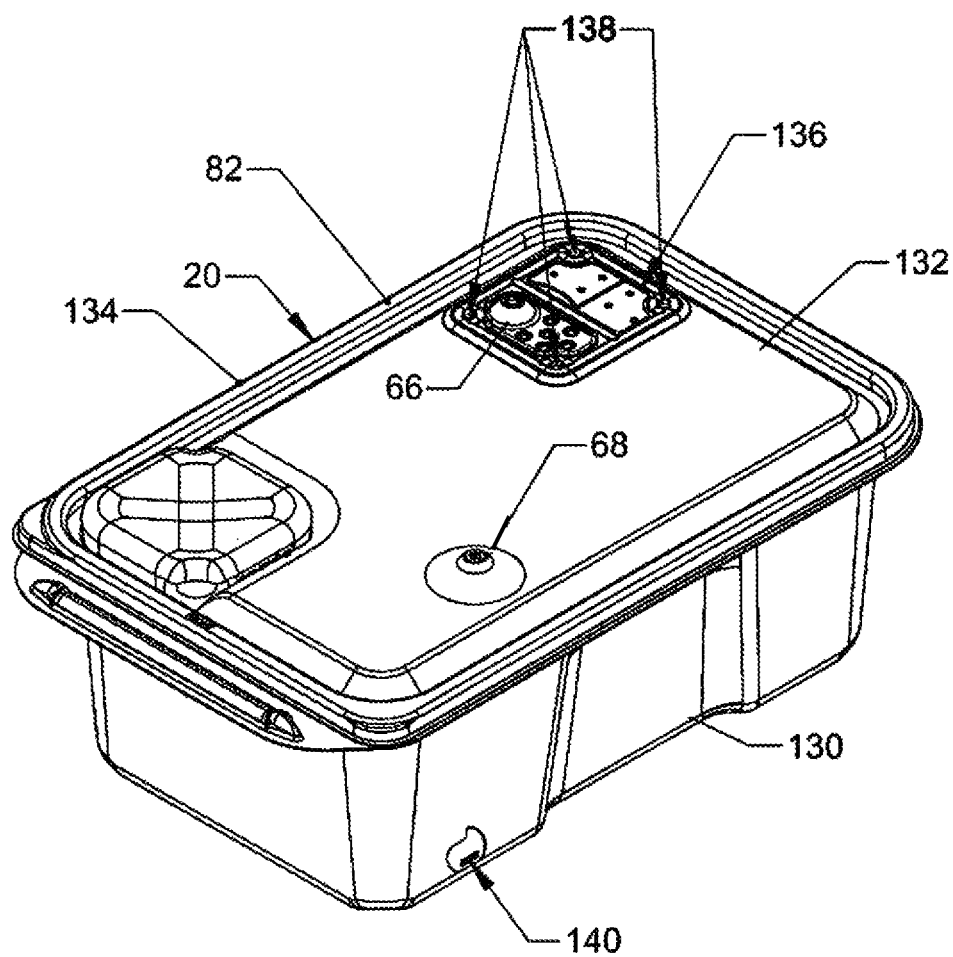
FIG. 14 shows an embodiment of a rodent cage.

FIG. 14 shows a perspective view of an example of a cage 20 suitable for use with a rack. The cage comprises a four post couplers 138, a channel 134 on the perimeter of the lid 132 which is configured to mate by snap fit to the rim of the base 130 also extends continuously around the perimeter of the lid, a flange portion 82 of the cage 20 which may be configured to have a substantially loose fit in a transverse or horizontal direction so as to allow some movement and adjustment of the conical connectors 66 and 68 of the cage with respect to the fixed nozzles of the shelf assembly.

Figure 15:
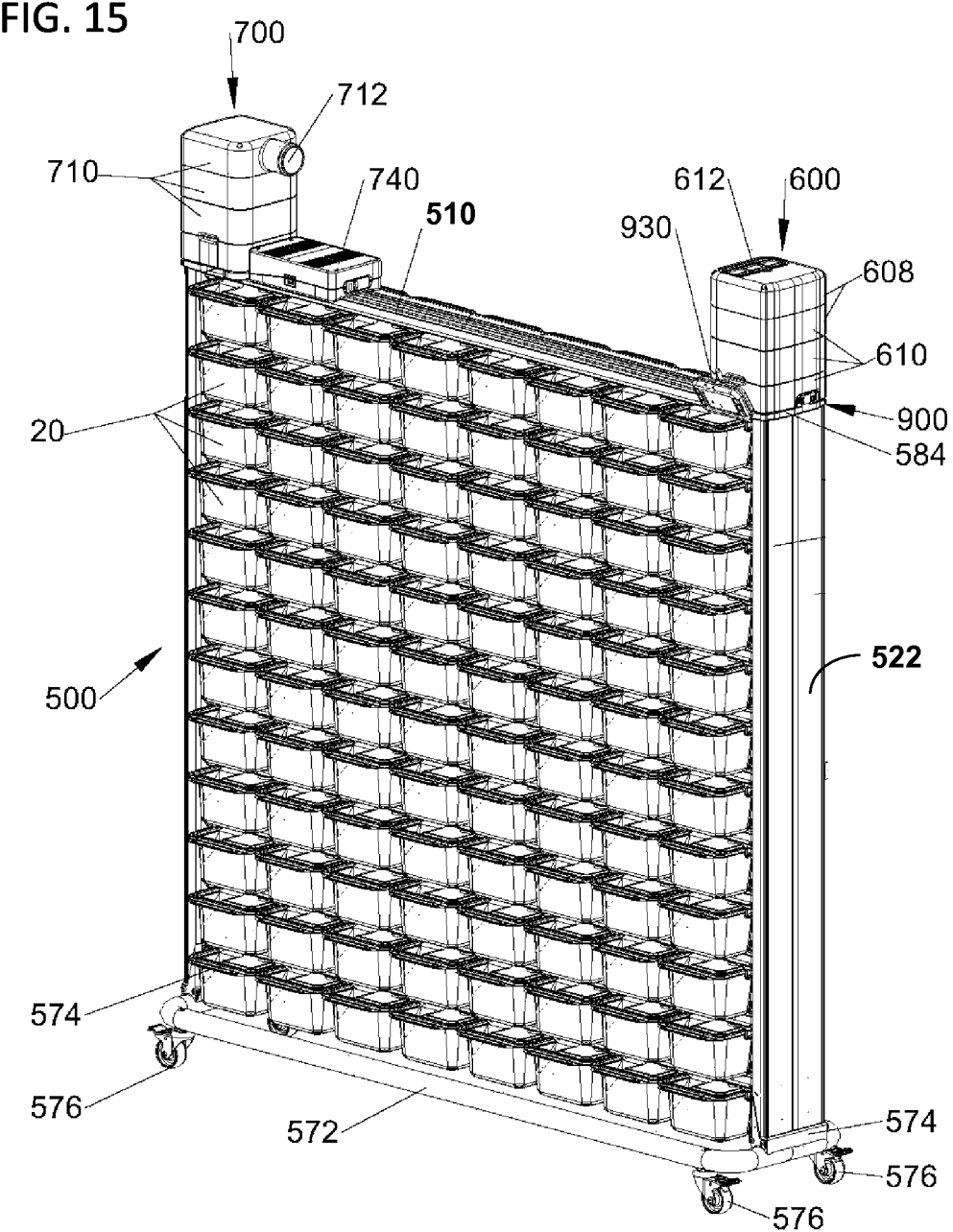
FIG. 15 shows an embodiment of a cage rack with cages installed.
Figure 16A:
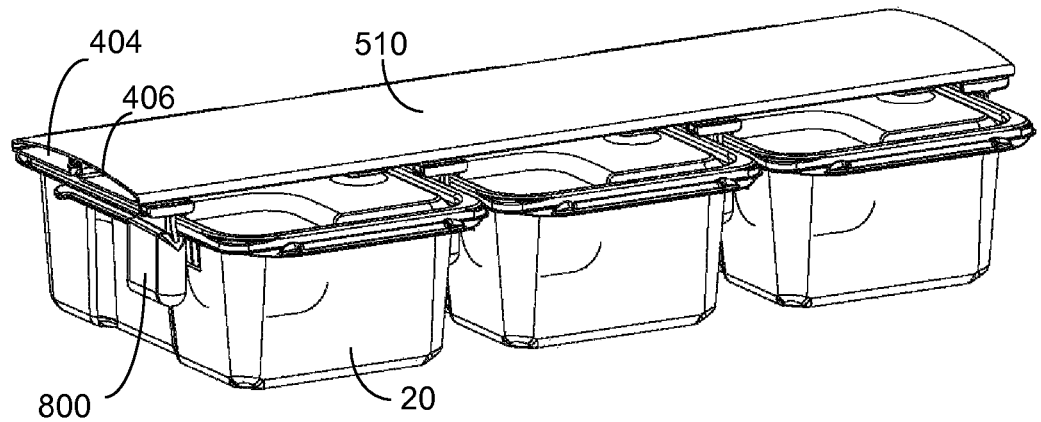
FIGS. 16A-16D show an embodiment of a portion of a cage rack comprising cages and a reader.
Figure 16B:
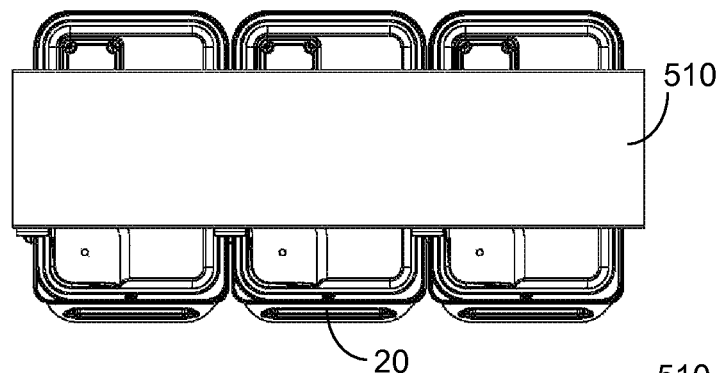
Figure 16C:
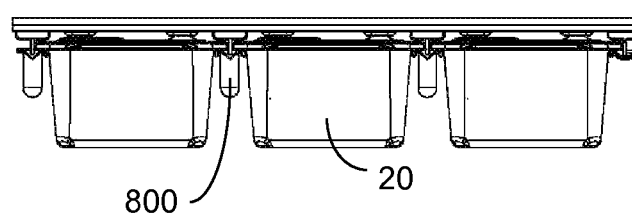
Figure 16D:
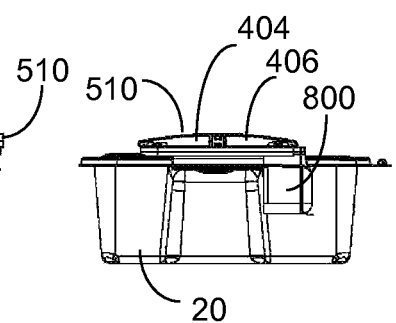

As depicted in FIG. 15, a cage 20 may be inserted into a shelf or bay of a rack system such that the shelf comprises a channel into which a portion of the cage can slide. A channel may be a rail, a groove, conduit, furrow, a flute, a route or passageway through which anything passes.

A suitable animal (e.g., mammals, insects, reptiles, amphibians, birds, etc.) may be contained within a containment cage housed in an animal containment cage rack or cage system. Non-limiting examples of mammals that may be contained in a containment cage include rodents (e.g., mice, rats, hamsters, gerbils, guinea pigs and the like), dogs, cats, primates (e.g., monkeys), chinchillas and rabbits. Rodents often are contained within such units. An animal can be transgenic, inbred, immune deficient, immune-competent, lack one or more functional genes (e.g., knock-out animal), and/or can comprise one or more xenografts. In some embodiments an animal is substantially healthy. In some embodiments an animal is diseased or infected (e.g., infected with a pathogen, e.g., a virus, parasite, fungus, bacteria) and in some embodiments an animal may be contagious (e.g., capable of infecting other animals in a containment cage rack or cage system). An animal may contain one or more experimental substances (e.g., a drug, a cell, bacteria, a virus, a chemicals, or a compound). The animals contained in a cage, rack and/or cage system may be utilized in a variety of manners, including but not limited to breeding, production (e.g., antibody, hybridoma, tissue or cell production), and research (e.g., experimentation (e.g., cancer, disease, toxicity and drug research).

Cages and cage components may be manufactured from one or more materials suitable for housing an animal. A material may be rigid, and often is a semi-rigid or flexible. A material may be translucent or transparent material. A material sometimes comprises additives that alter the transparency or opaqueness to various types of electromagnetic radiation. Non-limiting examples of materials that may be utilized for manufacture of a cage, a cage component or part thereof includes a suitable plastic or polymer (e.g., polypropylene (PE), high-density polyethylene, low-density polyethylene, polyethylene teraphthalate (PET), polyvinyl chloride (PVC), polyethylenefluoroethylene (PEFE), polystyrene (PS), polycarbonate, polystyrene (e.g., high-density polystyrene), acrylnitrile butadiene styrene copolymers, the like or combinations thereof), a suitable metal or alloy, a suitable wood, the like or combinations thereof. In certain embodiments, a cage comprises a biodegradable or recyclable material.

Racks

A rack or cage rack as referred to herein can mean a cage system. Cage racks or cage systems may be referred to herein as "a rack", "cage mounting platforms", "cage mounting systems" and/or "rodent containment cage racks". A cage rack or cage system may be permanent (e.g., built into a structure, e.g., non-mobile), free standing, movable and/or portable. An example of a rack 500 is shown in FIG. 15.

A rack may comprise any number and arrangement of rack components, non-limiting examples of which include support members (522,510), plenums, cages, cage bays, a trolley system 572, wheels or casters 576, a reader, a CSE, a blower (700,600), animals, a power supply 740, a controller 930, microprocessors, memory, a computer, routers, hubs, modems, computer peripherals, software, communication medium, transmitters, receivers, servers, feeders (e.g., food and water supply systems), identifiers, the like, or combinations thereof, some of which are described in greater detail herein. In some embodiments a rack component comprises an apparatus comprising a microprocessor, memory, and a non-transitory computer-readable storage medium with an executable program stored thereon, wherein the program instructs a microprocessor to perform one or more functions of a rack. Rack components may be constructed from any suitable material. Non-limiting examples of materials used to construct a rack include metal (e.g., metal alloys, steel, sheet metal, aluminum, copper, brass, stainless steel, metal plating (e.g., chrome), conductive metals), plastic, polymer plastics, polymers, coatings, laminates, minerals (e.g., granite, stone, rock, quartz, and the like), wood, glass (e.g., silica, soda lime, sodium oxide, polymer glass, and the like), concrete (e.g., mastic, cement, mortar, plaster, brick, and the like), biodegradable materials, recyclable materials, the like and combinations of the foregoing.

A rack often comprises one or more cages. One or more cages may be stored or housed on, or in, a cage rack or cage system in any suitable configuration. In some embodiments cages are modular and/or removable from a cage rack. In certain embodiments cages may be permanently integrated into a cage rack. In some embodiments a cage often resides on a shelf or rail connected to a cage rack. A cage rack sometimes comprises one or more mounting members (e.g., support members) useful for storing one or more cages in or on a cage rack. In certain embodiments, a mount member is a groove or flange on one or more surfaces of a rack configured to receive, sometimes slideably receive, a corresponding flange or groove on or in a cage.

In some embodiments, a rack is configured for use with smaller rodents (e.g., mice), and in certain embodiments a rack unit is configured for use with larger animals (e.g., rabbits, dogs or primates). Rack units can be configured with any suitable number of cages and/or cage stations for use with the desired type and/or size of animal. In some embodiments a single rack is configured with 4 or more, 8 or more, 16 or more, 32 or more, 64 or more, 96 or more 124 or more, 200 or more or 300 or more cages.

Support Members

A cage rack may comprise any suitable number or arrangement of support members, sometimes referred to herein as cage mount support members. Support members are often configured to support cages and the overall structure of a rack. In some embodiments a cage rack (e.g., a permanent, built-in cage system) does not comprise cage mount support members. In some embodiments cage rack comprises one or more support members that are substantially horizontal and one or more support members that are substantially vertical. Often, one or more horizontal support members are disposed between and connected to one or more vertical support members.

In some embodiments, cage mount support member comprises plenums and/or ducts configured for movement of air within a rack system (e.g., within support members). In some embodiments support members are often in effective connection with each other and form an integrated system that provides for controlled and/or isolated air flow into and out of cages in a rack. In some embodiments a cage mount support member comprises a proximal surface and a distal surface and one or more channels or plenums (e.g., FIG. 7A-7D and FIG. 16A-16D). For example, vertical support member 400 comprises side rail 401, proximal surface 409, distal surface 402, exhaust plenum airway 404 and intake plenum airway 406. In some embodiments a vertical support member 400 also comprises air exhaust connector 407 that is configured to draw air from an exhaust plenum airway of a horizontal support member 510 and air intake connector 408 that is configured to provide air to an intake plenum airway of a horizontal support member 510. A cage mount support member can have any suitable profile. Sometimes the profile and design of a cage mount support member comprising a plenum is determined according to structural and air flow requirements. In some embodiments a cage mount support member is configured to effectively attach a CSE. The channels, ducts and/or plenums of a cage mount support member can be independent and configured for isolated air flow, often in opposing direction. In some embodiments there is substantially no air communication between two or more adjacent plenums in a support member. In some embodiments ducts and or plenums within support members extend substantially the length of a cage support member.

In certain embodiments support members comprise connectors (e.g., docking connectors) for integration of a cage into a rack ventilation system. In some embodiments docking connectors are configured to mate with connectors, vents and or ports 68 and 66 located on a cage (e.g., FIG. 14). Docking connectors often comprise ports or vents that are effectively connected to the ducts and/or plenums of a rack ventilation system.

A cage rack often comprises one or more blowers (600, 700), fans or turbines configured to provide air to, and/or remove air from cages housed within a rack. Blowers, fans and turbines are referred to herein as blowers. In certain embodiments, a blower comprises one or more fans or turbines. In some embodiments a blower comprises one or more filters (e.g., 612). In some embodiments a blower comprises a controller, a circuit board, connections for power supply medium and/or communication medium, a servo, an identifier, a transmitter and/or a receiver (e.g., a transmitter and/or receiver configured for wireless communication and control of the blower). Any suitable blower or arrangement of blowers can be used in an animal cage rack or cage system. In some embodiments, a blower system comprises two or more independent blower assemblies. In some embodiments a rack comprises one or more blowers configured to supply air to cages in a rack. In some embodiments a rack comprises one or more blowers configured to exhaust air from cages in a rack. Sometimes a rack comprises two or more blowers configured for air supply and air exhaust. Blower assemblies can be mounted on or within a rack system. In some embodiments a blower may not be attached to rack. For example a blower may be located at a remote location and connected to a rack with an assembly of ducts or plenums.

Air Flow

A rack often comprises airflow system (e.g., an air handling system, a ventilation control system) and airflow system components. Airflow system components by be located externally and/or internally to various rack components (e.g., support members). In certain embodiments a rack comprises plenums or ducts for the directed movement of air flow through a rack and/or cage system. Any suitable arrangement of plenums and/or ducts can be used in a rack and/or cage system. In some embodiments ducts and/or air flow conduits are exterior to rack components (e.g., support members). In some embodiments ducts and/or air flow conduits are interior to rack components (e.g., support members). Non-limiting examples of air flow components include a blower, plenums (e.g., rack plenums, air exhaust plenums, air intake plenums, vertical plenums, horizontal plenums, the like or combinations thereof), a cage, ducts, conduits, apertures and connectors, some of which are described hereafter.

In a cage rack system comprising a ventilation control system, air is generally introduced into cages by a suitable arrangement of one more blowers, plenums and/or ducts. Each cage in a rack system often comprises a vent or port configured for air intake and another vent or port configured for air exhaust. In some embodiments of a rack ventilation system a blower supplies positive air pressure to one or more cages through an air intake vent or port located on each cage. In some embodiments a rack comprises an intake blower that directs air through one or more ducts or plenums into one or more cages through an intake port or vent located on each cage. In such embodiments, sometimes air exits a cage and/or the cage ventilation system through another vent or port located on the cage. Sometimes air is exhausted from a cage into the open air of a room, building or enclosure. Sometimes the air is exhausted outdoors. In some embodiments air exits a cage into an exhaust duct or plenum and sometimes air expelled from a cage is directed to an exhaust blower. In some embodiments a rack comprises an exhaust blower that directs air from an exhaust port or vent located on each cage through one or more ducts or plenums and into the exhaust blower. In some embodiments an exhaust blower is effectively connected to an exhaust port or vent on one or more cages where the exhaust blower provides a negative pressure. Negative pressure provided at the exhaust port of a cage can draw air into a cage from an intake port or vent located on a cage. Sometimes air is drawn into a cage from a duct or plenum. Sometimes air is drawn into a cage from the open air of a room, building or enclosure or from outside an enclosure (e.g., from the environment). In some embodiments a rack comprises an intake blower that directs air through one or more ducts or plenums and into one or more cages through an intake port or vent. In such embodiments, the air is then directed out of the cage through an exhaust port or vent, into one or more ducts or plenums, and into an exhaust blower where the air is expelled from the system. In such embodiments, the air generally flows in a circuit from an air supply portion of a rack through the cages to an air exhaust portion of a rack.

Cage systems are often designed to prevent cross-contamination of air from the environment and/or from any one cage in a rack into any other cage in a rack system. Rack systems are often designed with a plurality of filters with this purpose in mind. Filters can be located at blower intakes, blower exhaust ports as well as at each cage intake and exhaust port or vent. In addition, filters may be placed at various location within a duct or plenum network. In some embodiments cross contamination of air is minimized by maintaining a constant directional flow of air into and out of a system. In some embodiments of a rack ventilation system, an air intake portion of a rack is generally isolated from an air exhaust portion of a rack. Often supply and exhaust ducts (e.g., plenums) are substantially isolated from each other such that essentially no air is directly exchanged between ducts.

Communication Medium

In some embodiments a rack and/or portions thereof (e.g., cage mount support members, ducts, plenums, channels, blowers, connectors) comprise a suitable communication and/or power supply medium (e.g., cables, wires, insulated conductors and the like). In some embodiments communication medium comprises a suitable power supply medium (e.g., power supply wires, conduit, the like). In some embodiments a rack, portions thereof and/or cage mount support members comprise one or more conduits or channels configured for housing a suitable communication and/or power supply medium (e.g., cables, wires, and the like). In some embodiments a communication medium and/or power supply medium comprises conduit, shielding and/or insulation.

A cage rack unit can comprise one or more communication medium for sending information from locations in the rack to information devices. Communication medium can also be used to power information devices in certain embodiments. A communication medium can be any medium used to connect information devices. Non-limiting examples of communication medium include parallel and/or serial advanced technology attachment (ATA) cables (e.g., SATA, eSATA), coaxial cables, optical cables (e.g., fiber optic fibers), audio and video cables (e.g., VGA, RCA, HDMI), twisted pair, ribbon cables, Ethernet cables (e.g., CAT-5, CAT-5e, CAT-6), USB, the like or combinations thereof. Communication medium may also comprise cables, wires, connectors and/or wireless devices configured for a suitable wireless system, non-limiting examples of which include radio, UHF, VHF, satellite, PAN, WPAN, WiMAX, wi-fi, Bluetooth, LAN, WLAN, any suitable 802.11 communication standard, the like and combinations thereof). A rack can comprise any suitable information device. An information device can be any device that obtains, processes, controls, transmits or displays information or any combination thereof. Non-limiting examples of information devices include detectors, detectors, controllers, cell phones, machines comprising microprocessors and/or memory (e.g., iPads, computers, tablets, and the like), microprocessors, digital storage devices, displays (e.g., lights, LED, LCD, and the like), readers (e.g., cameras), chips, printed circuits, switches, connectors, a CSE, power sources or power converters (e.g., transformers, batteries, hubs, conditioners), the like or portions thereof.

Controllers

A cage rack may comprise a suitable number of rack controllers (e.g., controller boards, circuit boards (e.g., printed circuit boards (e.g., PCBs)), circuit board hubs, and/or microprocessors) and in certain embodiments a cage rack comprises a master rack controller. In some embodiments a controller comprises one or more microprocessors, memory and/or software). In some embodiments a rack controller is hand held, remote (e.g., remotely located (e.g., communication to a controller is remote)), and/or rack mounted. Rack controllers generally receive, collect, process and distribute CSE identifying information and/or information related to power distribution, air flow, cage configuration, and/or rack components. In some embodiments rack controllers can control, regulate, turn off and/or turn on various rack components (e.g., blowers, motors (e.g., fan servos), louvers, shutters, and the like) and information devices (e.g., a CSE, indicators, displays, readers, and the like). In some embodiments a controller provides a user interface for entry of information pertinent to operation of a rack and allows interactive user control of certain rack components or devices. In certain embodiments a rack controller comprises an identifier.

In certain embodiments communication between rack controllers, rack components, rack information devices and users is by wired communication (e.g., by wired communication medium) and/or by wireless communication (e.g., wireless communication medium and/or wireless devices). In some embodiments a rack controller comprises one or more transmitters and receivers configured for wireless communication.

Systems

In some embodiments, a graphic user interface may contemporaneously display an icon or the like for each CSE or portion thereof installed or not installed on a rack. For some embodiments, icons displayed on a graphic user interface may be positioned on a display in a configuration corresponding to a configuration of the actual CSEs of a rack system. In other words, a facsimile of a front view of a side of the actual rack system may be displayed on the screen of the graphic user interface such that lab personnel may immediately and intuitively assess the status of any of the CSEs on the rack system. The physical location of CSEs requiring immediate attention may be identified to lab personnel by indicators/readers configured to detect each CSE. For some embodiments, the indicators and/or CSE icons of the graphic user interface may use a color coded display to efficiently and rapidly convey CSE status information to lab personnel. For example, the appropriate time to remove and/or test a CSE, or portion thereof, can be indicated by different colored icons on a display, (e.g., indicating the location of the CSE that requires testing on a rack). For example, when an indicator and/or graphic cage icon color is green, no testing is necessary, when the color is yellow, testing may be necessary soon and a red color may indicate the need for an immediate testing of a CSE.

Processors and Servers

In some embodiments a rack (e.g., a rack system) comprises a system or component thereof. A system may comprise one or more microprocessors and memory, which memory comprises instructions executable by the one or more microprocessors. In some embodiments a system may comprise a non-transitory computer-readable storage medium with an executable program stored thereon, wherein the program instructs a microprocessor to perform one or more functions of a rack system.

A system typically comprises one or more machines. A machine may comprise one or more of memory, one or more microprocessors, and instructions. In some embodiments, a machine comprises multiple processors, such as processors coordinated and working in parallel. In some embodiments, a machine operates with one or more external processors (e.g., an internal or external network, server, storage device and/or storage network (e.g., a cloud)). In certain embodiments, a machine comprises peripherals and/or components. In certain embodiments a machine can comprise one or more peripherals or components that can transfer data and/or information to and from other machines, peripherals and/or components. In certain embodiments a machine interacts with a peripheral and/or component that provides data and/or information. In certain embodiments peripherals and components assist a machine in carrying out a function or interact directly with a module. Non-limiting examples of peripherals and/or components include a suitable computer peripheral, I/O or storage method or device including but not limited to scanners, printers, displays (e.g., lights, monitors, LED, LCT, LCDs, CRTs and the like), cameras (e.g., cmos), microphones, pads (e.g., iPads, tablets), touch screens, smart phones, mobile phones, USB I/O devices, USB mass storage devices, keyboards, a computer mouse, digital pens, modems, hard drives, jump drives, flash drives, a processor, a server, CDs, DVDs, graphic cards, specialized I/O devices (e.g., CSEs, readers (e.g., optical readers), detectors, detectors, photo cells, photo multiplier tubes, and the like), network interface controllers, ROM, RAM, wireless transfer methods and devices (Bluetooth, WiFi, UHF, VHF and the like,), the world wide web (www), the internet, and/or a computer. An optical reader is often a suitable device or sensor that captures visual information (e.g., electromagnetic radiation, e.g., light, e.g., an image,) and translates and/or transforms it into digital information (e.g., digital information that a computer is capable of processing).

Where a rack or rack system comprises two or more machines, some or all of the machines may be located at the same location, some or all of the machines may be located at different locations, all of the machines may be located at one location and/or all of the machines may be located at different locations. Where a system comprises two or more machines, some or all of the machines may be located at the same location as a rack, some or all of the machines may be located at a location different than a rack, all of the machines may be located at the same location as the rack, and/or all of the machines may be located at one or more locations different than the rack. Where a system comprises two or more machines, some or all of the machines may be located at the same location as a user, some or all of the machines may be located at a location different than a user, all of the machines may be located at the same location as the user, and/or all of the machines may be located at one or more locations different than the user.

In a rack (e.g., a system, a rack comprising a system), may be connected to a network. In some embodiments, processes and functions of a rack may be implemented as a single user system or multi-user system located in a single geographical site or at multiple geographical sites via a network. In some embodiments multiple machines (e.g., machines comprising one or more of memory, a microprocessor, and instructions (e.g., a computer, a pad (e.g., an iPad), a tablet, a phone, and the like) may be connected by means of a network. In some embodiments multiple racks, multiples rack components and/or multiple rack information devices may be connected by means of a network. A network may be local, city-wide, county-wide, country-wide, international or world-wide. A network may be private, being owned and controlled by a provider, and/or it may be implemented as an internet based service where a user accesses a web page or web application (i.e., web app) to control a rack (e.g., enter and receive data, information and/or commands of a rack or rack system). Thus, a suitable network and/or network configuration can be utilized to control a rack (e.g., a rack system) or for obtaining, providing and/or processing rack data using multiple machines and/or multiple users, such as in a local network, remote network and/or "cloud" computing platforms. A rack may be effectively connected to a network or a system by a suitable communication medium.

A rack or rack system may comprise one or more addresses for one or more rack components or information devices. Addresses may provide information as to the identification (e.g., digital identification, information provided by an identifier), function, status and location of components of a rack system, such as, for example, network servers, routers, peripherals, computers (e.g., laptop systems, pads (e.g., iPads), notebooks, tablets, desktop systems), handheld systems (e.g., cell phones, remote controllers, remote control applications (e.g., aps)), personal digital assistants, computing kiosks, controllers, blowers, CSEs, readers, detectors, detectors, cages, vents, power sources, and the like. A rack system may comprise one or more input means such as a keyboard, touch screen, touch pad, stylus, mouse, voice recognition or other means to allow the user to enter data into the system. A rack system may further comprise one or more outputs, including, but not limited to, a display (e.g., CRT, LED, LCD, plasma, lights (e.g., one or more black, white and/or colored lights or LEDs), speaker, FAX machine, printer), or other output useful for providing visual, auditory and/or hardcopy output of information (e.g., status reports).

A rack system may comprise software useful for performing one or more functions of a rack. The term "software" refers to a non-transitory computer-readable storage medium with an executable program stored thereon, wherein the program instructs a microprocessor to perform one or more functions of a rack system. Instructions executable by the one or more processors sometimes are provided as executable code, that when executed, can cause one or more processors to implement a function or method described herein. Data and/or information can be in a suitable form. For example, data and/or information can be digital or analogue. In certain embodiments, data and/or information can be packets, bytes, characters, or bits. In some embodiments, data and/or information can be any gathered, assembled or usable data or information. Non-limiting examples of data and/or information include a suitable media, images, pictures, video, sound (e.g. frequencies, audible or non-audible), numbers, alphanumeric text, constants, an identifier, a bar code, objects, time, functions, temperature, instructions, the like or combinations thereof. Software often is provided on a program product containing program instructions recorded on a computer readable medium, including, but not limited to, magnetic media including floppy disks, hard disks, and magnetic tape; and optical media including CD-ROM discs, DVD discs, magneto-optical discs, flash drives, RAM, floppy discs, the like, and other such media on which the program instructions can be recorded. In online implementation, a server and web site maintained by an organization can be configured to provide software downloads to remote users, or remote users may access a remote system maintained by an organization to remotely access software. Software may obtain or receive input information.

A rack can be interactive with a user (e.g., lab personnel) and allow for users to reliably and conveniently monitor the status and/or conditions of a rack (e.g., the presence absence or amount of contaminants within a rack). A user may, for example, place a command or query to software which then may control a rack or gather information from a rack (e.g., via internet access), and in certain embodiments, a programmable processor may be prompted to acquire data based on given parameters. A programmable processor also may prompt a user to select one or more options selected by the processor based on given parameters. A programmable processor may prompt a user to select one or more options selected by the processor based on information found via the internet, other internal or external information, or the like. Options may be chosen for selecting one or more feature selections, one or more statistical algorithms, one or more statistical analysis algorithms, iterative steps, or one or more graphical representations.

Management Software

Any type of software that can manage, handle, direct and/or control maintenance of a rack system may be used and is referred to herein as "management software." Management software may be stored/housed and/or accessed within a main, local and/or remote server. Management software may be stored/housed and/or accessed on a network. Management software also may be located in the memory of a controller. Management software may also comprise other software, which performs such tasks as scheduling, cost control, budget management and billing, tracking, relational database management, communication, documentation or reporting, and/or administration systems or user access, which may be used to manage one or more cage racks/systems found in one or more locations. For example, a software system may track all animal colony information and related research data, from animal information (e.g. names, date of birth, genotypes, pedigree, or any other defined field), cages information (e.g. location, setup date, transferring history, cleaning schedule etc.), experiments, measurements, and the like. Scheduling may comprise sending suitable reminders with e-mail options may aid in managing the animals/cages and experiments more efficiently. Scheduling also may comprise management of support personnel and/or resources (re-order reminders, stock levels of one or more CSEs, and the like). Use of the software system may reduce cost, for example by removing extra cages or animals not in use.

CSE identifying information may be used alone or in combination with other information about a rack system. For example, information from a CSE regarding the presence of a contaminant can be cross-referenced with the location of source cages, affected cages and historic data (e.g., cages that occupied contaminated areas on previous dates). Such information can be provided to end users. Prediction algorithms may be used in combination with CSE identifying information to determine significance or give meaning to the data collected from a CSE.

CSE identifying information gathered from one or more CSEs can be reported, documented and/or displayed in any form (i.e. digital data) and transformed or created into representations of that data, such as for example into text, a graph, a 2D graph, a 3D graph, and a 4D graph, a picture, an image, a pictograph, a chart, a bar graph, a pie graph, a diagram, a flow chart, a scatter plot, a map, a histogram, a density chart, a function graph, a circuit diagram, a block diagram, a bubble map, a constellation diagram, a contour diagram, a cartogram, spider chart, Venn diagram, nomogram, the like and combination thereof.

Methods

In some embodiments provided herein is a method for monitoring contaminants in a rack (e.g., a rodent containment cage rack). In some embodiments a method for monitoring contaminants comprises detecting CSE identifying information on a component of a rack (e.g., a CSE) and performing one or more contaminant monitoring operations utilizing the CSE identifying information detected. In some embodiments CSE identifying information is detected by one or more readers. Sometimes a method for monitoring contaminants comprises detecting CSE identifying information from a CSE identifier. In some embodiments the method comprises determining the presence and/or absence of a CSE or a portion thereof. The presence of a CSE is often determined when a CSE, or portion thereof, is in effective connection with a component of a rack.

Figure 17:
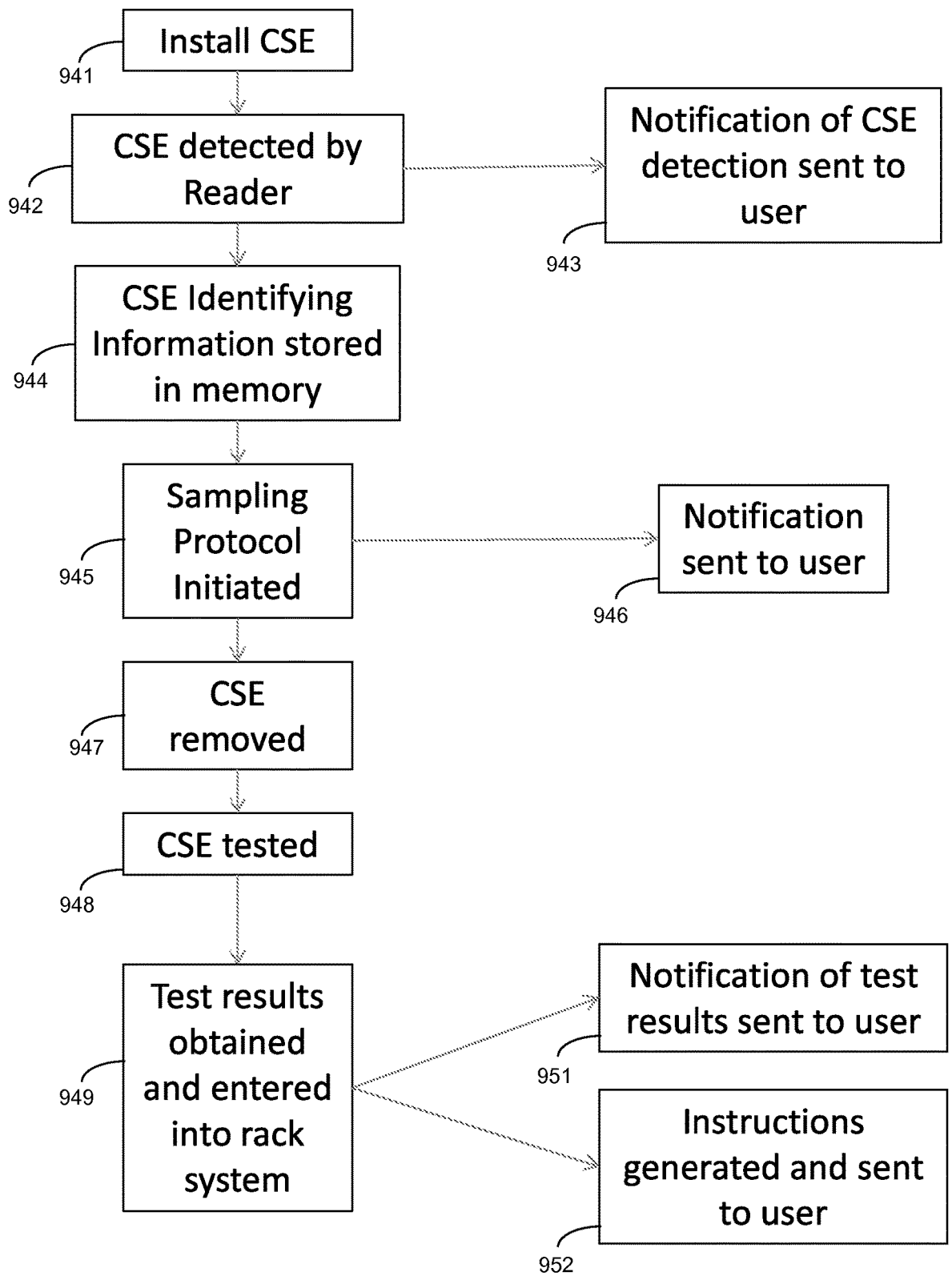
FIG. 17 shows an embodiment of a flow chart for monitoring contaminants in a rack system.

In some embodiments a method for monitoring contaminants in a rack comprises providing a CSE in effective connection with a rack component where the CSE comprises CSE identifying information. In some embodiments CSE identifying information comprises an identifier. In some embodiments a method for monitoring contaminants comprises detecting an identifier, thereby providing CSE identifying information to a rack component (e.g., a rack component coupled to a reader). In some embodiments a method for monitoring contaminants in a rack comprises detecting CSE identifying information by a reader, optionally processing CSE identifying information, sending CSE identifying information from the reader to one or more rack components coupled to the reader and/or sending notifications to a user (e.g., as illustrated in FIG. 17). In certain embodiments a reader is coupled to one or more components comprising a microprocessor, memory and/or instructions configured to utilize CSE identifying information to perform one or more contaminant monitoring operations. For example, in some embodiments a CSE, or a portion thereof, in installed on a rack 941, the presence of the CSE is detected by a reader 942 and notification of the presence of the reader is sent to display or indicator, thereby notifying a user of the presence of an installed CSE 943. In some embodiments a method for monitoring contaminants in a rack comprises providing notification or confirmation of the presence and/or absence of a CSE (e.g., a CSE in effective connection with the rack component). CSE identifying information is often transferred to and/or from one or more components of a rack. Often, after detection of the presence of a CSE by reader, CSE identifying information is sometimes processed and/or stored in the memory of a rack component 944. In some embodiments when a CSE is first detected by a reader, a time (e.g., a time stamp) is associated with installation of the CSE, often initiating a sampling protocol 945. A sampling protocol often tracks how long a CSE has been installed in a rack. In some embodiments a method for monitoring contaminants in a rack comprises providing notification of a time (e.g., a recommended time) for removal and testing of the CSE according to CSE identifying information. After a predetermined amount of time has passed, a sampling protocol often sends notification to a user recommending that the CSE is tested for the presence, absence or amount of a contaminant 946. After notification is received, or in some embodiments, at any suitable time, a user may remove a CSE, or portion thereof, and test it for the presence, absence or amount of a contaminant 947. When a CSE is removed, in some embodiments, a reader detects the absence of a CSE, and CSE identifying information is again logged into memory (e.g., a database, a log). In some embodiments a method of monitoring contaminants comprises replacing a CSE, or a portion thereof, from a rack or rack component. In some embodiments a first CSE is removed for testing and a second CSE, often comprising a unique CSE identifier, replaces the first CSE. For example, sometimes a new CSE is installed, often initiating a new series of steps 941 through 948.

In some embodiments a method of monitoring contaminants comprises testing and/or sampling a CSE or a portion thereof. Sometimes testing and/or sampling a CSE, or a portion thereof, comprises sending a CSE, or portion thereof, to a third party where test results are obtained and/or received from a third party. A CSE, or portion thereof, may be tested at any suitable location by any suitable method. Testing a CSE often comprises detecting and/or determining the presence, absence and/or amount of a contaminant on a CSE or a portion thereof (e.g., a sampling element). A suitable method and/or kit (e.g., a commercially available kit) can be used for detecting and/or determining the presence, absence and/or amount of a contaminant on a CSE. Non-limiting examples of methods that can be used to detect and/or determine the presence, absence and/or amount of a contaminant on a CSE include suitable PCR-amplification and/or sequencing techniques using primers and/or probes specific for known pathogens, culturing techniques (e.g., for culturing certain bacteria, molds and viruses), microscopic techniques (e.g., to identify certain parasites, insects, molds and bacteria), the like or combinations thereof. In some embodiments test results obtained from testing and/or sampling a CSE, or portion thereof, are confirmed by using a different method. In some embodiments CSE test results are confirmed by testing one or more animals (e.g., sentinel animals) in a rack from which a CSE was obtained.

Test results obtained from a CSE are often associated with a CSE identifier and/or with CSE identifying information.

After test results are obtained, in certain embodiments, the test results are entered into a rack and the results are associated with unique CSE identifier 949 obtained from the CSE that was tested. In some embodiments a CSE identifier is detected one or more times by a reader before, during and/or after testing a CSE. CSE identifying information associated with test results is sometimes entered into a system by a user and/or by a portable reader. In some embodiments the test results are associated with CSE identifying information related to, for example, the CSE tested, the previous location of the CSE in a rack and/or cages that are affected by the test results. Notification of test results is often sent to a display or user 951.

In some embodiments a method for monitoring contaminants in a rack comprises detecting contaminants using a CSE comprising a detector. In some embodiments a method for monitoring contaminants in a rack comprise detecting CSE identifying information and/or detecting the presence, absence and/or amount of an animal pathogen in real-time. In certain embodiments a detector is not removed from a rack for testing. In some embodiments a detector comprises a dynamic sampling element. A dynamic sampling element can provide data and/or information to a rack system during or after a contaminant is detected without requiring removal of a CSE, or a portion thereof, from a rack.

In some embodiments a method for monitoring contaminants in a rack comprises, after obtaining test results, generating instructions for adjusting a rack and/or adjusting a rack according to the test results and the CSE identifying information. In some embodiments test results are processed by a rack component (e.g., a microprocessor) and one or more recommended instructions are generated and sent to a display and/or user 952. Non-limiting examples of instructions include instructions to confirm results using a suitable method, retest CSE, or a portion thereof, treat affected animals, remove affected animals, quarantine affected animals, cease animal breeding activities, collect embryo's from animals, stop or redirect air flow to certain cages, euthanize animals, sterilize rack, sterilize rack components, the like or combinations thereof.

Examples of Embodiments

Listed hereafter are non-limiting examples of certain embodiments of the technology.

A1. A system for monitoring contaminants in a rodent containment cage rack, comprising:
- a contaminant sampling element (CSE) in effective connection with a rack component; wherein the CSE comprises CSE identifying information;
- a reader in effective connection with a rack component and configured to detect the CSE identifying information; and
- one or more components coupled to the reader, which one or more components are configured to receive the CSE identifying information from the reader and which utilize the CSE identifying information to perform one or more contaminant monitoring operations.

A2. The system of embodiment A1, wherein the CSE identifying information comprises an identifier configured for detection by the reader.

A3. The system of embodiment A1 or A2, where the rack component is a rack, rack plenum, vertical air exhaust plenum, cage, cage cover, and a blower.

A4. The system of any one of embodiments A1 to A3, wherein the reader is an optical reader, electrical reader or mechanical reader.

A5. The system of any one of embodiments A2 to A4, wherein the identifier is chosen from one or more of a bar code, one or more numbers, one or more letters, a serial number, radio frequency identifier, discoloring polymer, reflective identifier, non-reflective identifier, magnetic identifier, symbol, symbolic code, chemical detector identifiers, infrared wavelength identifiers, optical wavelength identifiers, an image and combinations thereof.

A6. The system of any one of embodiments A1 to A5, wherein the CSE is removable.

A6.1. The system of any one of embodiments A1 to A6, wherein the CSE comprises a sampling element.

A6.2. The system of embodiment A6.1, wherein the sampling element comprises one or more of a filter, membrane, tape, liquid, gel, a capture agent or a combination thereof.

A6.3. The system of any one of embodiments A1 to A6, wherein the CSE comprises a detector.

A6.4. The system of embodiment A6.3, wherein the detector is chosen from a lab-on-a-chip, a microcantilever, an optical detector, and a chemically reactive substance.

A7. The system of any one of embodiments A1 to A6.4, wherein the one or more components are chosen from a controller and one or more microprocessors.

A8. The system of any one of embodiments A1 to A7, wherein the system comprises memory comprising instructions configured to utilize the CSE identifying information to perform the one or more contaminant monitoring operations.

A9. The system of any one of embodiments A1 to A8, wherein the one or more contaminant monitoring operations are chosen from: determining the presence or absence of the CSE, providing notification of the presence or absence of the CSE, assigning an identity to the CSE, generating and storing the time and date when the CSE was connected with the rack component, generating a schedule for removal of the CSE from the rack component, providing notification for the time of removal of the CSE, receiving contaminant information associated with the CSE, associating the contaminant information obtained from the CSE with CSE identifying information, generating instructions for an end user according to contaminant monitoring information obtained from the CSE identifying information, displaying the results of performing one or more operations and combinations thereof.

A10. The system of any one of embodiments A1 to A9, wherein the one or more components provide a visual display as a notification of the effective connection of the CSE with the rack component.

A11. The system of any one of embodiments A1 to A10, wherein the one or more components provide a notification for removal of the CSE from connection with the rack component.

A12. The system of any one of embodiments A9 to A11, wherein the one or more components associate the CSE with the contaminant information.

A13. The system of embodiment A12, wherein the contaminant information is chosen from the presence, absence and amount of a contaminant.

A14. The system of embodiment A13, wherein the contaminant comprises a biological contaminant.

A15. The system of embodiment A14, wherein the biological contaminant comprises a rodent pathogen.

A16. The system of embodiment A13, wherein the contaminant comprises a chemical contaminant.

B1. A contaminant sampling element (CSE) comprising:
- a sampling element; and
- an identifier.

B2. The CSE of embodiment B1, wherein the CSE comprises a first portion comprising the sampling element and a second portion comprising the identifier.
B3. The CSE of embodiment B2, wherein the first portion and the second portion do not overlap.
B4. The CSE of any one of embodiments B1 to B3, wherein the sampling element is configured to detect one or more contaminants.
B5. The CSE of embodiment B4, wherein the one or more contaminants comprise biological contaminants.
B6. The CSE of embodiment B5, wherein the biological contaminants comprise rodent pathogens.
B7. The CSE of embodiment B6, wherein the rodent pathogens are chosen from bacteria, a virus, a fungus and a parasite.
B8. The CSE of any one of embodiments B1 to B7, wherein the sampling element comprises a tape, membrane, gel, liquid, capture agent, filter or a combination thereof.
B9. The CSE of embodiment B8, wherein the sampling element comprises a HEPA filter.
B10. The CSE of any one of embodiments B1 to B9, wherein the sampling element comprises a dynamic sampling element.
B11. The CSE of any one of embodiments B1 to B10, wherein the sampling element comprises a detector.
B12. The CSE of embodiment B11, wherein the detector is chosen from a lab-on-a-chip, a microcantilever, an optical detector, and a chemically reactive substance.
B13. The CSE of any one of embodiments B1 to B9, wherein the sampling element comprises a static sampling element.
B14. The CSE of any one of embodiments B1 to B13, wherein the identifier comprises one or more of a bar code, one or more numbers, one or more letters, a serial number, radio frequency identifier, discoloring polymer, reflective identifier, non-reflective identifier, magnetic identifier, symbol, symbolic code, chemical detector identifiers, infrared wavelength identifiers, optical wavelength identifiers, an image or combinations thereof.
B15. The CSE of any one of embodiments B1 to B14, wherein the identifier comprises an electronic identification.
B16. The CSE of any one of embodiments B1 to B15, wherein the second portion comprises one or more current conducting elements.
B17. The CSE of any one of embodiments B2 to B16, wherein the second portion is in effective connection with a rack component.
B18. The CSE of any one of embodiments B1 to B17, wherein the second portion comprises a connector configured for effective connection of the CSE, or a portion thereof, to the rack component.
B19. The CSE of any one of embodiments B2 to B18, wherein the first portion is removable from the second portion.
B20. The CSE of any one of embodiments B2 to B19, wherein the first portion is configured for placement within a plenum of a rack and the second portion is configured for placement on an exterior portion of a rack.
B21. The CSE of any one of embodiments B1 to B20, wherein the sampling element comprises an identifier.
C1. A method for monitoring contaminants in a rodent containment cage rack comprising:
   (a) detecting CSE identifying information from a location on a rodent containment cage rack; and
   (b) performing one or more contaminant monitoring operations utilizing the CSE identifying information detected in (a).

C2. The method of embodiment C1, wherein the detecting in (a) comprises determining the presence or absence of a containment sampling element (CSE).
C3. The method of embodiment C1 or C2, comprising, prior to step (a), providing a CSE comprising the CSE identifying information, wherein the CSE is in effective connection with a component of a rodent containment cage rack.
C4. The method of embodiment C2, wherein the determination is the absence of a CSE.
C5. The method of embodiment C4, comprising, prior to step (b), providing a CSE comprising the CSE identifying information, wherein the CSE is in effective connection with a component of a rodent containment cage rack.
C6. The method of any one of embodiments C1 to C5, wherein the CSE identifying information comprises an identifier.
C7. The method of any one of embodiments C1 to C6, comprising detecting the CSE identifying information with a reader.
C8. The method of embodiment C7, wherein the reader is coupled to one or more components configured to receive the CSE identifying information from the reader.
C9. The method of embodiment C8, wherein the one or more components are chosen from a controller and one or more microprocessors.
C10. The method of embodiment C8 or C9, wherein the CSE identifying information is transferred to the one or more components from the reader.
C11. The method of any one of embodiments C8 to 010, wherein the one or more components are in association with memory comprising instructions configured to utilize the CSE identifying information to perform one or more contaminant monitoring operations.
C12. The method of any one of embodiments C1 to C11, wherein the one or more contaminant monitoring operations are chosen from: providing notification of the presence or absence of the CSE, assigning an identity to the CSE, associating the CSE with a reader, associating the CSE with a location, generating and storing the time and date when the CSE was connected with the rack component, generating a schedule for removal of the CSE from the rack component, providing notification for the time of removal of the CSE, receiving contaminant information associated with the CSE, associating the contaminant information obtained from the CSE with the CSE identifying information, generating instructions for an end user according to the contaminant information obtained and the CSE identifying information, displaying the results of performing one or more operations and combinations thereof.
C13. The method of any one of embodiments C1 to C12, wherein the component of the rodent containment rack system is chosen from a cage, rack, a plenum of a rack, and a blower.
C14. The method of any one of embodiments C1 to C13, wherein the contaminant monitoring operation comprises detecting the presence, absence and/or amount of an animal pathogen in real-time.
C15. The method of any one of embodiments C12 to C14, comprising adjusting one or more of the components of the rodent containment rack system according to the association of the contaminant information obtained from the CSE and the CSE identifying information.
C16. The method of embodiment C15, wherein the adjusting comprises isolating and containing a detected contamination.
C17. The method of any one of embodiments C14 to C16, wherein the animal pathogen is a rodent pathogen.

C18. The method of any one of embodiments C14 to C17, wherein the rodent pathogen is a virus.

C19. The method of embodiment C18, wherein the virus is selected from the genus of Parvovirus, Adenovirus, Coronavirus, Polyomavirus, Reovirus, Pneumovirus, Paramyxovirus, Arenavirus, and Norovirus.

C20. The method of embodiment C18 or C19, wherein the virus is selected from mouse hepatitis virus (MHV), mouse parvovirus-1 (MPV-1), mouse parvovirus-2 (MPV-2), mouse parvovirus-3 (MPV-3), mouse parvovirus-4 (MPV-4), parovirus minute virus of mice (MVM), mouse rotavirus (MRV/EDIM), murine norovirus (MNV), Theiler's murine encephalomyelitis virus (TMEV [GDVII]), and mouse adendovirus-1 (MAV-1) and mouse adendovirus-2 (MAV-2).

C21. The method of embodiment C17, wherein the rodent pathogen is bacteria.

C22. The method of embodiment C21, wherein the bacteria is selected from the genus of *Pneumocystis, Pseudomonas, Corynebacterium, Helicobacter, Pasteurella, Citrobacter, Corynebacterium, Mycoplasma, Salmonella, Streptobacillus, Streptococcus, Staphylococcus, Clostridium, Bordetella, Campylobacter* and *Klebsiella*.

C23. The method of embodiment C21 or C22, wherein the bacteria is selected from Cilia-associated respiratory (CAR) bacillus, *Corynebacterium bovis, Helicobacter hepaticus, Helicobacter bilis, Pasteurella pneumotropica, Citrobacter rodentium, Corynebacterium kutscheri, Mycoplasma pulmonis, Streptobacillus moniliformis, Streptococcus* (Beta-hemolytic; Group B), *Staphylococcus aureus, Clostridium pilfiorme, Streptococcus* (Beta-hemolytic; Group C), *Streptococcus* (Beta-hemolytic; Group G), *Streptococcus pneumonia, Bordetella bronchiseptica, Klebsiella oxytoca, Klebsiella pneumonia, Pseudomonas aeruginosa* and *Staphylococcus xylosus*.

C24. The method of embodiment C17, wherein the rodent pathogen is a parasite.

D1. A method for monitoring contaminants in a rack comprising:
 (a) providing a contaminant sampling element (CSE) in effective connection with a component of a rack; wherein the CSE comprises CSE identifying information comprising an identifier configured for detection by a reader;
 (b) detecting the identifier, thereby providing CSE identifying information;
 (c) providing notification or confirmation of the presence of the CSE in effective connection with the component of the rodent containment cage rack according to the detecting in (b).

D2. The method of embodiment D1, comprising providing notification of a time for removal and testing of the CSE according to the CSE identifying information.

D3. The method of embodiment D1 or D2, comprising removing the CSE and obtaining a test result.

D4. The method of embodiment D4, comprising associating the test result with the CSE identifying information.

D5. The method of embodiment D4, wherein the associating comprises adding the test result to a component of a rack.

D6. The method of any one of embodiments D3 to D5, comprising generating instructions for adjusting the rack according to the test results.

D7. The method of embodiment D6, comprising adjusting the rack according to the instructions.

D8. The method of any one of embodiments D1 to D7, wherein the rack is a rodent containment cage rack.

Drawing Elements

Provided hereafter is a listing of some elements shown in the drawings.

| Item Name and/or Description | Call Out/Reference Number |
|---|---|
| Identifier | 3 |
| Proximal portion of plug | 8 |
| Distal portion of plug | 9 |
| Plug | 10 |
| Grip | 11 |
| Grip (recessed) | 11' |
| Fastener | 12 |
| Grip Flange | 13 |
| Shaft | 14 |
| Plug Connector | 15 |
| Flange Rim | 16 |
| Plug Cylinder | 17 |
| Flange Mating Surface | 18 |
| Cage | 20 |
| Washer | 50 |
| Washer Aperture | 55 |
| Washer Mating Surface | 60 |
| Washer Outer Rim | 65 |
| Exhaust Port Connector | 66 |
| Intake Port Connector | 68 |
| Cage Flange | 82 |
| Housing | 100 |
| Housing Inner Surface | 105 |
| Housing Outer Surface | 110 |
| Fastener Hole | 120 |
| Washer recess | 122 |
| Housing Connector | 125 |
| Housing Aperture | 126 |
| Cage Base (Cage Bottom) | 130 |
| Cage Lid | 132 |
| Channel | 134 |
| Vent | 136 |
| Post Couplers | 138 |
| Cage Tracking Device or Identifier | 140 |
| Hub | 141 |
| Housing Rim | 145 |
| Gasket | 150 |
| Gasket Hole | 155 |
| Gasket Aperture | 160 |
| Gasket Mating Surface | 165 |
| Gasket Rim | 170 |
| Retaining Arm | 200 |
| Upper Retaining Portion | 205 |
| Lower Retaining Portion | 210 |
| Shaft | 215 |
| Socket | 220 |
| Proximal portion of arm | 216 |
| Distal portion of arm | 217 |
| Sampling Element | 250 |
| Containment Sampling Element Assembly | 300 |
| Vertical Support Member (vertical plenum) | 400 |
| Side Rail | 401 |
| Distal Surface | 402 |
| Exhaust Plenum | 403 |
| Exhaust Plenum Airway | 404 |
| Intake (Supply) Plenum | 405 |
| Intake (Supply) Plenum Airway | 406 |
| Air exhaust connector | 407 |
| Air intake connector | 408 |
| Proximal Surface | 409 |
| Cage rack Assembly | 500 |
| Support member plenum (horizontal) | 510 |
| Side member plenum (vertical) | 522 |
| Trolley frame tube | 572 |
| Trolley plate mounts | 574 |
| Casters | 576 |
| Controller side mount | 582 |
| Air connector plate—supply | 584 |
| Blower—Intake | 600 |
| Blower edge | 608 |
| Blower sidewall | 610 |
| Baffle pre-filter | 612 |
| Blower—exhaust | 700 |

-continued

| Item Name and/or Description | Call Out/Reference Number |
|---|---|
| Blower sidewall | 710 |
| Air outlet connector | 712 |
| Power Supply | 740 |
| Reader Assembly | 800 |
| Reader Connector | 801 |
| Reader Housing Cap | 802 |
| Reader Housing | 803 |
| Reader Housing proximal Side | 803' |
| Reader Housing distal Side | 803" |
| Reader Housing Deck | 804 |
| Reader Housing Stalk | 805 |
| Cap Portion of Deck | 806 |
| Cap Portion of Stalk | 807 |
| Reader Board Assembly | 810 |
| Reader Board | 811 |
| Lens | 812 |
| Shroud | 815 |
| Image sensor803 | 820 |
| Microprocessor | 825 |
| Illuminators | 830 |
| Communication medium | 835 |
| Connector Platform | 836 |
| Circuit board hub | 900 |
| Rack Controller | 930 |
| CSE Installed | 941 |
| CSE detected | 942 |
| Notification of CSE detection sent | 943 |
| CSE Identifying Information stored in memory | 944 |
| Sampling Protocol Initiated | 945 |
| Notification sent to user recommending CSE testing | 946 |
| CSE removed from rack | 947 |
| CSE sent out for testing | 948 |
| Test results obtained and entered into system | 949 |
| Notification of test results sent to user | 951 |
| Recommended action items sent to user | 952 |

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A system for monitoring contaminants in a rodent containment cage rack, comprising:
a contaminant sampling element (CSE) in connection with a rack component selected from a rack plenum, air duct and blower, wherein the CSE is an assembly comprising a first portion comprising a sampling element located on the CSE and configured to collect, retain and/or detect a contaminant and a second portion comprising an identifier located on the CSE comprising information for identifying the CSE, wherein the first portion comprising the sampling element and the second portion comprising the identifier do not overlap and the sampling element is located within a rack component interior and the identifier is located on a rack component exterior;
a reader positioned on the rack and configured to detect the identifier comprising information for identifying the CSE; and
one or more components of the system coupled to the reader, which one or more components of the system are configured to receive the information for identifying the CSE from the reader and which utilize the information for identifying the CSE to perform one or more contaminant monitoring operations.

2. The system of claim 1, wherein the reader is an optical reader, electrical reader or mechanical reader.

3. The system of claim 1, wherein the identifier is chosen from one or more of a bar code, one or more numbers, one or more letters, a serial number, a radio frequency identifier, a discoloring polymer, a reflective identifier, a non-reflective identifier, a magnetic identifier, a symbol, a symbolic code, a chemical detector identifier, an infrared wavelength identifier, an optical wavelength identifier, an image and combinations thereof.

4. The system of claim 1, wherein the CSE is removable.

5. The system of claim 1, wherein the sampling element comprises one or more of a filter, membrane, tape, liquid, gel, a capture agent or a combination thereof.

6. The system of claim 1, wherein the sampling element comprises a detector and the detector is chosen from a lab-on-a-chip, a microcantilever, an optical detector, and a chemically reactive substance.

7. The system of claim 1, wherein the one or more components of the system are chosen from a controller and one or more microprocessors.

8. The system of claim 1, wherein the system comprises memory comprising instructions configured to utilize the information for identifying the CSE to perform the one or more contaminant monitoring operations.

9. The system of claim 1, wherein the one or more contaminant monitoring operations are chosen from: determining the presence or absence of the CSE, providing notification of the presence or absence of the CSE, assigning an identity to the CSE, generating and storing the time and date when the CSE was connected with the rack component, generating a schedule for removal of the CSE from the rack component, providing notification for the time of removal of the CSE, receiving contaminant information associated with the CSE, associating the contaminant information obtained from the CSE with the information for identifying the CSE, generating instructions for an end user according to contaminant monitoring information obtained from the CSE, displaying the results of performing one or more operations and combinations thereof.

10. The system of claim 1, wherein the one or more contaminant monitoring operations is a visual display notification of an effective connection of the CSE with the rack component.

11. The system of claim 1, wherein the one or more contaminant monitoring operations is a notification for removal of the CSE from connection with the rack component.

12. The system of claim 9, wherein the one or more components of the system associate the CSE with the contaminant information.

13. The system of claim 12, wherein the contaminant information is chosen from the presence, absence and amount of a contaminant.

14. The system of claim 13, wherein the contaminant comprises a biological contaminant.

15. The system of claim 14, wherein the biological contaminant comprises a rodent pathogen.

16. The system of claim 13, wherein the contaminant comprises a chemical contaminant.

17. The system of claim 1, wherein the CSE comprises a feature for connecting the CSE to the rack component.

18. The system of claim 1, wherein the rack component is a plenum and the sampling element is located within a plenum interior and the identifier is located on a plenum exterior.

* * * * *